(12) United States Patent
Rajasingham

(10) Patent No.: US 8,020,658 B2
(45) Date of Patent: Sep. 20, 2011

(54) EASY EJECTOR SEAT WITH SKELETAL CRASH SAFETY BEAM

(76) Inventor: Arjuna Indraeswaran Rajasingham, Bethesda, MD (US)

( * ) Notice: Subject to any disclaimer, the term of this patent is extended or adjusted under 35 U.S.C. 154(b) by 1013 days.

(21) Appl. No.: 11/185,784

(22) Filed: Jul. 21, 2005

(65) Prior Publication Data

US 2007/0017724 A1    Jan. 25, 2007

(51) Int. Cl.
*B62D 61/12* (2006.01)

(52) U.S. Cl. ...................................................... 180/209

(58) Field of Classification Search .................. 180/209, 180/337, 338, 906; 296/197, 193.04; 446/289
See application file for complete search history.

(56) References Cited

U.S. PATENT DOCUMENTS

| | | | | |
|---|---|---|---|---|
| 4,368,793 | A * | 1/1983 | Igarashi | 180/14.4 |
| 4,422,685 | A * | 12/1983 | Bonfilio et al. | 296/193.04 |
| 4,540,377 | A * | 9/1985 | Rehkemper et al. | 446/430 |
| 5,199,732 | A * | 4/1993 | Lands et al. | 280/407.1 |
| 5,249,823 | A * | 10/1993 | McCoy et al. | 280/656 |
| 6,322,091 | B1 * | 11/2001 | Lindley | 280/149.2 |
| 7,036,848 | B2 * | 5/2006 | Chernoff et al. | 280/782 |
| 2006/0283645 | A1 * | 12/2006 | Lin et al. | 180/208 |

* cited by examiner

*Primary Examiner* — Faye M. Fleming

(57) ABSTRACT

An arrangement in passenger vehicles, that diverts the impact energy in impacts away from the passengers to the remaining mass of the vehicle thereby protecting the passengers, and in the same arrangement provides utilitarian access to the vehicle, such utilitarian access making it possible to both install multi-element contoured surround seats for passengers and the driver, and also safety devices and arrangements for head-on collision protection that protect the passenger. An indo-skeletal structural arrangement proposed for the vehicle, provides further benefits by targeting the strength of the vehicle to protect passengers while minimizing other massive elements in the vehicle.

35 Claims, 39 Drawing Sheets

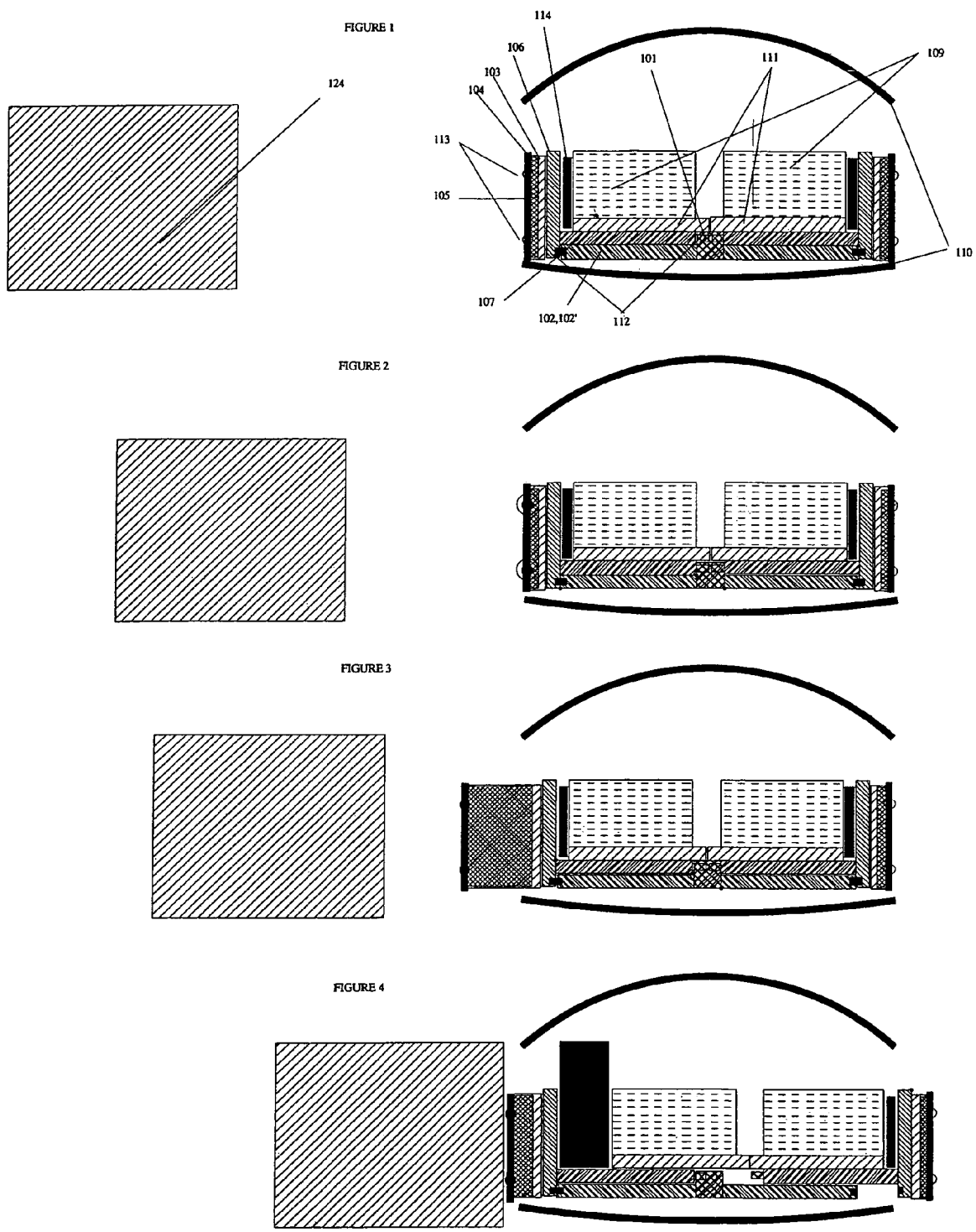

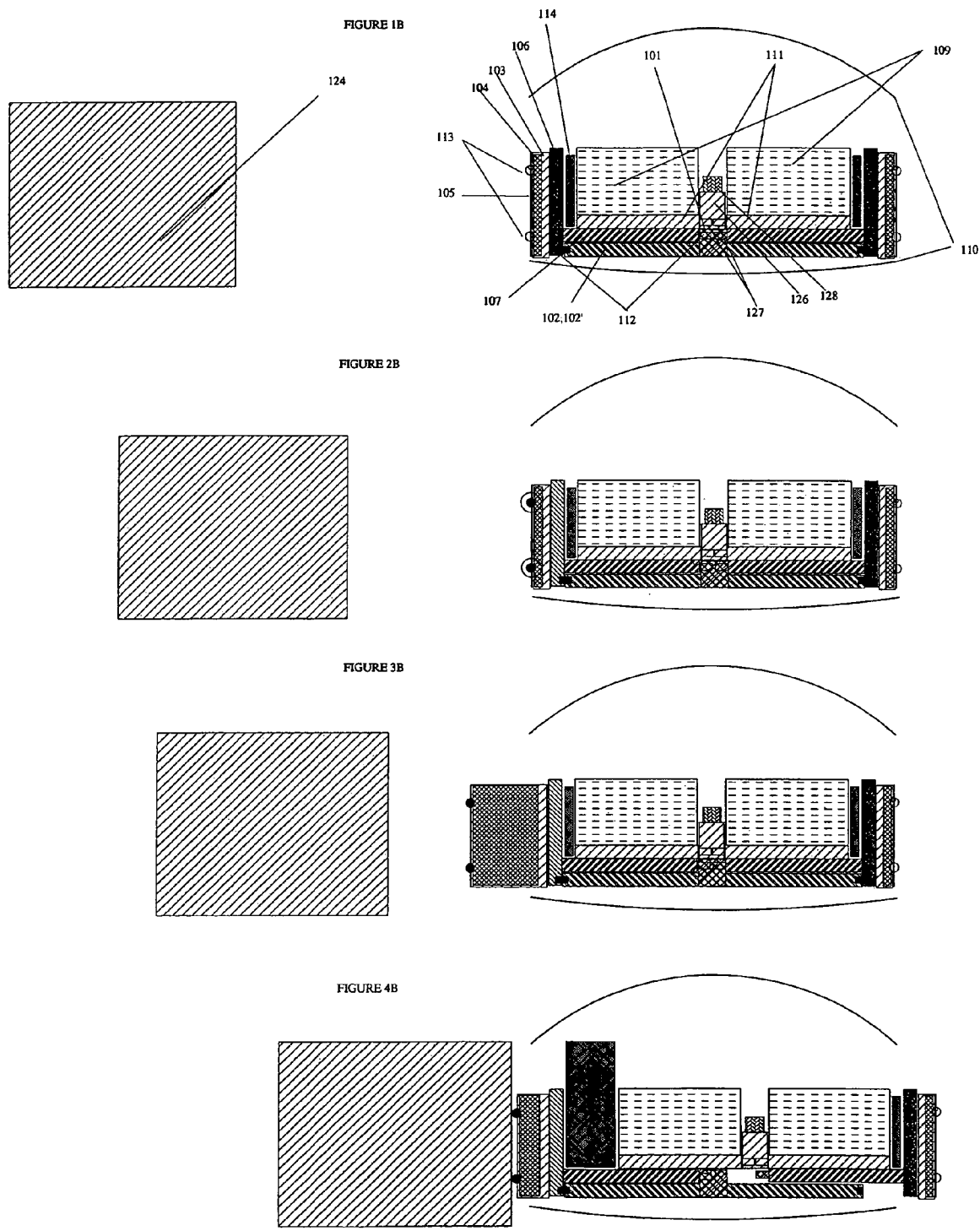

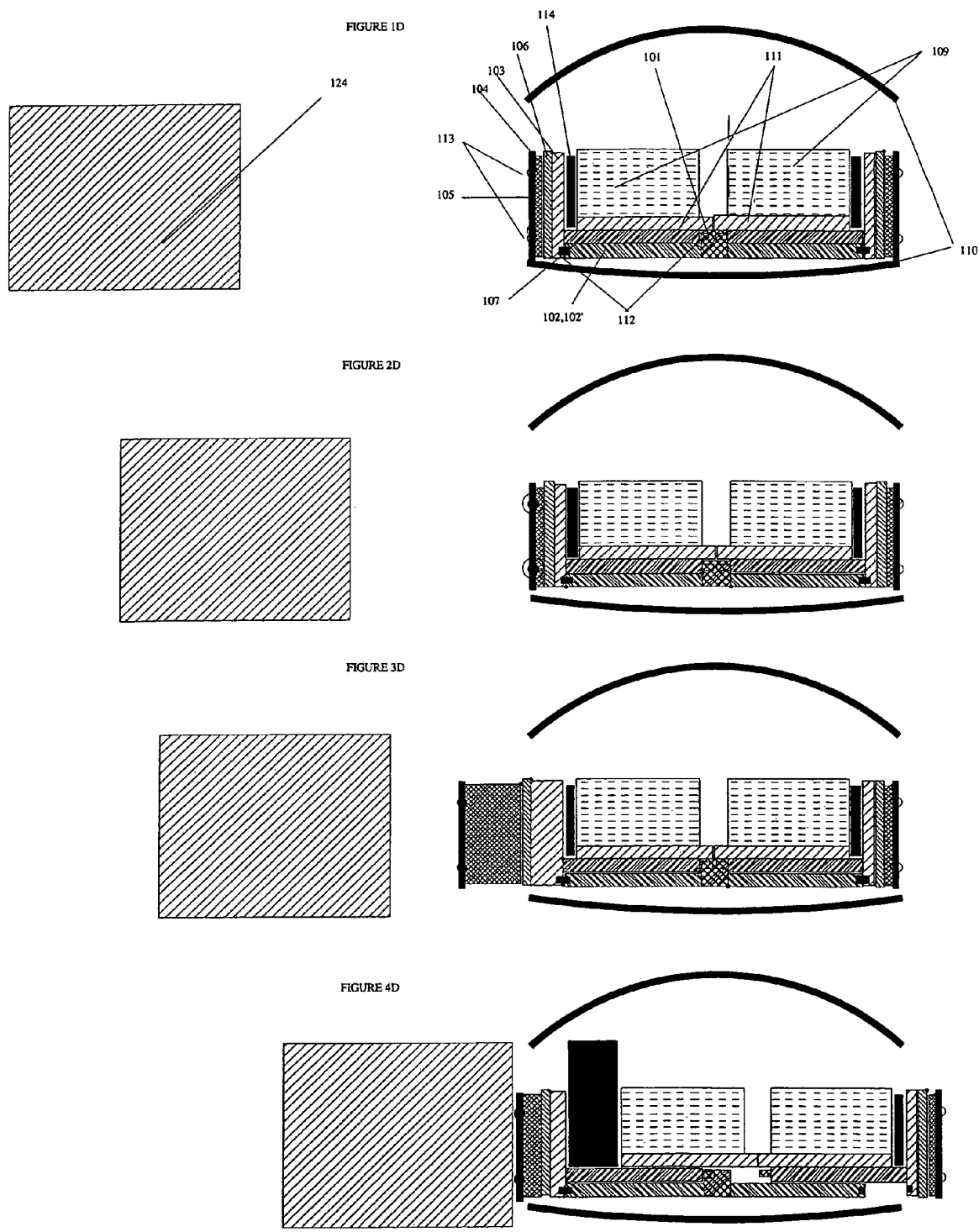

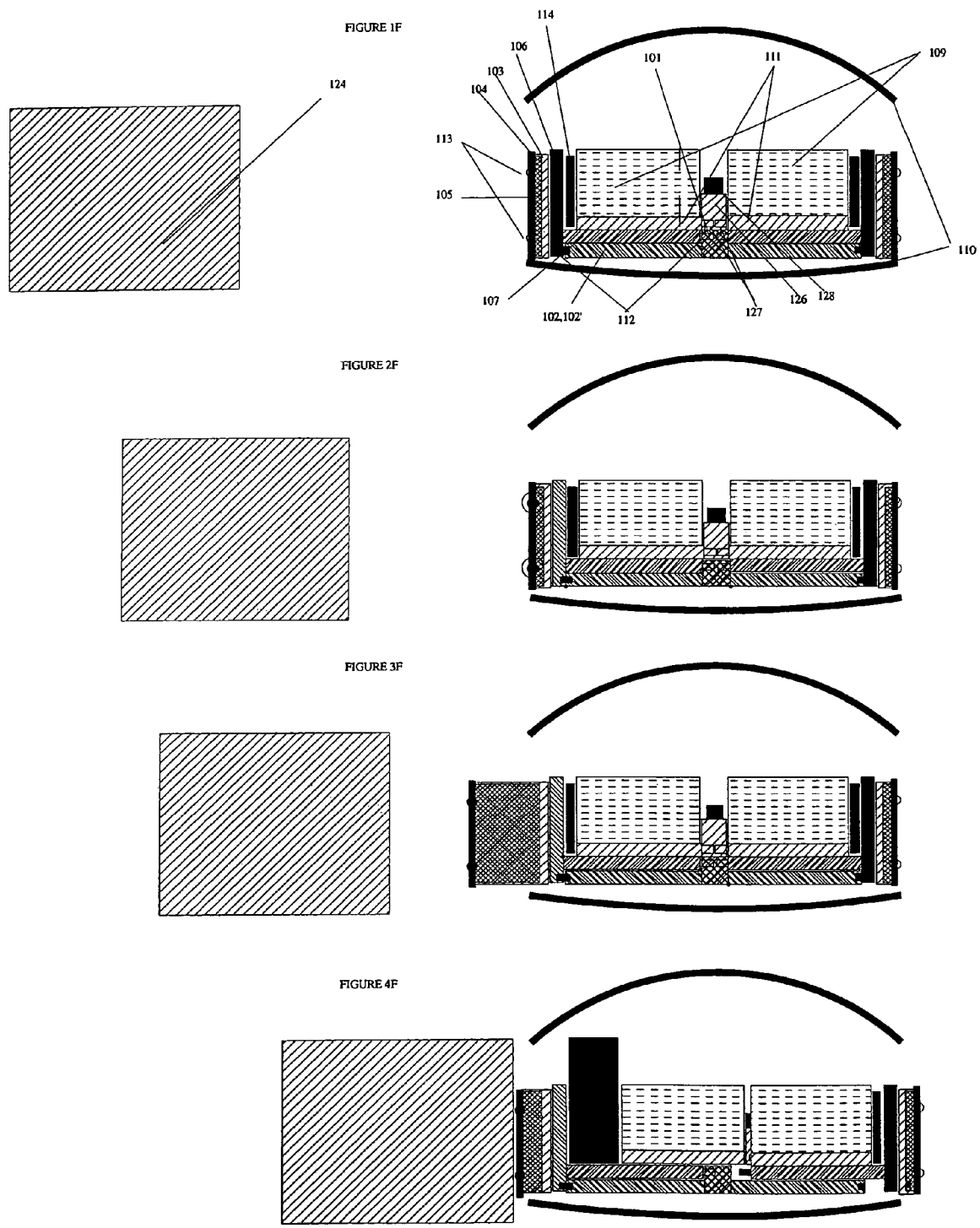

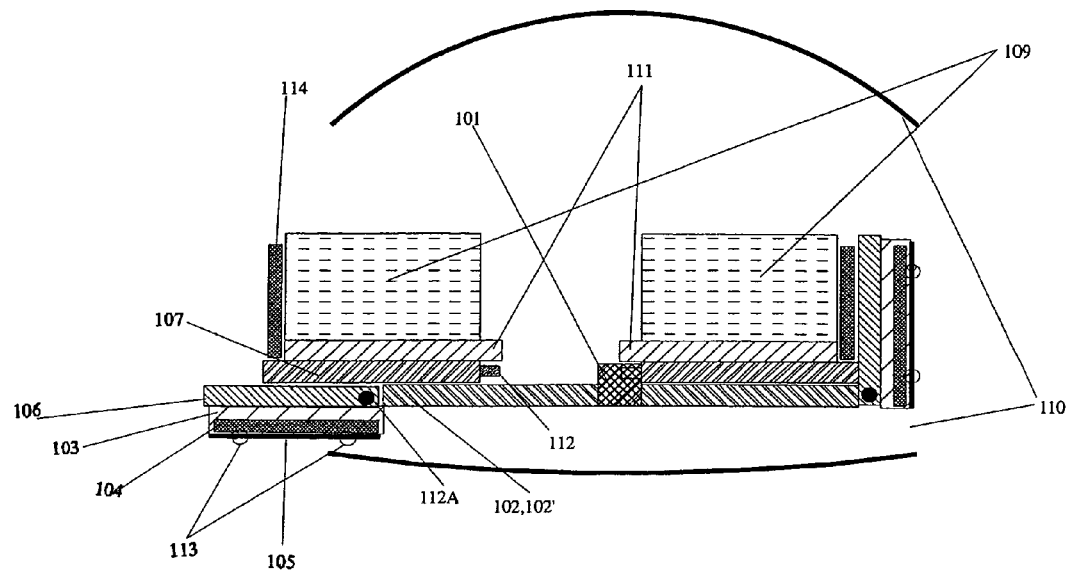
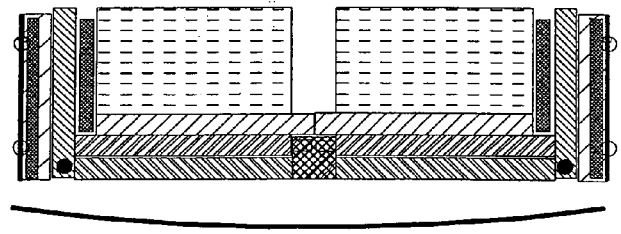

113

FIGURE 10 A1
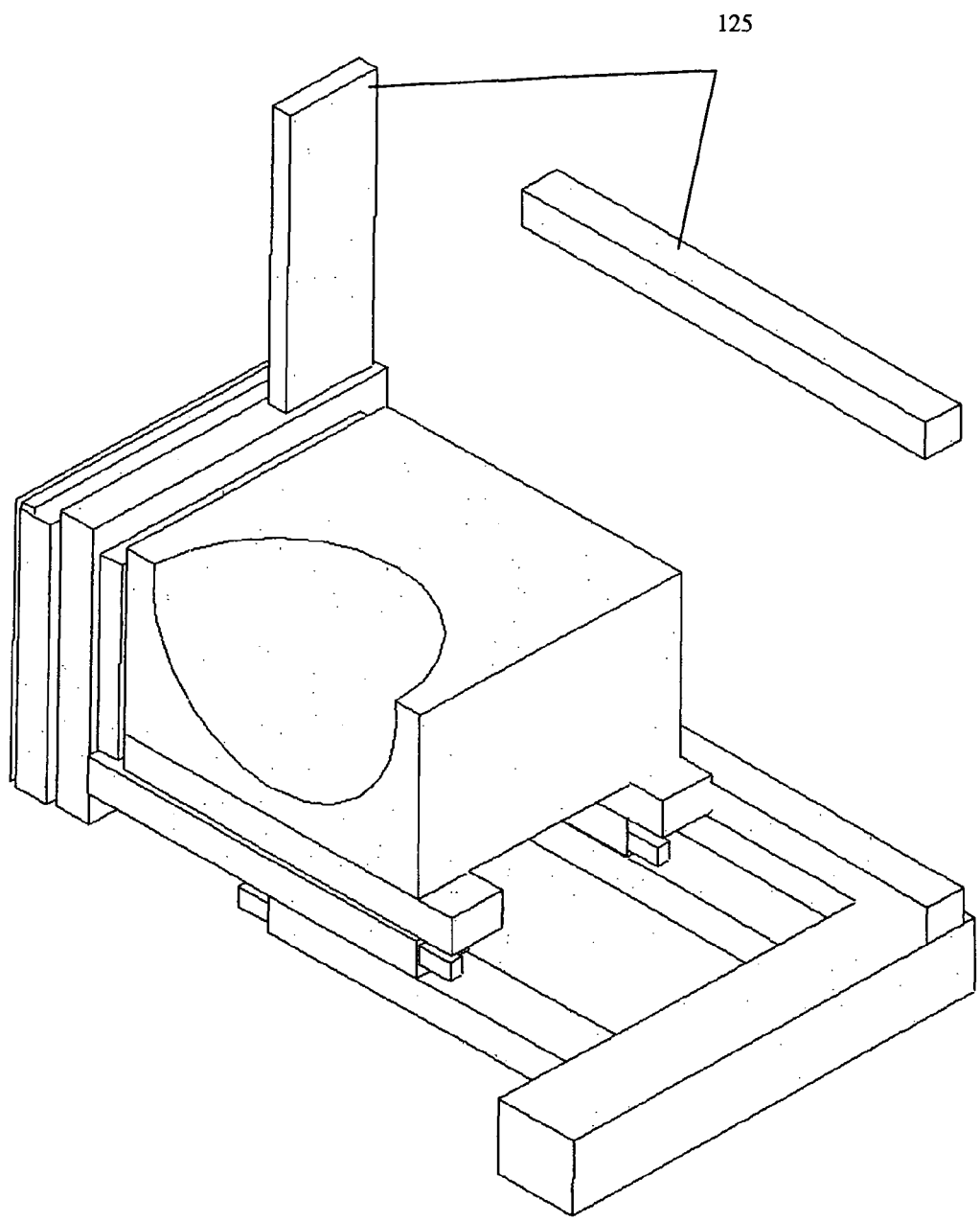

FIGURE 10 B1
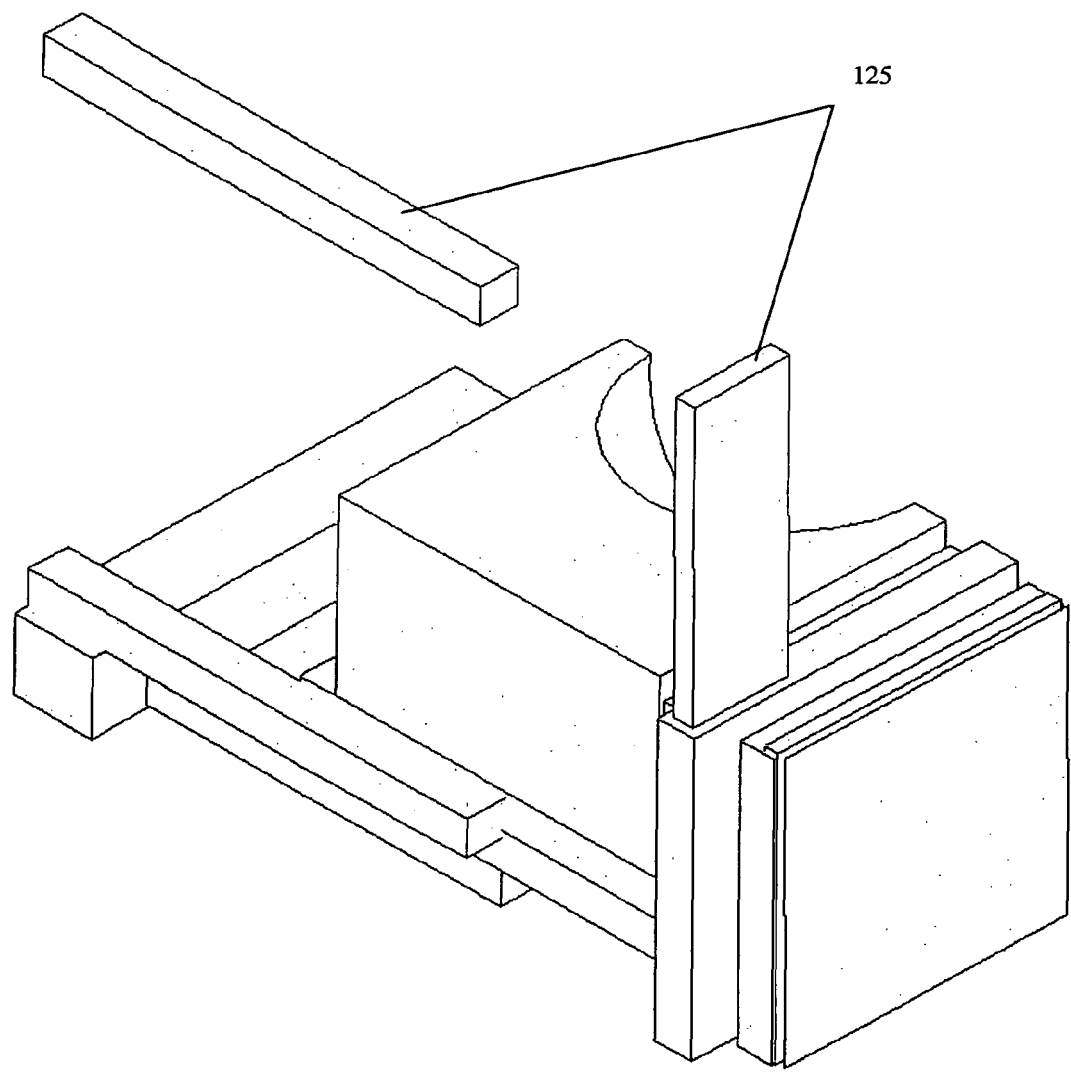

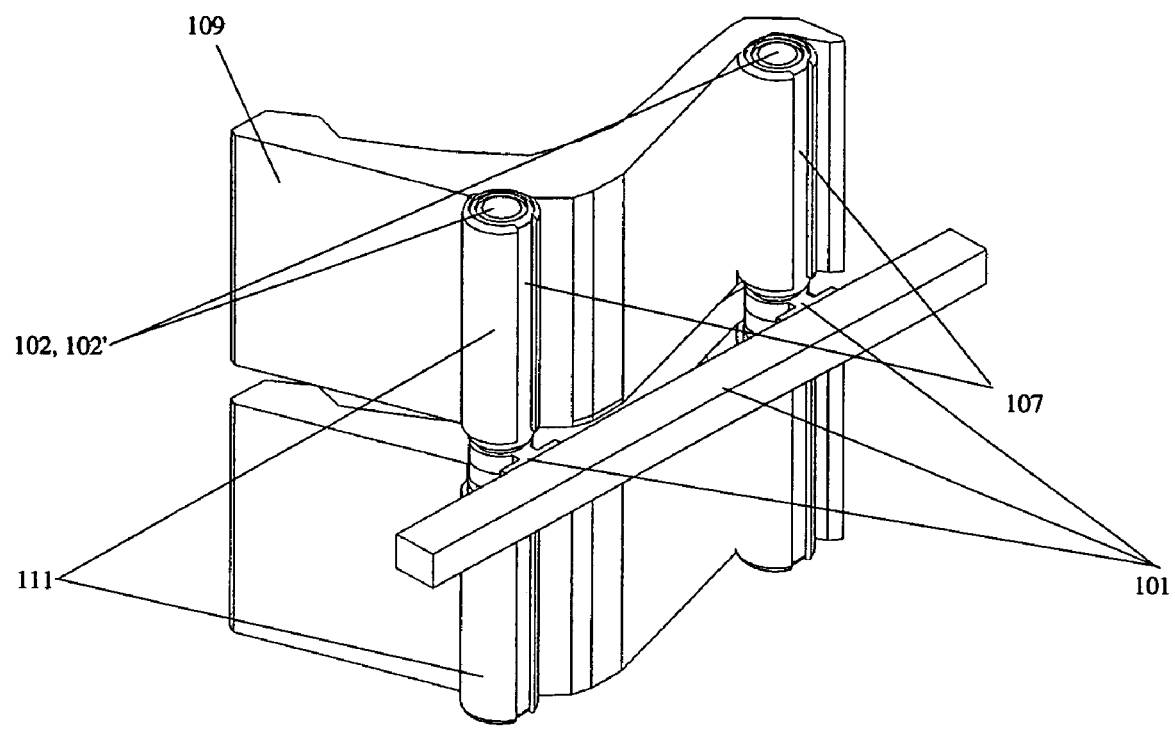
Fig 10 D1

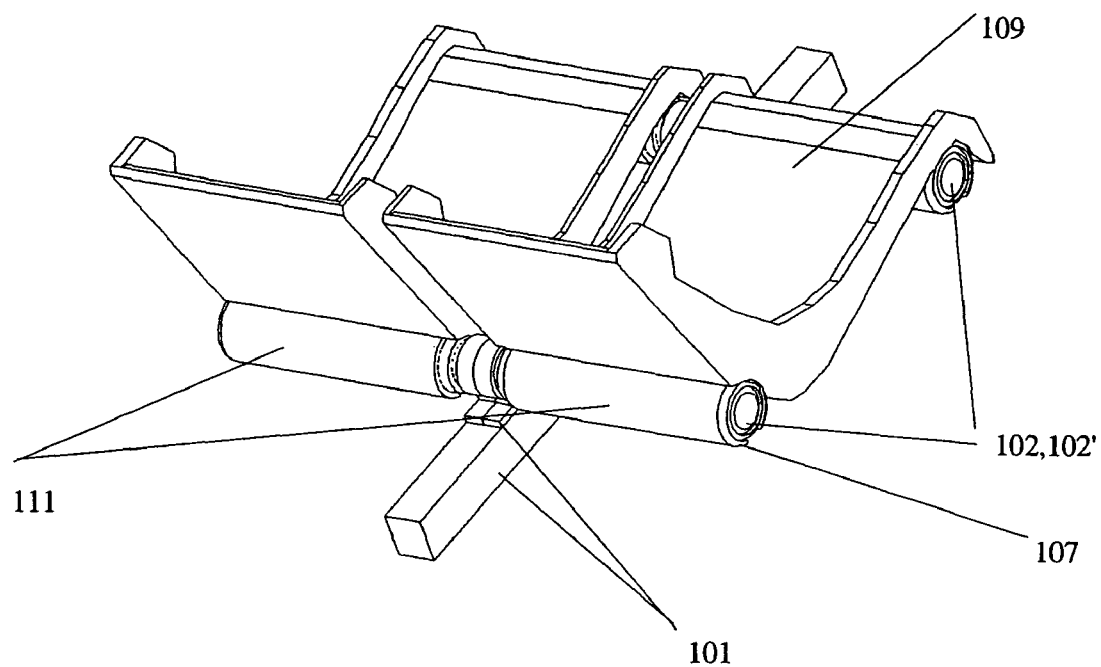
Fig 10D2

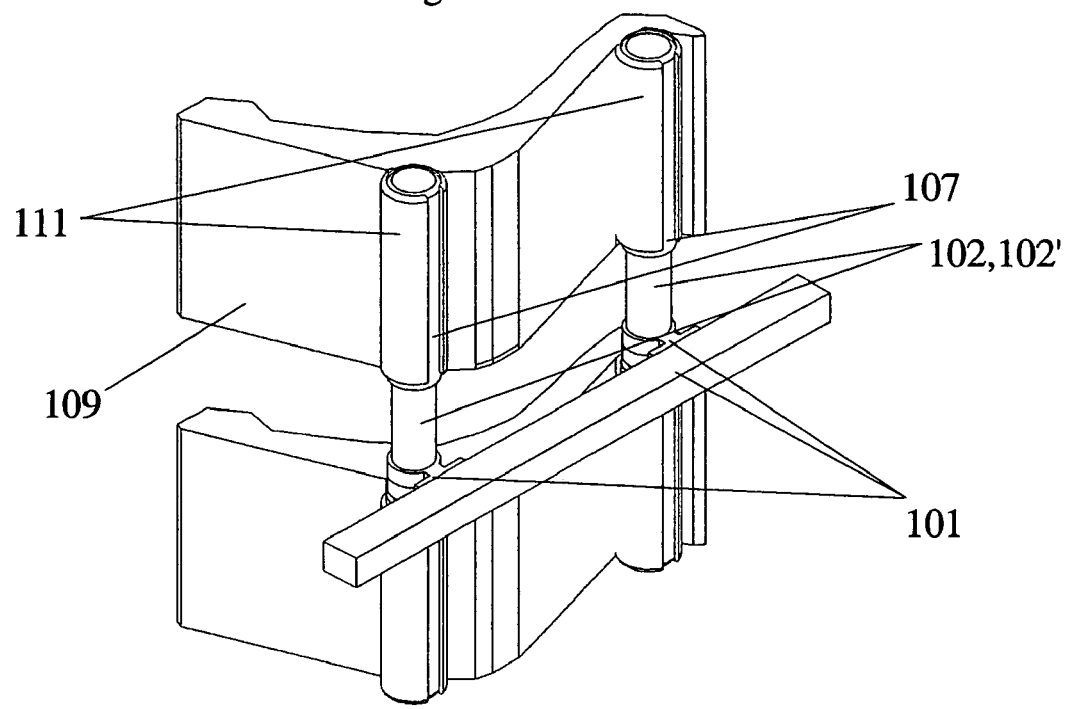
Fig 10D3

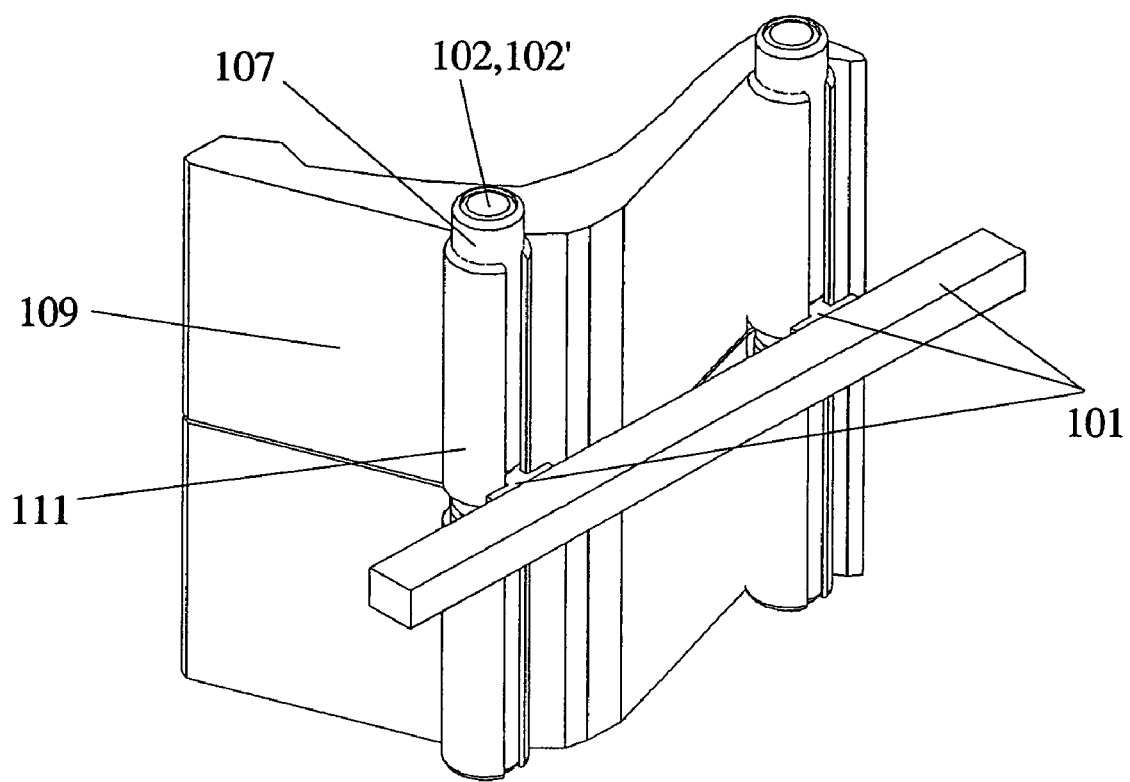
Fig 10D4

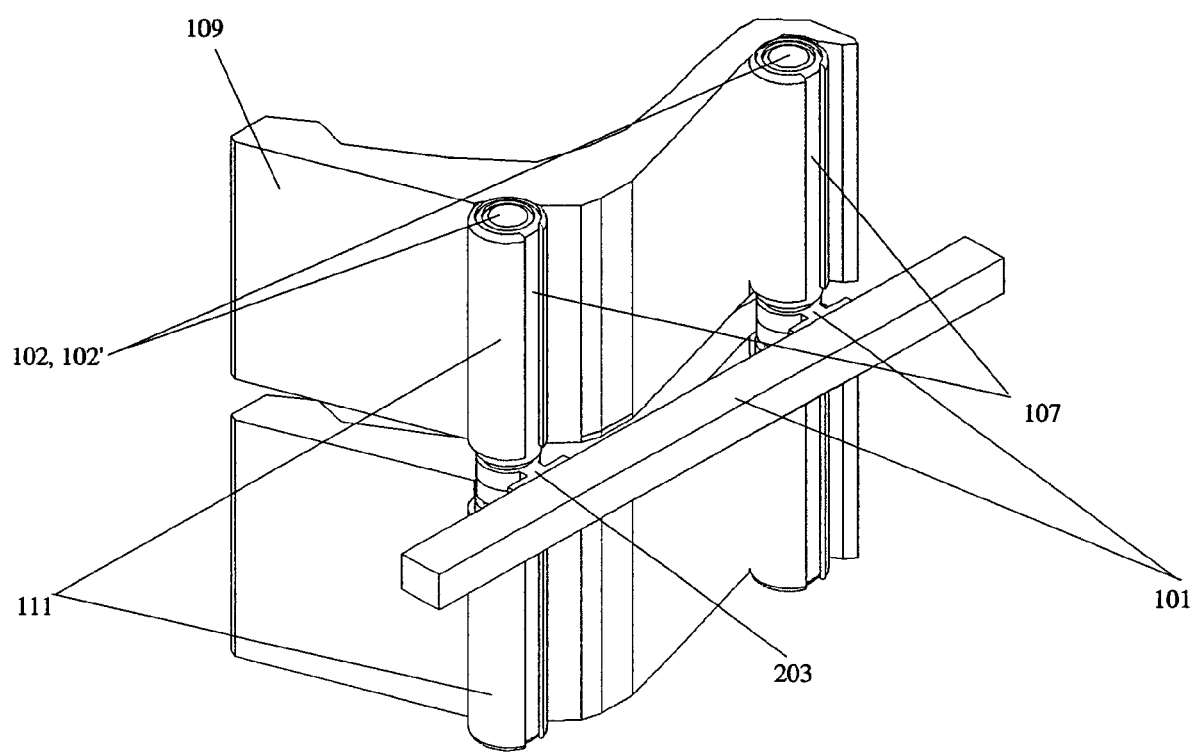
Fig 10 D5

FIGURE 11 Safety Zones
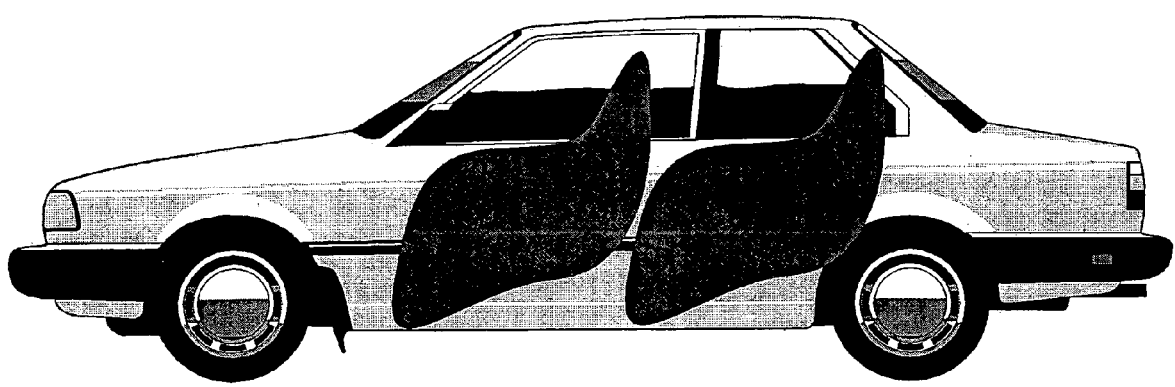

FIGURE 12 H2
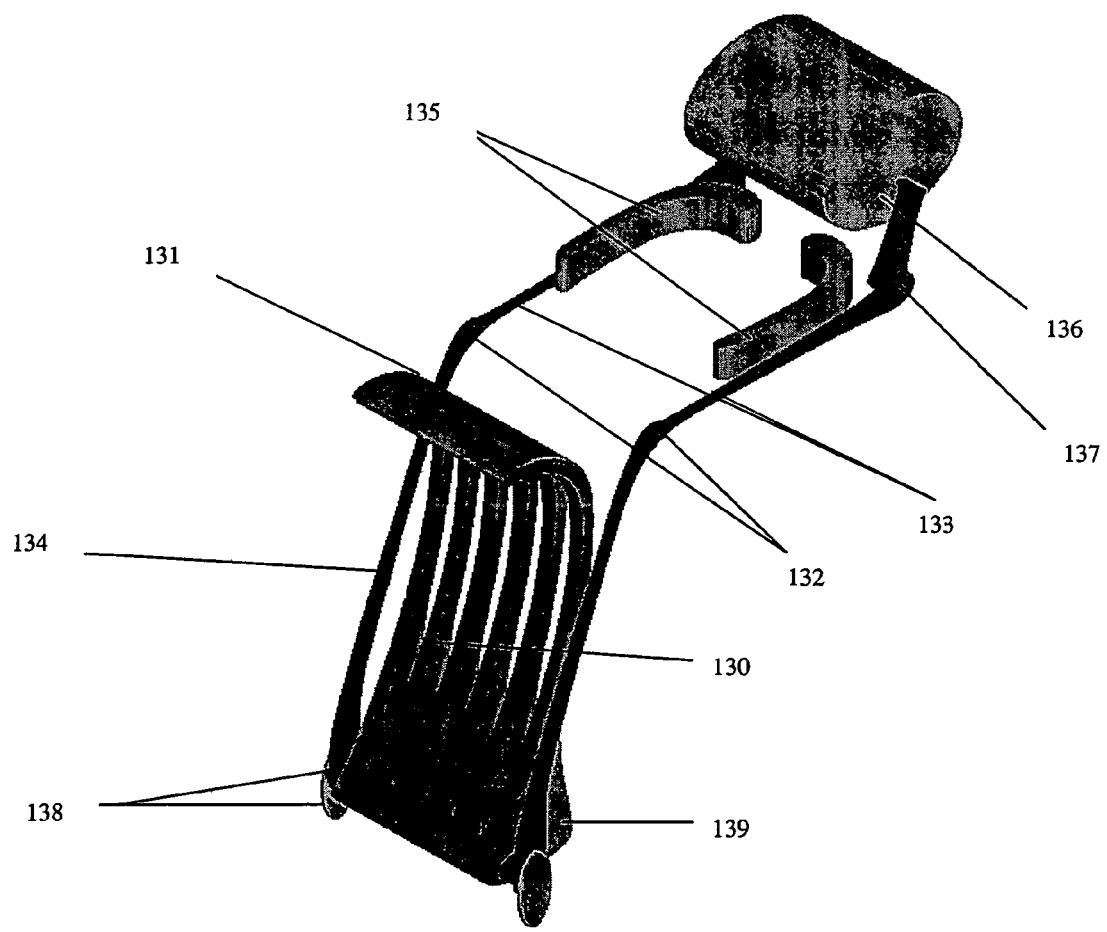

AN ISOMETRIC VIEW

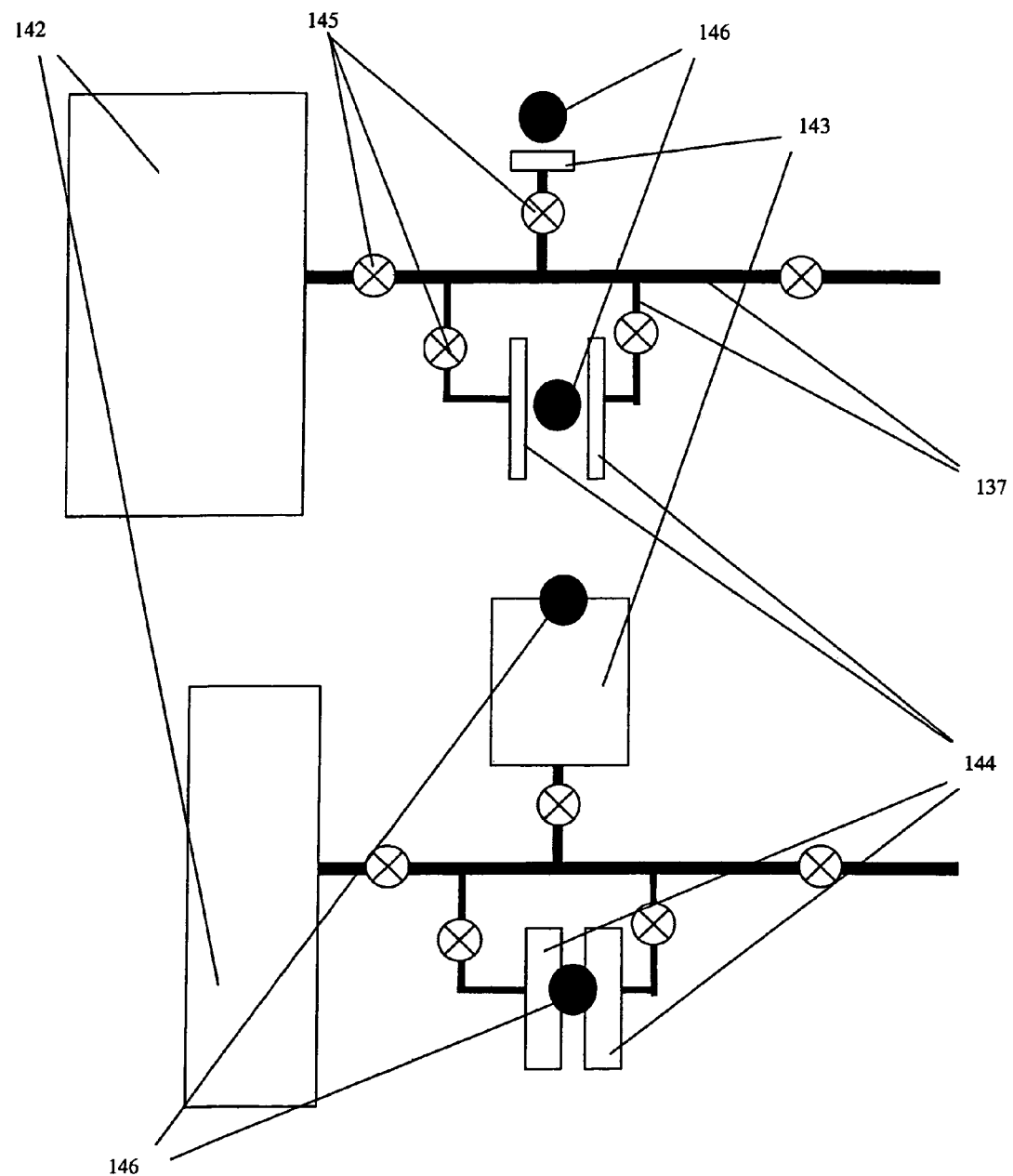
FIGURE 17 A and B

199

EASY EJECTOR SEAT WITH SKELETAL CRASH SAFETY BEAM

THE FOLLOWING APPLICATIONS ARE HEREBY INCORPORATED HEREIN BY REFERENCE FURTHER, THIS APPLICATION CLAIMS PRIORITY FROM THE FOLLOWING APPLICATIONS

This application claims priority from applications entitled "Easy Ejector with skeletal crash safety beam" U.S. Ser. No. 08/936,626 filed Sep. 24, 1997, U.S. Ser. Nos. 09/404,475, 09/435,830, 60/195,298, 60/226,570, EPO S/N 98948260.9-2306, EPO S/N 00203896.6. and U.S. Ser. Nos. 09/779,591, 09/779,592, 09/779,593, 09/779,594; 60/280470; 60/282105; 60/286629; 60/332419; 60/338466; 60/367644; 60/461434; 10/279,171; 60/362450; 10/109,674 and 10/681,304.

STATEMENT REGARDING FEDERALLY SPONSORED RESEARCH OR DEVELOPMENT

Not Applicable

REFERENCE TO A MICRO FICHE APPENDIX

Not Applicable

BACKGROUND OF INVENTION

1. Field of Invention

The present invention defines a means to incorporate in passenger motor vehicles, unique safety arrangements particularly for lateral or side impacts that provide energy absorption by the mass of the vehicle but decouple the passenger from the impact acceleration and deceleration that is provided by the mass of the vehicle, thereby protecting the passengers during such collisions. Moreover, the same arrangement synergistically provides utility in access, comfort and further safety in the operating position for passengers and the driver.

2. Description of the Related Art

In the past safety of passengers was not always the priority in passenger vehicle design. In the evolution of motor vehicle design the structure moved from a chassis that held together the mechanical components of the vehicle—a structure that was then attached to a passenger compartment or to passenger seats. The design of the structure was to hold together the working components of the vehicle—a critical aspect at the time. Thereafter in more recent times right up to the present, Exo-skeletal designs have been the dominant paradigm. Here rigid shells were constructed to hold both the mechanical components and the passengers in fixed positions. However such fixed shell structures have had limited success in protecting passengers and drivers when there are lateral collisions as passengers undergo the same impact related accelerations and decelerations as the remaining parts of the vehicle, as space limitations don't allow for "crumple zones" as in the case of impact protection for head on collisions. Passengers are particularly vulnerable to side impacts as they cannot take preemptive measures as with head-on collisions where there is speed control and directional control that is available. As vehicle speeds have increased substantially in the last several decades, these safety considerations for passengers have become critical and urgent. Vehicle designers—particularly automobile designers—have risen admirably to the task by incorporating myriads of devices and additions within the rigid shell paradigm to minimize risk in the event of collisions. Such devices include restraints such as seat belts and certain types of protective air bags. However, there are limits within the rigid shell paradigm for two reasons: First, the energy of impact cannot be easily diverted away from passengers into the remaining mass of the vehicle on impact. Second, the rigid shell needs to support high shear stresses on lateral impact and related compressive loads to the passenger compartment of the vehicle a factor that can only be addressed with greater mass of the vehicle that will impact its performance.

Another area of interest in passenger vehicles is to provide, in synergy with the above contributions, utility and comfort of passengers and drivers and further synergistic head-on collision protection.

There are four areas of Background art that are related to the present invention. These are: vehicles with sliding seats, safety arrangements addressing lateral impacts on passenger vehicles, air bags and other shock absorbing devices, and miscellaneous safety devices for frontal impacts. None of the inventions in these areas individually or collectively state or imply any aspects of the present invention. Moreover, none of this Background art even addresses the issue of energy transfer away from the passengers to the mass of the vehicle on impact and concurrently provide a mechanism for easy access to the vehicle with ejector seats. This is despite the urgent need in the car industry for such safety and utility. Moreover the novelty of the present invention is underscored as it provides solutions hitherto unidentified in a very large and competitive industry that is acutely aware of these needs and is constantly in search of new solutions to them.

Sloan U.S. Pat. No. 3,071,407 (1963) describes a single rear bench seat (lines 4-45)—full length (C1-L55), that can slide out of either side of the vehicle. It describes a door structure that may be attached to the seat and slide across and through the passenger compartment of the vehicle as the seat slides out. This invention does not state or imply any safety considerations in its structure, moreover such a bench seat on slides, in the event of a lateral collision on the doors will focus the impact energy on the passengers and these passengers will be the principal casualties as the mass of the vehicle slides away little harmed. This will be the case even in the embodiment described where the doors are fixed to the seat and slides through the passenger compartment with the seat. Moreover, it cannot be used in a front seat even for its limited functionality with doors fixed to the seat as driving instrumentation (steering wheel etc) will not allow a door to slide through the compartment. Finally it does not provide any comfort features for passengers over and above a bench seat. Mach U.S. Pat. No. 2,753,947 (1956) describes a sliding bench seat for the access of the engine of the vehicle it does not address the issue of safety of passengers or access utility. It is expected to perform similarly to Sloan in an impact on the doors or around the side profile of the passengers in the vehicle. Solomon U.S. Pat. No. 2,758,872 (1953) provides a sliding bench seat that goes through the doorway and for the same reasons as Sloan does not provide protection in side impacts or provide any comfort features over and above a bench seat. Cyphert U.S. Pat. No. 3,944,277 (1976) describes a seat mounted on a sliding platform that has a door at the end and protective walls around it. The arrangement being designed for the utility of the operator to reach points away from the body of the vehicle without dismounting the vehicle. This invention like Sloan does not state or imply any safety considerations in its use. Moreover there is no expressed or implied reference to the utility of mounting and dismounting the vehicle or for the comfort of the operator or the passengers except for the ability for the platform to move out to give the operator greater reach away from the vehicle body. Rees U.S. Pat. No. 5,213,300 (1993) describes internal design structure for slide arrangements that allow forward and backward movement of the passenger seats in vehicles. This like many other inventions prior to it relate to the structure of the slides to adjust the position of the seats for passenger comfort in the direction of motion of the vehicle.

All the above items of background art relate to sliding seats. None of the above background art related to sliding seats have stated or implied safety considerations. Moreover, none of them provide utility for mounting and dismounting a vehicle except for a bench seat that slides out on either side of the vehicle, or provide comfort features except for seating arrangement on a bench seat and in one of the above—the lateral movement for convenience of the operator.

Maier U.S. Pat. No. 2,148,950 (1939) provides a laterally braced passenger compartment that braces a rigid shell body of a vehicle. Barenyi U.S. Pat. No. 2,710,222 (1955) provides a stiffening for the bottom plate of a vehicle body. Catlin U.S. Pat. No. 5,660,428 (1997) provides a design for a rigid shell structure. Guertler U.S. Pat. No. 5,464,266 (1995) uses stiffening arrangements for the floor of the vehicle as a component of a rigid shell vehicle body. Masuda U.S. Pat. No. 5,671,968 (1968) describes a strengthened rigid shell for the passenger compartment Oliver U.S. Pat. No. 4,533,172 (1985) describes a three part rigid shell structure for motor vehicles with the central section for passengers Sinnhuber U.S. Pat. No. 5,000,509 (1991) describes an arrangement that transfers impact energy from lateral impacts to the rigid body of the vehicle but does so through rigid members that include elements in the seats. The seats have limited lateral movement and are not free to move independent of the vehicle body in the event of a collision, thereby placing the passengers on the direct path of the energy transfer Maeda U.S. Pat. No. 4,512,604 (1985) describes a lateral brace for the seat arrangement of the vehicle within a rigid vehicle body structure thereby distributing the impact energy to other parts of the rigid body structure. Sacco U.S. Pat. No. 5,435,618 (1995) describes a lateral stiffening element that braces the rigid vehicle body in the region of the seats. Bhalsod U.S. Pat. No. 5,716,094 (1998) describes a pusher block that engages the seat in the event of a lateral impact thereby providing a rigid member between the rigid body structure and the seats that can transfer impact energy to the seats.

All of the above items of background art related to bracing a rigid body structure and provide stiffening mechanisms within the rigid shell structure to distribute energy of lateral impact. None of these items of background art provide mechanisms to transfer energy away from passengers in lateral impacts. or provide other safety arrangements or provide utility for mounting and dismounting the vehicle or provide comfort features for passengers in the operating position.

Baber U.S. Pat. No. 5,725,265 (1998) presents airbags for front and rear vehicle bumpers that deploy on impact. Such devices cannot be implemented on the side of the vehicle as a deceleration zone is not available under operating conditions as may be made available in the front and back of the vehicle. Moreover, as this airbag deploys on impact it creates a deceleration zone by pushing its own vehicle away that may actually increase the impulse forces acting on the passengers. Mercier U.S. Pat. No. 3,822,076 (1974) describers similar external front and back airbags and uses probes that protrude from the vehicle at the front and back to deploy the airbags. Such apparatus cannot be installed on the sides of the vehicle, as clearances are small. Stirling U.S. Pat. No. 5,131,703 (1992) describes a fluid filled chamber around the vehicle that will provide a deceleration zone on impact—frontal rear or lateral. However this arrangement requires the deceleration zone to be present during normal operating conditions that will reduce the maneuverability of vehicles if deployed on the sides of the vehicle. Park U.S. Pat. No. 4,995,659 (1991) describes a gas filled chamber deployed around the vehicle. Such a chamber is normally inflated under normal conditions and reduces maneuverability of the vehicle. Campbell U.S. Pat. No. 4,815,777 (1989) describes a bumper that can be deployed selectively by filling with gas. This bumper is effective when extended only. It is not designed to be deployed when the vehicle is in motion, as it will reduce maneuverability. Hartmann U.S. Pat. No. 5,810,427 (1998) describes a mechanism that transfers fluid from one airbag to another on impact. The airbag that is deployed is normally in an extended position to absorb the impact energy and provide the deceleration zone. However, such an extended airbag will reduce the maneuverability of the vehicle. There is a literature ("Extended Bumper and Glass-Plastic glazing methods to reduce intrusion and ejection in severe motor vehicle crashes". C. C. Clark 1993. 26th Symposium on Automotive Technology and Automation. Aachen Germany., "Airbag bumpers inflated just before the crash" C. C. Clark., William A. Young. 1994. SAE Technical Paper 941051., "The crash anticipating extended airbag bumper system". C. C. Clark. 1994. Fourteenth International Technical Conference on the enhanced safety of vehicles. Munich Germany., "Airbags as a means to reduce crash loads and intrusion, and increase intervehicular compatibility." C. C. Clark. 1995. International Conference on Pelvic and Lower extremity injuries-Proceedings Washington DC., Human Transportation Fatalities and Protection against Rear and Side Crash Loads by the Airstop Restraint" Carl Clark and Carl Blechschmidt. 1965. The Ninth Stapp Car Conference.) IDS, and background art on the construction of external airbags including deployment proactively with radar or other devices. This entire literature is limited to the use of proactive external airbags mounted on vehicles with rigid structures that include the passenger. There is no reference in this literature to the proactive detection of impact explicitly or implicitly creating a deceleration zone for passenger protection internally, relative to the vehicle as in the present invention. Moreover, this literature is focused on external airbags for front impact protection with for example rigid penetration buffers to negotiate posts and trees, unlike the present invention which does not prescribe external airbags for front impacts. Furthermore, as this literature describes external airbags without perforation shields their implement ability is questionable as, unlike internal airbags that are in relatively protected environments, impact with external airbags often occurs with objects with sharp points and edges that are likely to perforate the external airbags. The Present invention requires perforation shields for external airbags.

All the above items of background art relate to air bag devices for safety in vehicles. However, none of these references take the integrated approach of the present invention, as more fully explained below, which comprises proactive deployment of both internal and external air bags, together with sliding seat members and other devices. Moreover while the present invention can function even without the deployment of external airbags, either proactive or reactive, taken together these items provide protection for passengers which is more than the sum of the parts. Furthermore, none of the protection airbags disclosed, related to external air bags having protective perforation shields that further enhance their efficacy. Moreover none of these devices provide energy transferring mechanisms away from the passenger in a lateral impact or provide other safety features. Moreover they do not provide any utility features for passengers in mounting and dismounting the vehicle or provide comfort features to the passengers.

Perras U.S. Pat. No. 2,873,122 (1959) which describes an invention where upon a head-on collision the seat projects a curved protector around the passenger designed to protect the passenger. This curved protector retracts into the seat under normal operating conditions. It is not clear how effective such a mechanism will be as the acceleration of the passenger forward relative to the vehicle may precede that of curved protector's release from the seat. Satzinger U.S. Pat. No. 3,961,805 (1976) describes seat belts for frontal collisions that provide safety for vehicles. Such seat belts are in common use. However, they suffer from the drawback that they restrain the body of the passenger in the narrow regions covered by such belts which may cause injury as other parts of the body are not restrained. Moreover such belts are not popular, while in common use as the belts are in constant contact with the body—a factor that is not often relished. Pulling U.S. Pat. No. 3,981,520 (1976) describes an arrangement where that provides passenger movement and protection in frontal impacts. On impact the passenger moves in the vertical plane of motion to a more protected position while side firing airbags provide frontal protection. This system of deployment of airbags for frontal collision protection is similar to other frontal airbag systems. They are necessary as restraining systems during the collision but need to be retracted in conventional passenger compartments to give passengers access to their seats while mounting and dismounting the vehicle. Erickson U.S. Pat. No. 2,777,531 (1957) describes an invention that rotates the seat of the passenger thereby restraining and protecting the passenger on impact taking advantage of the inertia prior to impact to endow the passenger with rotational energy that changes the position of the seat. Such rotation can injure the passenger with impacts at present day passenger vehicle speeds.

All the above items of background art relate to frontal impact protection. None of these items provide a device that is normally deployed during operation, and provides a broad area of restraint across the body for the entire upper body, head and neck, without a need for changing the orientation of the passenger. Moreover none of these items provide any protection for side impacts or provide utility for mounting and dismounting the vehicle or for the comfort of the passengers in the operating position.

SUMMARY

In view of these prior references what would be useful is an arrangement that diverts the impact energy in lateral or side impacts away from the passengers to the remaining mass of the vehicle thereby protecting the passengers, and in the same arrangement provides utilitarian access to the vehicle, such utilitarian access making it possible to both install multi-element contoured surround seats for passengers and the driver, and also a safety device for head-on collision protection that obviates the need for conventional seat belts and front impact airbags. Moreover, it would be useful to have a synergistic structural arrangement for the vehicle that targets strength of the vehicle to protect passengers while minimizing other massive elements in the vehicle.

The present invention includes these objects and advantages.
Objects & Advantages
Some of the objects and advantages of the present invention are, to provide an arrangement that diverts the impact energy in lateral or side impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-à-vis the remaining mass of the vehicle. Furthermore the present invention differs sharply from the Background art in that the resulting structure synergistically permits the installation of contoured multi-element surround seats and a unique safety harness that protects passengers in head-on collisions, both of which may not be implementable without the slide or other moving arrangements for seats on either side of the vehicle in the present invention.

Another object and Advantage of the present invention is the gravity slide drive and a related shock absorbing arrangement relative to the fixed body members of the vehicle ad the terrain traversed by the vehicle, for my arrangement for which there is no counterpart in the Background art. This allows further Utility and weight and energy saving in implementing the above elements of the present invention.

Another Object and Advantage of the present invention includes External side Airbags that differ sharply from the Background art in that for the first time they proactively create a "Just in Time" deceleration zone both for the passenger relative to the vehicle and also for the vehicle relative to the impacting body, for the lateral or side impact while not remaining in an extended position under normal operating conditions of the vehicle.

Another Object and advantage of this invention is a perforation resistant shield for external airbag protection that would reduce the probability of deployment failure. The background art does not provide for this function in externally deploying airbags.

Another object and advantage of the present invention is a indo-skeletal structure of the vehicle body that permits the energy transfer from the lateral or side impact through compressive members to the body of the vehicle. Unlike the Background art this indo-skeletal structure is designed to transfer energy to the body of the vehicle without transferring it to the passengers and driver of the vehicle. The passengers are targeted for protection with "Safety zones".

BRIEF DESCRIPTION OF DRAWINGS

FIG. 1 is an illustration of a front elevation of a seating arrangements in a passenger vehicle. This figure is an illustration of the invention in the normal vehicle operating condition. The impacting body is represented on the left as still distant but advancing towards the above passenger vehicle.

FIG. 2 is an illustration of the same vehicle arrangement as in FIG. 1, except that the impacting object has advanced towards the passenger vehicle adequately to trigger the distance and velocity sensors.

FIG. 3 is an illustration of the same vehicle as in FIGS. 1 and 2, except that the distance and velocity sensors have deployed the external Airbags. They may also provide delayed deployment of the internal Airbags.

FIG. 4 is an illustration of the same vehicle as in FIGS. 1, 2 and 3 except that the impacting object has made impact with deceleration and energy absorption provided by the External airbags and the shock absorbers and resisted by the mass of the vehicle through compression members as noted below. The Passengers and seats are free to move away from the impact on the secondary slides as the internal Airbag deploys, pushing out the Primary slide on the side away from the impact.

FIGS. 1D, 2D, 3D and 4D illustrate an alternative embodiment with the shock absorbers mounted internal to the protector shield.

FIGS. 1B, 2B, 3B and 4B illustrate an alternative embodiment with a center console.

FIGS. 1F, 2F, 3F and 4F illustrate an alternative embodiment with a center console that is crushable and as a result decreases the need for the ejection of the passenger on the further side of the vehicle at impact.

FIG. 5 represents the open position and FIG. 6 represents the closed position.

FIGS. 5A and 6A illustrate an embodiment of the current invention with the protector shield/shock absorbers/external airbag hinging down to support the primary slide. A useful feature for larger vehicles with more than a single seat on each side.

FIG. 7 is an illustration of the Gravity Slide drive at the end of the unload cycle for passengers. FIG. 8 is an illustration of the Gravity slide drive at the beginning of the Load cycle for passengers. FIG. 9 is an illustration of the left side loaded and ready for operation of the vehicle and the right side at the start of the loading operation, emphasizing the independence of the two sides of the Gravity slide drive mechanism.

FIG. 10C is an illustration of a Plan view of the present invention for one side of the vehicle.

FIGS. 10A1, 10B1 are isometric views of an alternative embodiment with a vertical extension/"safety cage" to protect passengers further. FIG. 10C1 is a plan view of the same arrangement.

FIGS. 10D1 to 10D5 represent embodiments with cylindrical slides. FIG. 10D3 shows the extended position for one side of the vehicle and 10D4 shows the impacted position for one side of the vehicle.

FIG. 11. is an illustration of the position of the "Safety Zones" that are targeted for protection with the Protector shields.

FIGS. 12H2, 12I2, 12J2 illustrate an isometric view of another embodiment of the safety harness, in the normal state, with front impact anatomical passive micro air bag deployed, and the head and neck anatomical micro airbags deployed respectively.

FIGS. 17A,B show a schematic diagram of the passive air cushion system disclosed in this invention.

LIST OF REFERENCE NUMBERS

Figure 1C:
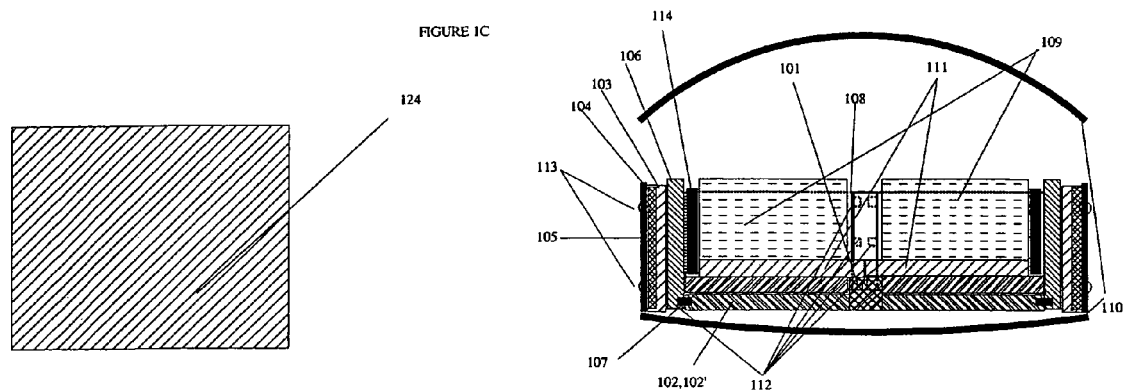
FIGS. 1C, 2C, 3C and 4C illustrate an alternative embodiment that has an auxiliary beam mounted behind the seat with a high section of the central member of the skeletal structure behind the seat to abut the auxiliary beam.

101—Central Member of Indo-skeletal structure
102—Safety Beam Lower Element
103—Side impact shock absorbers
104—External Air Bags
105—Perforation Shields
106—Protector Shields
107—Safety Beam Upper Element
108—Auxiliary Beam. (fixed or sliding)
109—Multi-element contoured passenger seat
110—Vehicle Shell/Body
111—Secondary Slides/Impact decouplers
112—Locking devices
112A—Pivot for Protector shield
113—Proactive Velocity/Distance Detectors
114—Internal side impact airbag
115—Spring device for manual slide
116—Inside door open button
117—outside door open button
118—Beam pivot for Gravity slide drive ejector
119—Safety Harness
120—Support for Safety Harness
121—Bottom of seating surface of the contoured seat
122—Contoured arm rests
123—Child seat attachment
124—Impacting body
125—Vertical extensions/Safety Cage (fixed or sliding)
126—Center console
127—Secondary slide/Center console locks
128—Instrumentation
129—Center airbags-energy absorption/passive head and neck anatomical airbag system
130—Safety Harness Shield
131—Safety Harness—Anatomical passive micro air bag and visco-elastic buffer
132—Safety Harness elbow
133—Safety Harness extending upper arm
134—Safety Harness Pivoting lower arm
135—Safety Harness Head and neck anatomical micro airbags (active or passive)
136—Safety Harness Adjustable Head restraint
137—Safety Harness Hinged support
138—Safety Harness Locking Support
139—Safety Harness passive micro airbag air reservoir
140—Adjustable Hinge support on seat
141—Foot rest
142—Sacrificial chamber 143—Micro air-cushion—displacement function
144—Micro air cushion—support function
145—Valves—air flow/fluid flow
146—protected entity
147—Fluid paths
148—Wheel Chair Conversion—Seat lower cushion and support structure
149—Wheel Chair Conversion—Chair Clamps
150—Wheel Chair Conversion—Chair Cross support
151—Wheel Chair Conversion—Primary Pivot with locks for Rear Wheel retraction
152—Wheel Chair Conversion—Principal Rear Wheel Support
153—Wheel Chair Conversion—Rear Wheel Support strut
154—Wheel Chair Conversion—Secondary Pivot for Rear Wheel retraction
155—Wheel Chair Conversion—Spring loaded locking support Sleeve
156—Wheel Chair Conversion—Seat back
157—Wheel Chair Conversion—Primary Pivot with locks for front wheel
158—Wheel Chair Conversion—Wheel chair back pivot release
159—shadow vertibra—air cell retainer
160—shadow vertibra—lateral tilt return spring
161—shadow vertibra—upper fixed slot for lateral tilt return spring
162—shadow vertibra—support flange
163—shadow vertibra—upper slot for support flange
164—shadow vertibra—left body
165—shadow vertibra—right body
166—shadow vertibra—left upper air cell socket
167—shadow vertibra—right upper air cell socket
168—shadow vertibra—lateral tilt air cell visco elastic damper tube
169—shadow vertibra—lateral support arm connector
170—shadow vertibra—back support adjustable air cushions
171—shadow vertibra—left lower air cell socket
172—shadow vertibra—right lower air cell socket
173 shadow vertibra—lower slot of r support flange
174—lower sliding slot for lateral tilt return spring
175—shadow rib—body
176—shadow rib—adjustable air cushions
177—shadow rib—tilt control connectors
178—shoulder bolster
179—Shoulder bolster adjustable air cushions
180—back support adjustable air cushions
181—Neck lateral support with deploying passive micro air bag
182—Head lateral support arms with deploying passive micro air bag
183—Head rear support adjustable air cushions
184—Neck rear support adjustable air cushions
185—Lumbar support adjustable air cushions
186—Adjustable Hip bolster
187—Adjustable Pelvic support
188—Axial contraction system—Central body tube
189—Axial contraction system—Body extender tube
190—Axial contraction system—front end connector tube
191—Axial contraction system—back end connector tube
192—Axial contraction system—front end
193—Axial contraction system—back end
194—Axial contraction system—front module
195—Axial contraction system—rear module
196—Axial contraction system—front module crank
197—Axial contraction system—rear module crank
198—passenger support platform
199—Elevator beam
200—Propeller
201—dual Elevating modules
202—aligning wheel shock absorber arrangement.
203—Lower Primary slide support with decoupling key that slots into central member
204—shadow vertibra 2—body
205—shadow vertibra 2—slider insert
206—Shadow vertibra 2—body: first support surface for length adjustment spring
207—Shadow vertibra 2—body: second support surface for length adjustment spring
208—shadow vertibra 2—body: aperture for tension cord
209—Shadow vertibra 2—body: aperture for slider insert
210—Shadow vertibra 2—body: slot for adjoining vertibra key
211—Shadow vertibra 2—body: vertibra attachment key
212—Shadow vertibra 2—body: vertibra attachment pin socket 1
213—Shadow vertibra 2—body: vertibra attachment pin socket 2
214—Shadow vertibra 2—body: holes to accommodate spring rods
215—Child or Infant Support Mechanism support (CISM support)
216—Extendable spring/damper loaded attachment for CISM support
217—Inner rotator for CISM support
218—Outer rotator (including attached impact decoupler/secondary slide 111)
219—reserved
220—reserved
221—Bottom seat support flange
222—Back seat support flange
223—Shoulder strap attachment for 3 point belt.
224—Child or Infant support mechanism (CISM)
225—CISM support pivots
226—Lock pin—Internal Airbag equivalents (IAE) with Safety beam lower element
227—Pin slot for lateral impact movement
228—Internal Airbag equivalent shock absorber
229—Slot for housing Internal Airbag Equivalent shock absorbers
230—Pin Hole for registering Lock Pin
231—Support Key—secondary slide to outer rotator
232—CISM Support Bracket
233—Pivotal support for CISM Support Bracket
234—Pivot for Internal Airbag equivalent attached to CISM support bracket
235—Fixed Support for safety beam lower elements and internal airbag equivalents
236—support for secondary slides, CISM support bracket and internal airbag equivalents
237—Support flange between Secondary slide and internal airbag equivalent active ends
238—Internal airbag equivalents—dual movable active end at center
239—Internal Airbag Equivalents—dual movable extremes-expansion/compression.
240—Lock pin hole on dual internal airbag equivalent center support
241—Top lock flanges
242—Side lock flanges
243—Front lock flanges
244—Side support flange 245—Lateral Brace
P101—Compressible Laterally Slidable (when detached) Hip Bolster
P102—Seat Bottom Contoured
P103—Impact Decoupler Secondary Slide Elements
P104—Retraction Slots for secondary slide support rails (rails not shown)
P105—Retraction slots for Secondary slides, retracted at Egress and Ingress
P106—Front side of rear seat
P107—Back of seat bottom
P108—Side bolsters in retracted position for egress and ingress
P109—Crushed side bolsters during impact (does not intrude into hip space)
P110—Side Bolster Air Bags
P111—Shoulder bolster/support—operating position and width
P112—Back rest
P113—Head Rest
P114—Head and Neck air bags (head rest is fixed to backrest so that it moves with back rest on lateral impact)
P115—Body Air Bags to hold and move the body on lateral impact. The airbags are shaped to push the arms out of the way at deployment time.
P116—Crushed shoulder bolster/support (controlled crush)
P117—Back Rest
601—Axial contraction system—first motion control elements
602—Axial contraction system—first shock absorbing elements
603—Axial contraction system—second motion control elements
604—Axial contraction system—second shock absorbing elements
605—Axial contraction system—support to central body tube
606—Axial contraction system—support to Body Extender tube

DETAILED DESCRIPTION OF INVENTION

The present invention provides a passenger vehicle a structure that synergistically incorporates two functions. First, during lateral or side impacts, a means to decouple from impact, and protect passengers while projecting the remaining mass of the vehicle to decelerate the impacting body, and second, utility to passengers and drivers, in mounting and dismounting the vehicle with the comfort of contoured surround seats. The arrangement may in some embodiments use an indo-skeletal beam that allows such embodiments to rely on compressive force transmission to transfer impact energy to the mass of the vehicle rather than shear loads that are required in the shell paradigm of construction in most current passenger vehicles.

The present invention may use Primary and Secondary slides on each side of the vehicle, to meet these objectives. The Primary slide has among other attached devices, a protector shield that bears the impact force in lateral or side impacts. Such protector shields may be hinged out for access if the sliding arrangement is not used. The Primary Slide may engage a central indo-skeletal beam in some embodiments. The Secondary slide is attached among other devices to possibly contoured surround seats. This slide may be activated under impact to guide passengers in their seats away from the impact zone.

The present invention may utilize a Safety Beam in the vicinity of the seats. However, there is an important advance over the Background art in that the Beam does not lock the passengers on the path of the energy transfer, but rather, conducts the energy of impact away from the passenger to the indo-skeletal frame or to the body members of the shell (collectively elements of the fixed body members) and thereby to the mass of the vehicle allowing independent motion of the passengers away from the impact.

The present invention may use proactively fired external airbags which for the first time provide a means to create a "Just in Time" deceleration zone on the side of a vehicle prior to impact but not deployed under normal operating conditions of the vehicle. Notably, Background art for external airbags that are either extended under normal operating conditions of the vehicle or require reactive deployment cannot function effectively, as the former will impede the maneuverability of the vehicle and the latter will not be able to create a deceleration zone in time for the impact.

Overall this invention provides a "bottom up" paradigm for the design of vehicles starting with the human environment and building outwards to the vehicle—in stark contrast to the conventional approach of design that starts with the vehicle and inserts within these constraints, the passenger environment. Moreover, this invention embodies a two level safety system. The first or the primary level is passive and has a negligible probability of failure. The second level is active and predictive or proactive, utilizing advanced technologies. However, complex advanced technology systems have the drawback of higher probabilities of failure. Therefore while the second level can reduce the level of injury in serious crashes, there is a non trivial probability of failure of this secondary system Therefore it is necessary to build a primary system that is good enough in most cases to reduce injury levels in severe crashes. The paper in the Appendix includes simulation results for an embodiment of the primary system alone with a failure of the secondary system.

The following descriptions are for embodiments of the present invention. Deviations from this description in an embodiment is possible without deviating from the present invention.

Preferred Embodiment

Figure 1G:
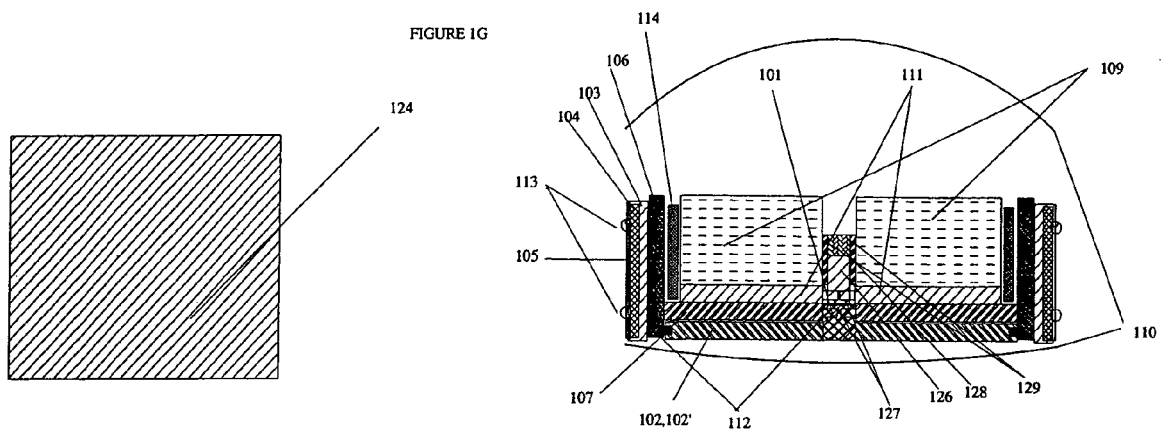
FIGS. 1G, 2G, 3G and 4G illustrate an alternative embodiment with center airbags that are a part of a passive airbag system to protect passengers during lateral impact by absorbing some of the impact energy but more importantly providing a means to inflate head and neck protection airbags and other anatomical micro airbags mounted in the vicinity of the human body. This particular embodiment has a crushable center console as well.

The following is a detailed description of some of the components of this embodiment. The seating arrangement of a passenger vehicle is shown in FIG. 1. The cross section of the central member of the indo-skeletal structure (101) is fixed to the safety beam (102') and the lower primary slide (102). The Protector Shields (106) is firmly attached to the Upper Primary slide (107), which slides on the lower Primary slide (102). (The terms upper and lower being used for the slides to distinguish them and not representing a relative elevation of the slides). The construction of such protector shields would follow that of any impact resisting body panel member of a vehicle, with the usual weight strength tradeoffs. Such construction is well disclosed in the background art. The sliding arrangement may use single element or multiple element direct contact low friction surfaces sliding on one another, roller bearings, ball bearing structures—all of which are well disclosed in the background art. The Protector Shield (106) are designed to cover the required "safety zone" as noted on FIG. 11. The Upper Primary Slide (107) locks into the Central member of the indo-skeletal structure (101) in the operating position with locking devices (112). Such locking devices do not take any additional loads on impact, and may as a result follow the extensive background art for locking devices for example similar mechanisms to those used in automobile door locks. These locks may be activated by the ignition key switch for additional safety while the vehicle is operational. The Protector Shield (106) has attached on the outside a shock absorber (103), which may include external airbags (104). The construction of such shock absorbers follow the background art. Such external airbag (104) are protected from sharp objects on impact by a Perforation Shield (105). These perforation shields protect the external airbag (and the passenger) from sharp objects. The construction of such perforation resisting shields are well disclosed in the background art. Such Perforation shields may be attached by conventional means to the outer surface of the airbag and retained in the normal operating position using techniques used for airbags both internal and external disclosed in the background art. The Air Bag (104) is deployed with distance and velocity sensors (113) mounted on the Perforation shields (105). Distance and velocity sensors are used in other applications and their construction is well disclosed in the background art. The Upper Primary Slide (107), supports the secondary slide/Impact decouplers (111). In this embodiment this is firmly attached to the Upper Primary Slide until the impact when it is decoupled to slide away from the impact. The Secondary slide arrangement may use a friction based approach, or other approach, all of which are well disclosed in the background art. This embodiment has contoured surround Passenger Seats (109) that are mounted on the Secondary slides (111). These seats have internal Airbags (114) that deploy on impact and may "unfurl" upwards to protect the head or upper body as well. The construction of seat adjustment mechanisms are well disclosed in the background art. This Figure shows the impacting object on the left approaching the vehicle, but too distant to trigger any action.

Figure 2C:
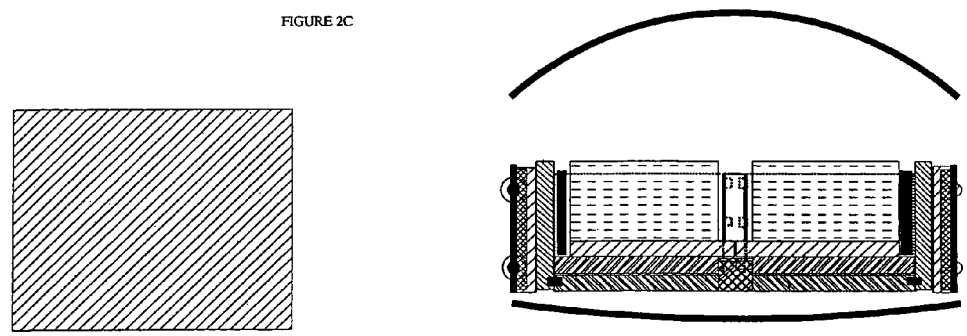
Figure 3C:
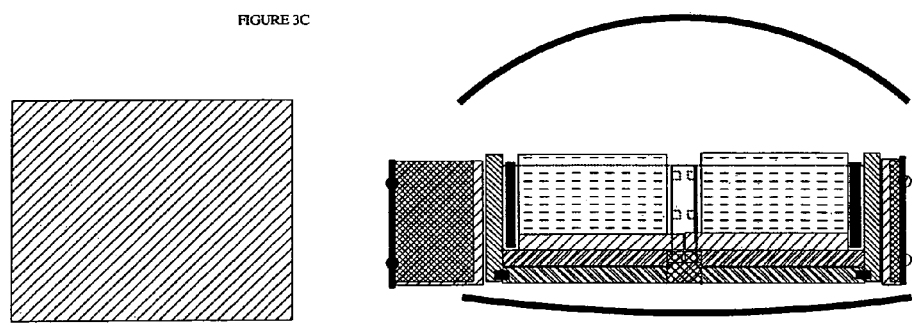
Figure 2G:
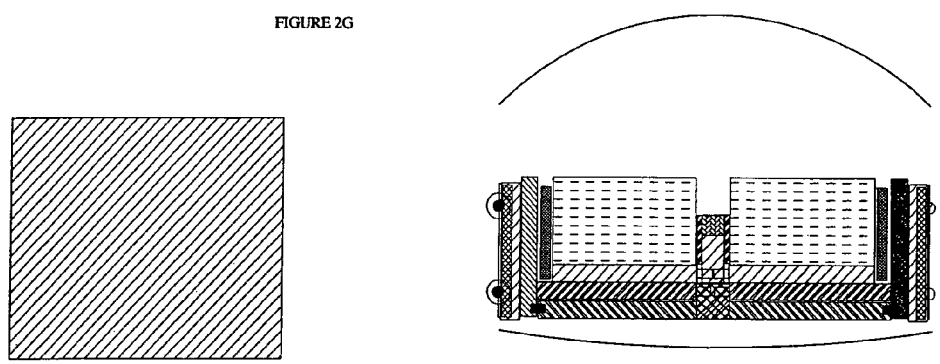
Figure 3G:
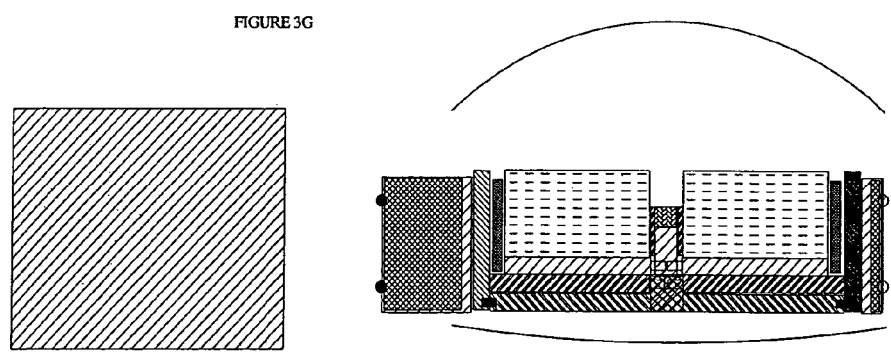

In FIG. 2, the impacting object has moved to a position that can now trigger the distance and velocity sensors (113). These sensors trigger the deployment of the External Airbags (104), and the shock absorbers (103). The internal airbags (114) may be triggered by conventional means disclosed in the prior art, explicitly or implicitly reacting to proactive or reactive impact detection. The internal air bags are designed to move the passengers and the passenger seats to the extent necessary through a Motion Space to a Safe Position on primary impact detection, and thereafter protect the protected entity—the passenger and the seat. Thereafter as illustrated in FIG. 3, the External Airbags (104) and shock absorbers (103) deploy to provide the required deceleration zone for the impact. As a result on impact the energy of impact is partially absorbed by the External Air bag (104) and the Shock Absorber (103) and the remaining energy transferred to the massive components of the vehicle through the Protector Shield (106), the Upper and Lower Primary Slide/Safety Beam (107, 102, 102') to the Central element of the Indo-skeletal frame (101) and the body of the vehicle. Notably, the Secondary slides (111) decouple and slide the passenger seats (109) with the passengers away outside the path of the impact forces and protected by the internal Airbag (114). The Upper Primary Slide (107) on the side of the vehicle away from the impact is free to slide out with all devices mounted on it to provide a path for the secondary slide (111) and the seats (109). In this situation it may be seen that the Upper Primary slide works as an impact-resisting beam on the side of the impact and a release and support mechanism on the side away from the impact. FIG. 15A illustrates the side impact with the deployed internal and external airbags, and the displaced passengers away from the impact in the vehicle sustaining the lateral impact. FIG. 15B illustrates the frontal impact support for the passenger on the right hand side. The Left hand passenger is shown in the normal position for comparison.

Figure 14:
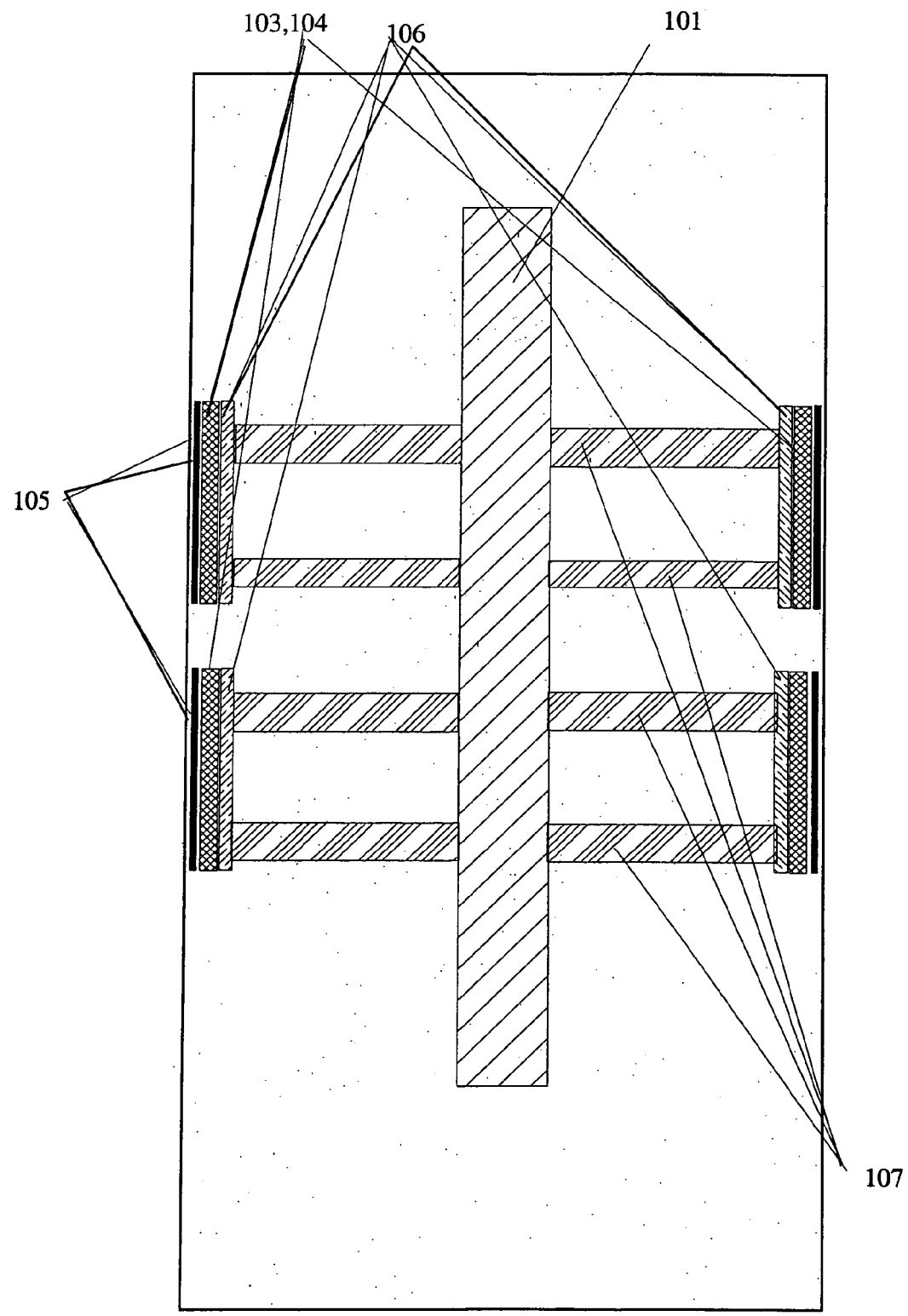
FIG. 14 illustrates a horizontal cross section of an embodiment of the present invention at the level of the upper primary slides.

FIG. 14 illustrates a horizontal cross section of the embodiment at the height of the upper primary slides (107). The central member of the indo-skeletal structure (101) is flanked by the upper primary slides (107) abutting the central member, with the protector shields (106) and the shock absorbers that include the external airbags (103,104) at the outer end of the upper primary slides. The perforation shields are shown at the outer extreme of the shock absorbers and airbags. In this embodiment there are two sets of upper primary slides on each side of the vehicle that can support two rows of seats (front and rear) one on each side with its own protection with the protection shields and shock absorbing devices.

Figure 6:
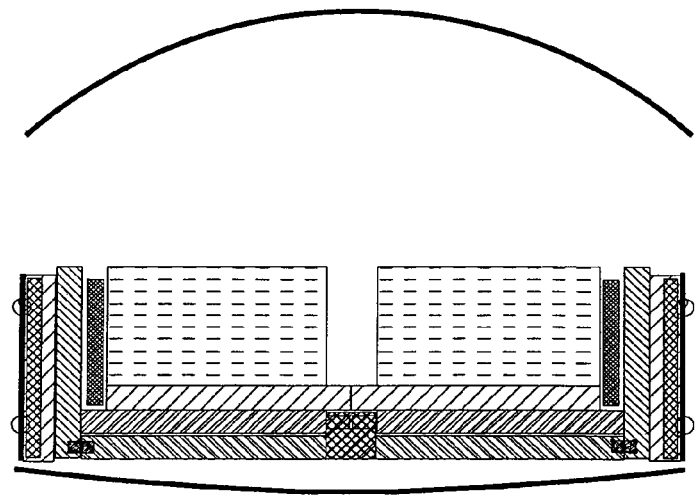
Figure 10A:
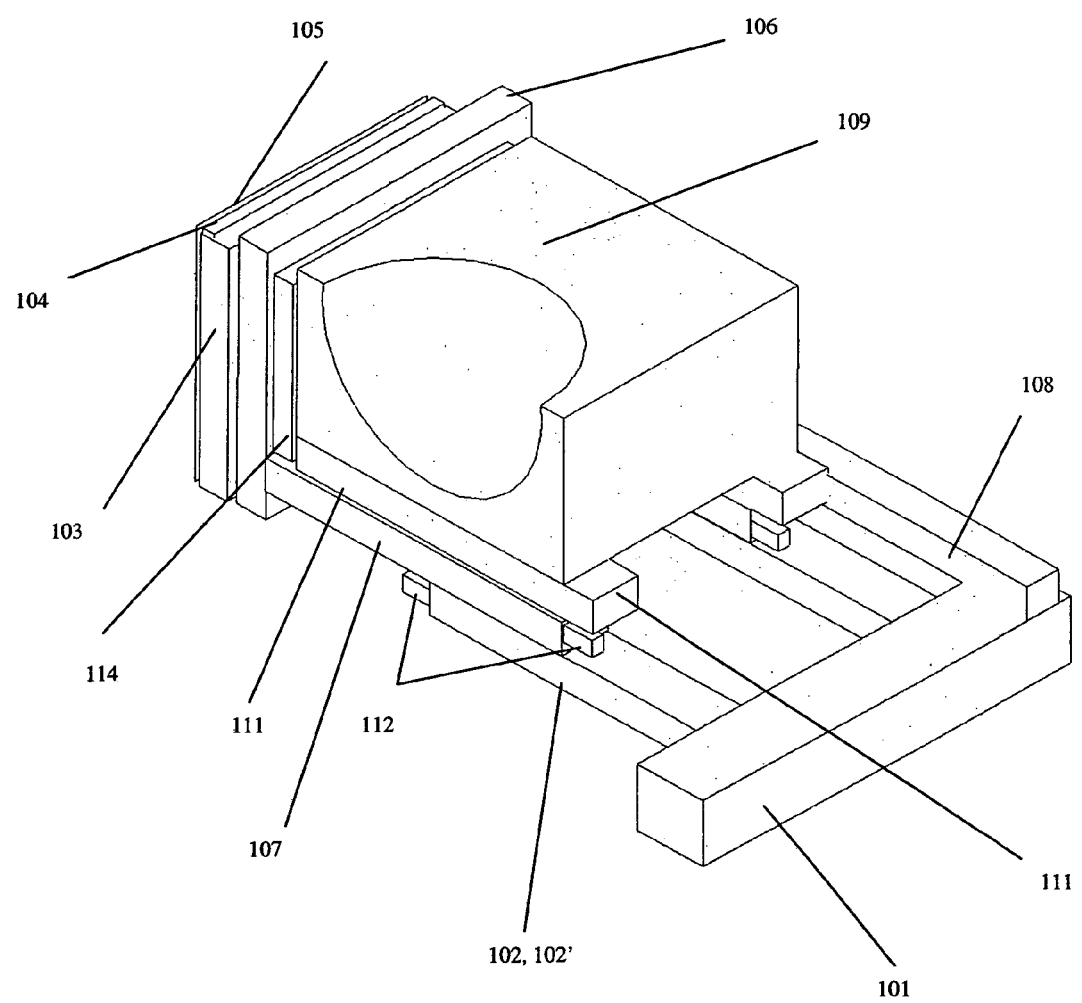
FIGS. 10A and B are an illustration of Isometric views of the present invention on one side of the vehicle for clarity.
Figure 10:
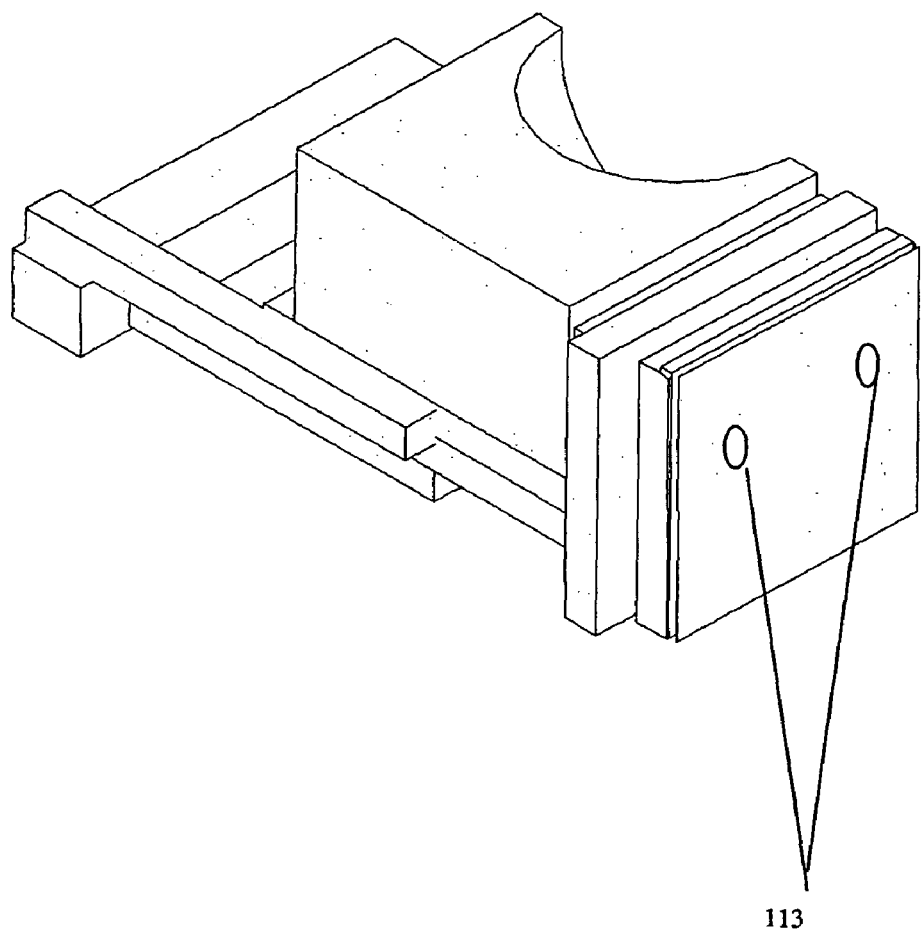
Figure 10:
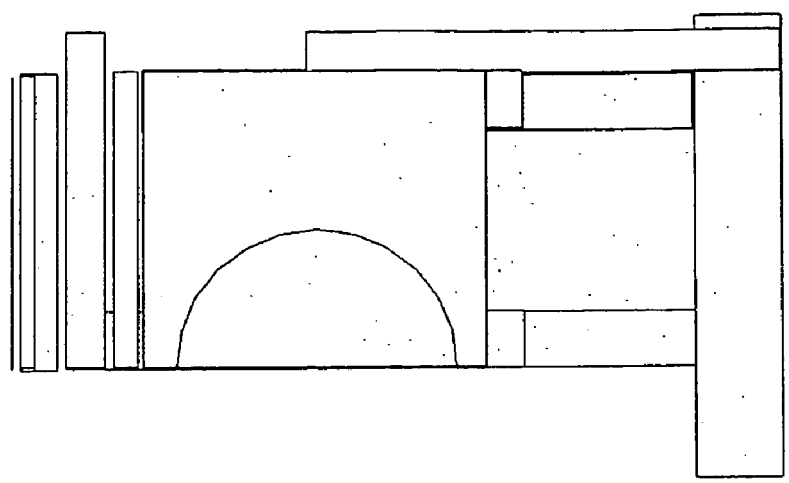
Figure 10:
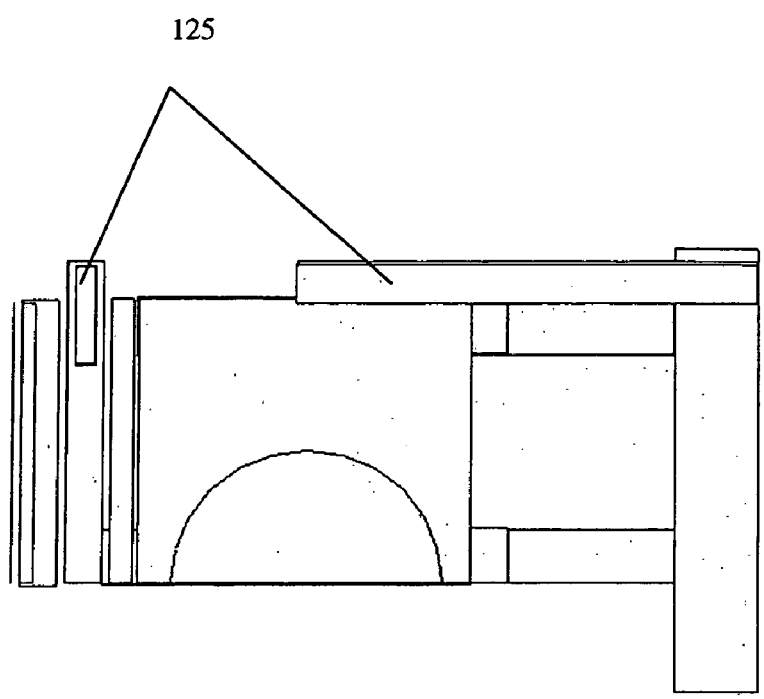

An auxiliary slide beam structure (108) (as illustrated in FIGS. 10A, 10B and 10C) may be attached to the central member of the Indo-skeletal beam (101) and locked into the protector shield when the vehicle is ready for operation, or be attached to the protector shield and slide out with the Upper Primary Slide (7), and get locked to the central member of the Indo-skeletal structure (1) in the operating position Means for access for passengers in this embodiment as illustrated in FIGS. 5, 6, 10A, 10B and 10C. The seat (109) and secondary slide (111), slide out on the upper Primary Slide (107) to a position that lets the seat (109) protrude from the vehicle such that the passenger may simply stand in front of the seat and sit down on the seat (109). Thereafter the seat (109) is retracted on the Primary slide to the position as depicted in FIG. 6, where the Upper Primary slide (107) is locked with the locking devices (112) in position for operation of the vehicle. The slide drive mechanism may be powered using approaches well disclosed in the background art such as servos, and pneumatic or hydraulic systems. The vehicle while in operation should have the Upper Primary Slide (107) retracted and locked. The ignition lock is used in this embodiment to ensure this practice.

While extended, the clearance on the side of the vehicle for the Easy Ejector will usually be in the range of about 20 inches to 30 inches. This could be substantially less than the clearance required for opening a conventional car door. This is particularly useful for parking in areas with limited clearance.

Figure 12:
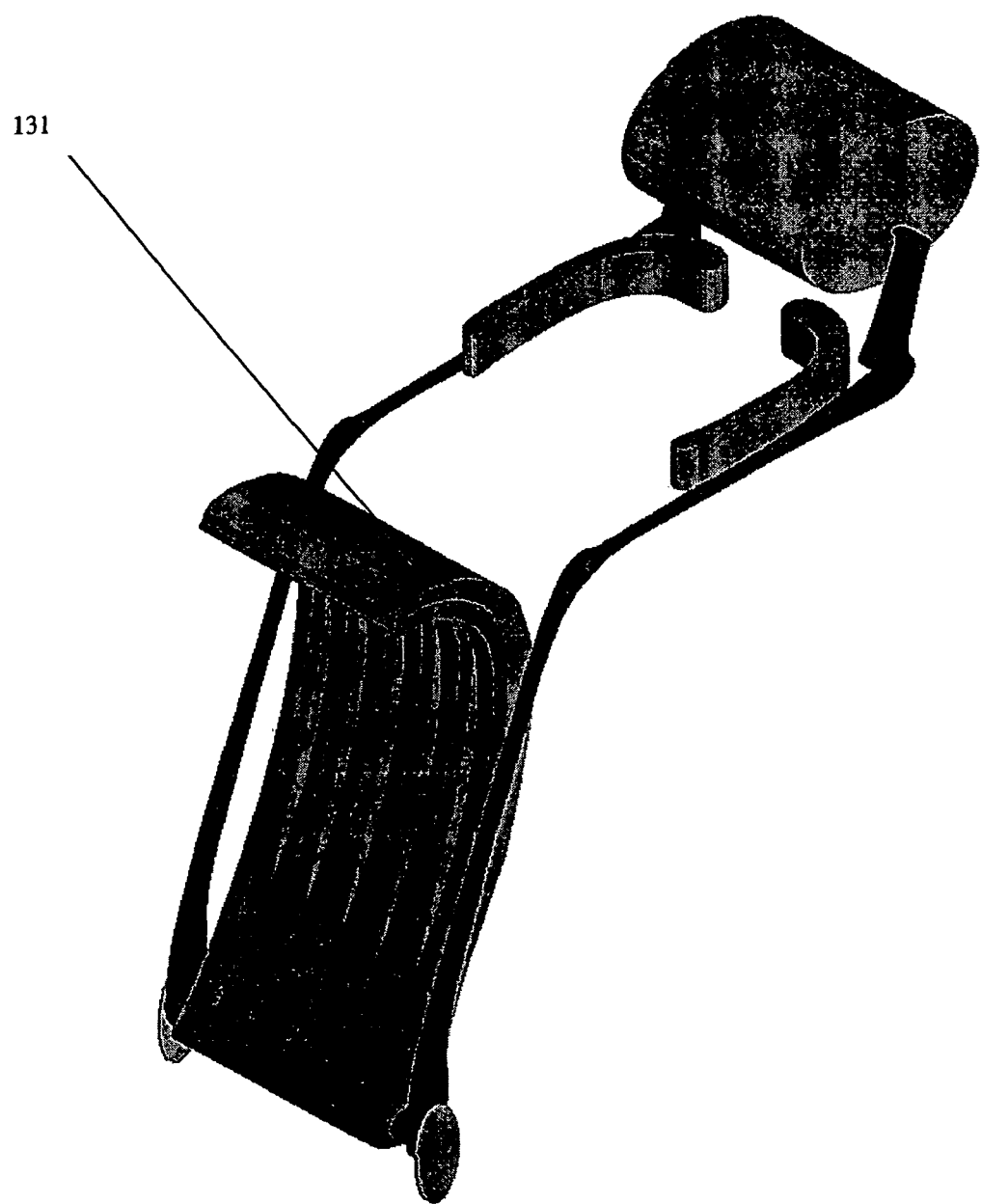
Figure 12:
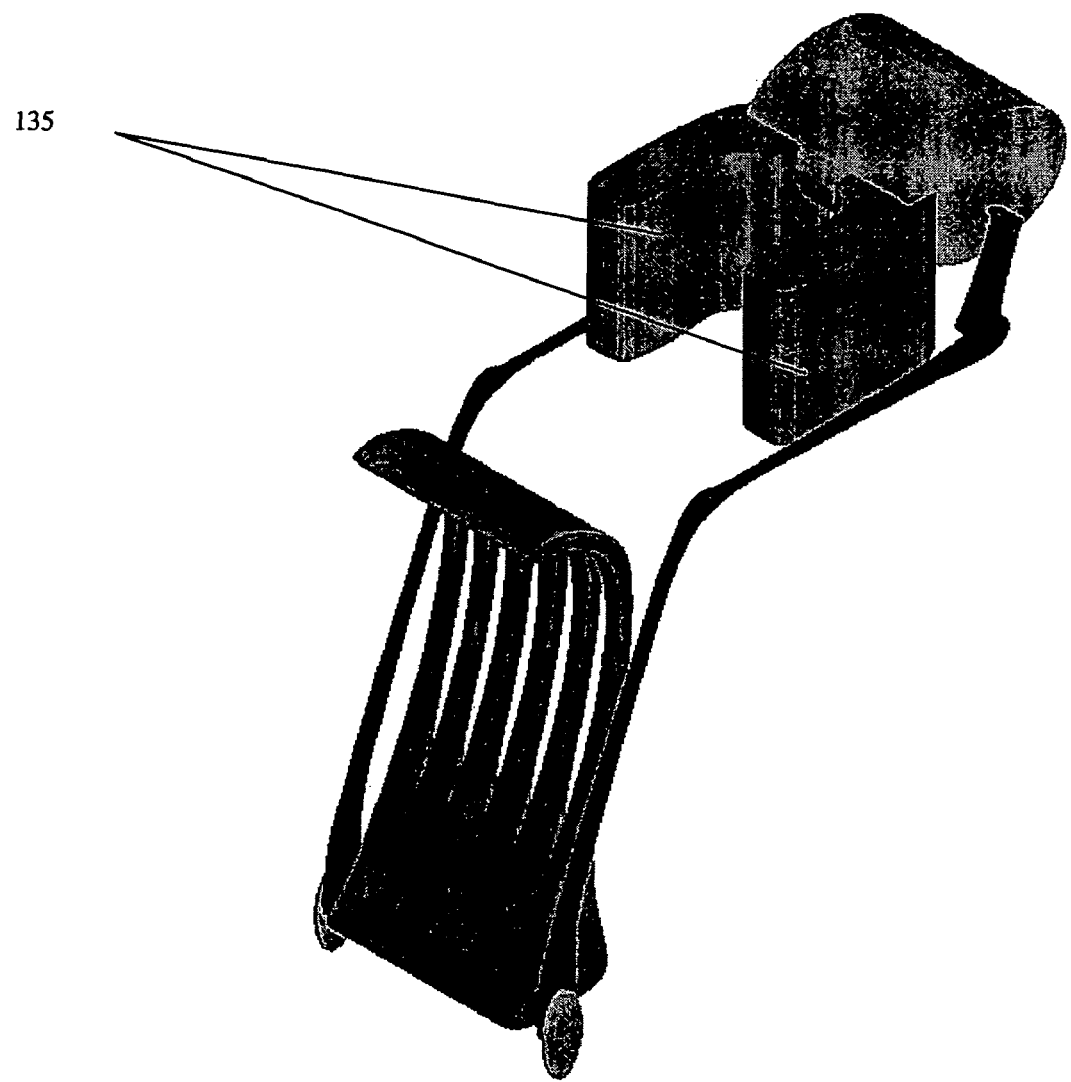
Figure 13:
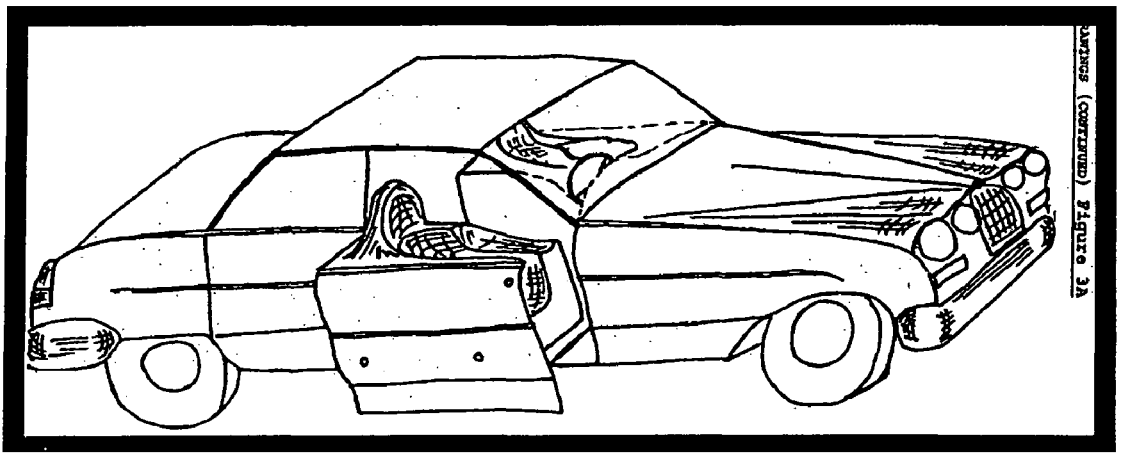
FIG. 13. is an illustration of a drawing of isometric view of the present invention.

FIGS. 12A, 12B and 12C illustrates the detail of the seat (109). The seat (109) may be constructed with customizable multi-elements that conform to the desired shape and provide the desired support for the passenger. Such adjustments may be effected using conventional seat control devices. In this figure the Safety Harness (119) is secured to the sides of the contoured seat (109) between the arm rests (122). The safety harness (119) may be designed to protect the passenger in head-on collisions by providing a soft barrier in close proximity to the body but not necessarily touching the body. This arrangement may be preferred to seat belts that do not provide the extended surface area that the harness (119) provides and as result provides greater impact resistance for the same level of limiting forces that the body can withstand. Moreover, this arrangement may obviate the need for a front collision airbag as the harness (119) may be high enough to support the face and neck under collision conditions. The harness may be constructed of pliable but semi-rigid material (such as high strength nylon) to provide support in a head on collision. A natural benefit of the arrangement of the harness (119) and its supports (120) is that lateral forces on the seat are also braced by the harness support (120) in the operating position. FIGS. 12F2 and 12G2 illustrate an embodiment of the harness. Moreover the seat (109) may be constructed with reinforcing on the sides to further protect the passenger from crush injuries. The Seating surface (121) is illustrated in the same figure as are the arm rests (122). In conventional vehicle seat designs the door surface provides the only support on the external side surface which are usually limited to arm rests. This seat (109) provides surround support for the passenger particularly desirable on winding roads. The "Custom contoured seats" customized for each passenger may be created with a multi-element adjustable structure (manually with inserts or with computer controlled elements) that provide ergonomic passenger comfort providing where desired, lateral support in addition to the support that conventional seats provide, to cradle the entire lower body in the ejector seat. Similarly child seats (123) as in FIG. 12D1, may be designed to protect children. Such seats can be inserted into the seat (109). The Safety harness may also have an attachment for providing greater support for infants and small children.

Additional Embodiments

Figure 7:
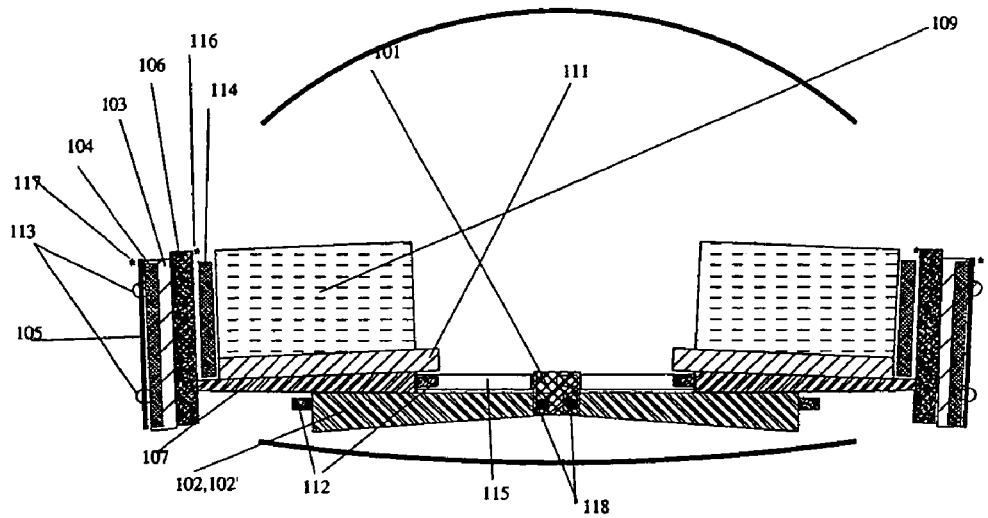
FIGS. 7-9 is an illustration of the Gravity slide drive that may be embodied in the invention.
Figure 8:
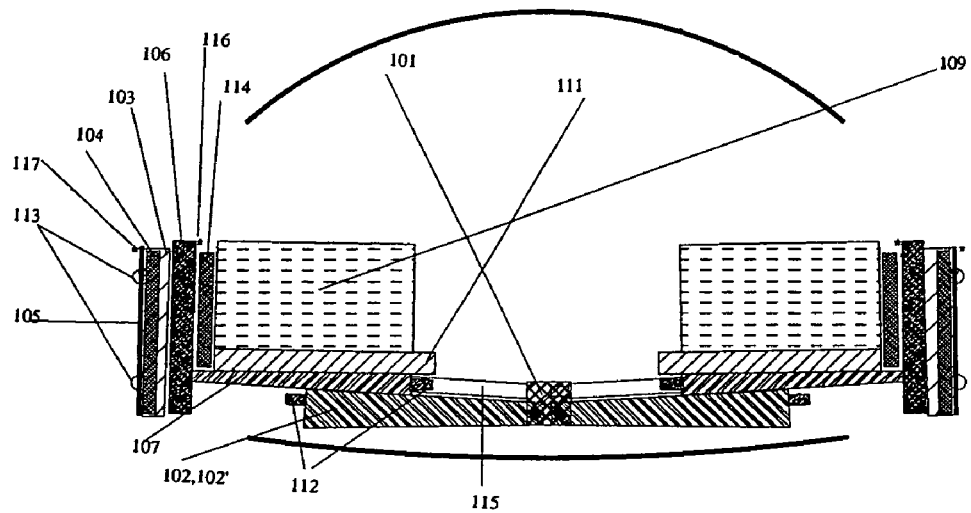
Figure 9:
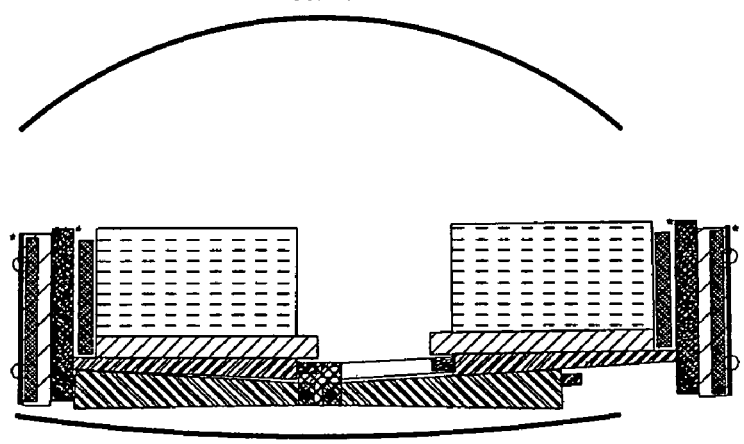

While the above embodiment uses a power slide drive, this embodiment differs in that a gravity slide drive is employed to move the slides for mounting the vehicle. FIGS. 7, 8 and 9 describe this arrangement. This embodiment differs in the preferred embodiment above in that the Lower Primary slide/safety Beam (102, 102') are pivoted at the Central member of the indo-skeletal structure with pivots (118). As shown in FIG. 7, this allows the lower slide to fall to a lower of two positions, that inclines the upper surface of the Lower Primary slide (102) adequately to allow the upper Primary slide (107) to slide outwards to the loading position assisted by the weight of a passenger in the seat and the additional assistance of the Spring arrangement (115). The passenger may dismount from the vehicle when the slide is fully extended as shown in FIG. 7. Each side of the vehicle has independent slides and may be operated by passengers independently.

When the passenger dismounts from the seat the Upper Primary slide (107) in its extended position moves to the higher of two positions about the Pivot (118) as illustrated in FIG. 8. This move inclines the Upper surface of the Lower Primary slide adequately to allow the weight of a passenger to work against the spring arrangement (115) and move the slide to the operating position. This move up of the Lower Primary Slide (107) may be effected by mechanisms well disclosed in the background art. The Slide as depicted in FIG. 8, is now ready for a new Passengers to mount. When the passenger sits on the seat (109), the weight of the passenger works against the spring mechanism (115) to move the slide to the operating position as depicted on the left hand side of the FIG. 9 and lock the slide in the operating position. The Upper Primary Slide may be unlocked by the passenger by depressing the Inside Door Open Button (116). Activating this button in addition allows the lower primary slide (102) to move and be locked to the loading inclination—the lower of two positions, and the Upper Primary Slide (107) is free to slide out with the passenger. At this point the arrangement has completed a full cycle and is in the position depicted in FIG. 7.

The above cycle represents operation of the Gravity Slide Drive when there is a passenger in the seat (109) when the Slide moves to and from the operating position as on the left of FIG. 9. When a passenger dismounts however, and the Slide arrangement needs to be retracted without a passenger in the seat, the weight of the passenger is no longer available for aiding the motion of the slide to the operating position, and the slide must be pushed in against the action of the Spring Arrangement (115) and locked in place at the operating position. When a new Passenger wishes to mount the vehicle, he/she will press the Outside Door Open Button (117) which releases the catch that holds the Upper Primary Slide beam in place but does not affect the movement of the Lower Primary Slide (102) about its pivot (118). The seat as a result slides out on the Upper Primary Slide assisted by the Spring arrangement (115) to the position for mounting the vehicle as depicted in FIG. 7. The spring arrangement (115) is designed to be such that it provides a force just adequate to move the Upper Primary Slide out with no passenger in the seat.

Some alternative embodiments may have multiple positions for the inclinations of the safety beams from the center of the vehicle, in the loading position to accommodate the varying road inclinations that may make a single inclination of the safety beam in the loading position inadequate. In such an embodiment the operator will have the facility to switch to the best loading inclination dependant on the inclination of the road. This will overcome some of the disadvantages of regular car doors on steep hills. Moreover, this arrangement can also function as a shock absorbing device for the comfort of the passengers in vehicles under operating conditions. A possible embodiment to achieve this can have a range of angular inclinations for the operating position, the range being set so that the transfer of the compressive load on impact through to the fixed body members of the vehicle or the central beam is achieved. The Safety beams are spring or shock absorber mounted in a vertical plane relative to the central beam and the fixed body members of the vehicle. When a bump in the road is encountered the safety beams pivot on the center and swing higher at the center thereby isolating the passenger from the road.

Figure 19:
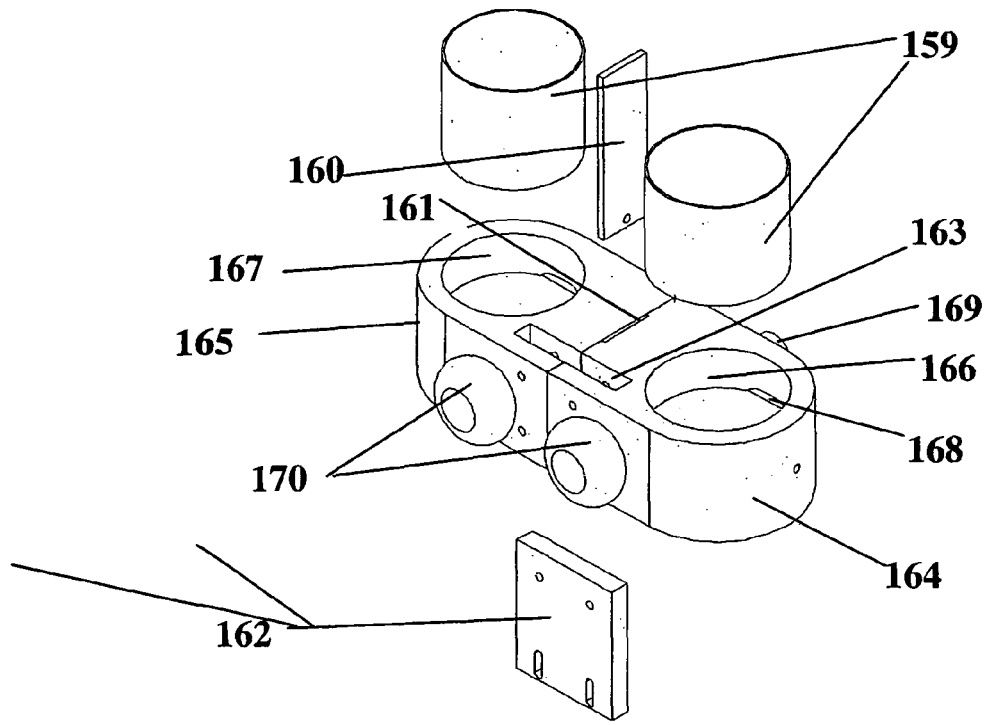
FIGS. 19A-E show an embodiment of the customizable contoured multi—element seat.
Figure 19:
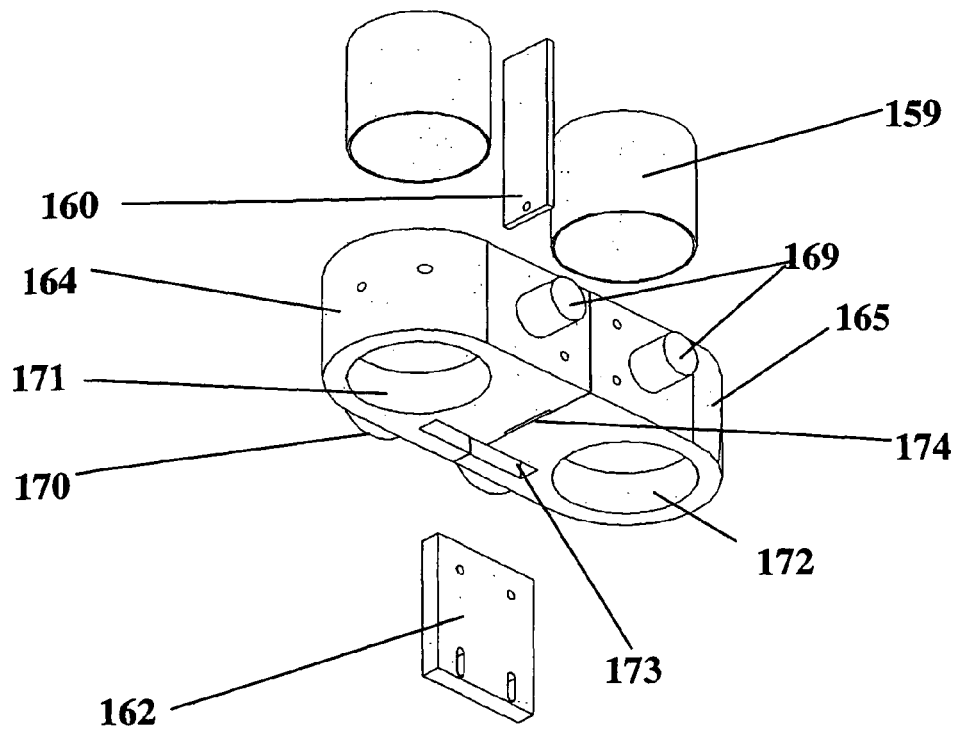
Figure 19:
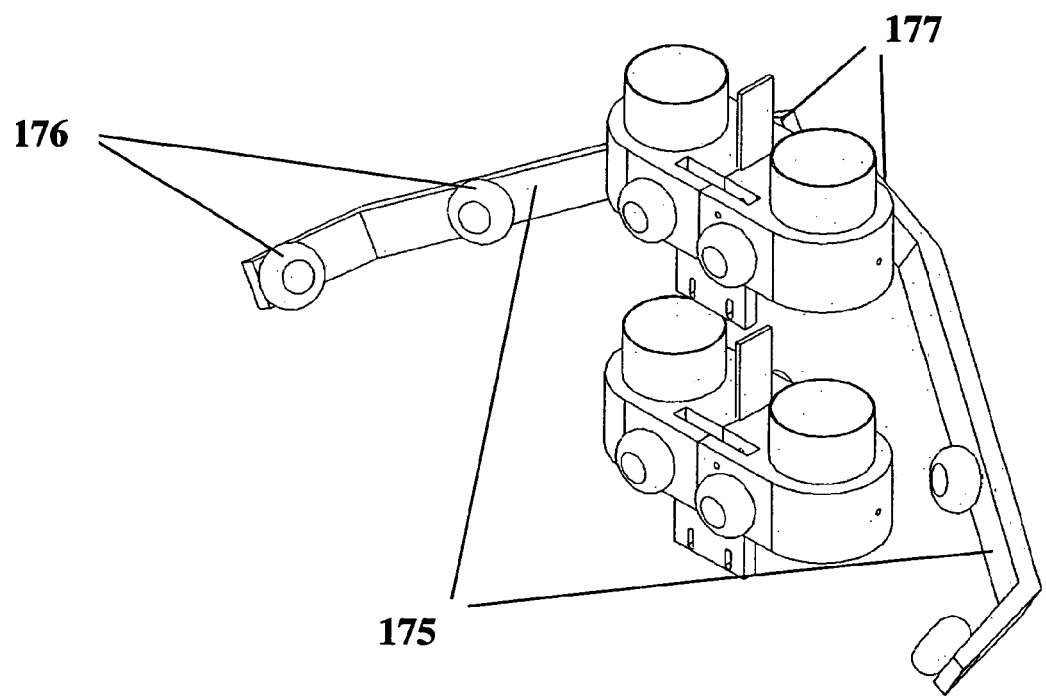
Figure 19:
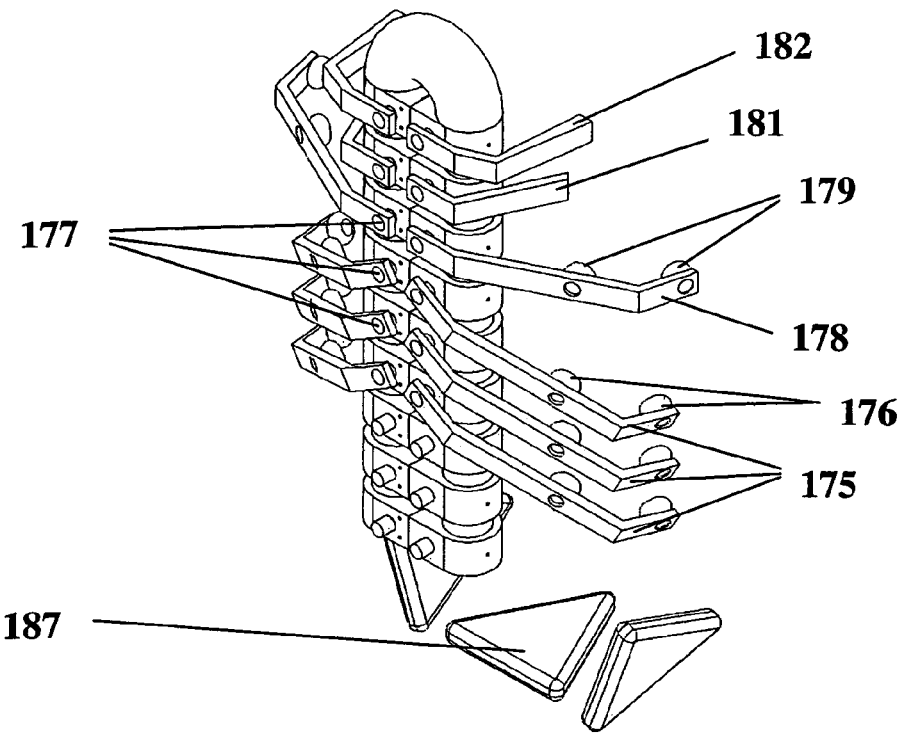
Figure 19:
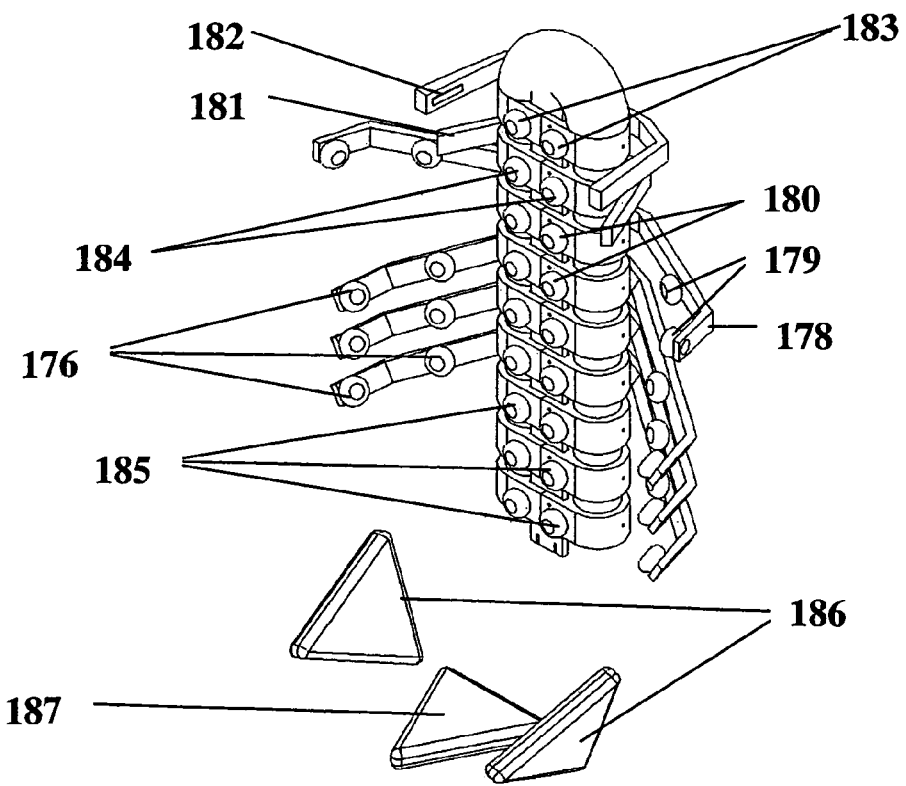

Some embodiments of the multi-element contoured seats may have a structure that provides anatomically accurate support for the body as illustrated in FIGS. 19 A,B,C,D and E. This seat architecture may be used in a wide variety of application s outside vehicles as well. Conventional car seats are a set of two or possibly three rigid structures—the seat bottom, the back and the head rest. These have some mobility for comfort. However there are two factors that militate against their comfort and the level of protective support they can provide in collision situations. First, one size must fit all passengers and drivers. The mobility provided for the seat bottom, seat back and head rest provide limited flexibility for passengers of different sizes. Second, there is little lateral support for the body that could be vital in a side collision, and third, in a vehicle in motion on a rough surface, the shock absorption provided to all parts of the upper body is the same.—the seat back is rigid once set up by the passenger—this stands in contrast with the internal shock absorption of the human body, where the spine provides differential shock absorption to different parts of the body, increasing the shock absorption towards the head. This last factor implies that conventional seat backs cannot remove vibrations from both the top and the bottom of the upper body as the body's own shock absorption system will move differentially to the seat back along the length of the spine. The embodiments of this invention illustrated in FIGS. 19, improve these characteristics of seats.

FIGS. 19A and B show two view of a shadow vertibra of the seat. The design of this vertibra is to provide auxiliary support for the body. The structure shown is one of several possible structures for embodiments of this invention. The body of the vertibra in this embodiment is split into a left body (164) and a right body (165) these elements are permanently bonded or fixed together by bolts. The body has two cavities on each of the top and the bottom surface—the air cell sockets. These hold two air cells on the left and the right side. These air cells are supported on the sides by the air cell retainers (159) that slide in and out of the air cell sockets (166, 167, 171, 172). The air cells them selves are made of a pliable and inflatable material, or alternatively a material that can fold within the cell supports. Each pair of air cells are separately inflatable by a multi channel air pump that is installed in the seat embodiment. There is a connecting tube between the left and the right air cells housed in the lateral tilt air cell visco-elastic damper tube. This tube allows limited air flow between the left and the right chambers to permit lateral tilting of the vertebrae relative to each other. This motion hover is corrected by the lateral tilt return spring (160) that ensures that in the normal position the vertebrae are aligned vertically. This lateral tilt return spring is fixed on one end to a vertibra in the upper fixed slot for lateral tilt return spring (161) and can slide within the next vertibra in the lower sliding slot for lateral tilt return spring (174).Orthogonal support is provided between the vertebrae with the support flange (162) that is fixed at one end in the lower slot for the support flange (173) and is slidably mounted in the adjoining vertibra's upper slot for support flange (163). The flange is sized to allow limited lateral tilting as the vertibra tilts laterally, but provides firm back support. Notably the upper and lower slots for the support flange may be inclined slightly so as to take the form of the human spine. The body contact is made on the back with the back support adjustable air cushions (170), which in most embodiments are contoured to the shape of the bode and is illustrated as an ellipsoid for clarity. These air cushions are inflatable and the pressure may be adjusted to the comfort of the passenger. There may be a spring loaded cable that is threaded through the vertebrae to tie them together. The spring loading will work against the air cell pressure as the gets elongated with higher air cell pressure. Ideally there can be as many of the shadow vertebrae as vertebrae in the human body although some embodiments may choose some economy in the number of such shadow vertebrae. FIG. 19C illustrates two adjoining shadow vertebrae. One of these are for supporting the thorax region and therefore have attached the shadow rib body (175) and the related shadow rib adjustable air cushions (176) (shown as ellipsoids for clarity but in most embodiments will be contoured to take the shape of the body. These air cushions are inflatable for passenger comfort. The air supply being led to the cushions along the rib body and down the shadow spine to the multiple channel control air pump which also supplies air pressure of each of the many air cushions and air cells in the seat embodiment. The shadow ribs are supported by the tilt control connectors(177) that may adjust the angle of the shadow ribs. FIGS. 19D and E illustrate one possible version of this embodiment. Here the shadow vertebrae are stacked up to provide support for the head the neck the shoulders, the thorax and the lumbar region. The head rear support adjustable air cushions (183) provide forward support for the head while the Head lateral support arms with deploying passive air bag (182) provides lateral support particularly during side collisions with deploying passive micro airbags. Similarly the neck has rear support from neck rear support adjustable air cushions (184) and lateral support from Neck lateral support with deploying passive micro air bag (181). The shoulders are supported by the shoulder bolster (178) and the shoulder bolster adjustable cushions (179). The shoulder bolster being pivotally attached to a vertibra of the shadow spine and allowed limited pivotal motion vertically to allow the passenger to move his/her upper arms upwards at normal speed. However, the shoulder bolster will resist rapid motion of the upper arms and shoulders as in a collision thereby supporting the passenger. This differential movement characteristics can be achieved by approaches well disclosed in the background including viscous loading of the coupling. Lumbar support is provided by the Lumbar support adjustable air cushions (185). The entire array of the shadow vertebrae may be elongated and contracted by changing the pressure in the air cells thereby providing the optimal sizing for all heights of passengers. The lateral support and back support cushions may be inflated to provide width control and support for passengers of different shapes. Adjustable hip bolsters provide lateral and forward support while the adjustable pelvic support (187) provides vertical support for the passenger. The illustrations exclude the leg and arm supports that are part of the embodiment for sake of clarity. Spring supports can substitute for the air cells in the vertebrae but will not have the advantage of viscous lateral resistance and independent height control. Overall height can however be controlled with the cable threaded through the vertebrae. Motion control of the seat elements can be achieved with devices well disclosed in the background art including servos, and pneumatic and hydraulic systems.

Considering the complexity of the seat systems including the multi channel inflators for each of the air cells and the air cushions along with the mechanical controls for inclining the shadow ribs and the pelvic and hip supports, it would normally be necessary to use a closed loop feedback with computer control. Pressure sensing of each air filled device will provide feedback on the resistant force o the human body and therefore firmness of the support. This information can be used to provide the firmness control desired by the passenger. One computer controlled scheme could be where the passenger inputs gender weight, and height and the computer alters the size of the seat by inflating and deflating air cells and cushions accordingly and the provides several alternative configurations that the customer can select. The customer can then customize firmness and variations on the seat presets.

Finally the shoulder bolsters and shadow ribs may have deploying micro aircushions that hold the passenger in the event of a collision.

Yet another computer control scheme for the seats has a "learn" mode" and a "save" mode for the computer control. When the computer control is set to the learn mode the feedback system observations are used to learn the user's preferred positions. Thereafter when in the save mode the seat is set to this position. As an additional enhancement the seat control can be voice activated to allow the user to "tell" the seat to be either in the learn or save modes.

Another embodiment of the multi element contoured seat that provides anatomically accurate support for the body comprises a shadow spine that is made up in part by an array of interlocking vertibra bodies as in 204 that are each connected to body support members that may be shadow ribs or other support members for the human body as described herein. The size of each vertibra may be scaled to accommodate the force considerations encountered by the vertibra during crash conditions. Therefore many embodiments will have larger vertibra at the lower end of the shadow spine and smaller vertibra at the top of the spine. Each of the interlocking vertibra bodies have a slider insert 205 that has a hole to accommodate the vertibra attachment pin. The slider moves within the housing on the vertibra body to allow extension and contraction in the effective length of each vertibra. The movement in the position of the hole is accommodated by the slot in the vertibra body. Adjoining vertibra are joined by a pin that is fitted into the vertibra attachment pin socket-1 in the slider insert 213 and the vertibra attachment pin socket-2 212 on the adjoining vertibra. On assembly of the string of such vertibra there will be limited pivotal movement possible laterally as the pin holes 212 rotate relative to the pin holes 213. Such movement may be limited with the shape of the vertibra attachment key 211 and the slot for adjoining vertibra key 210. And further controlled by springs to described below. Each of the vertebrae in the shadow spine may have an angled pin hole 212 along with orthogonal surfaces of the key 211 so that the position of each of the vertebrae reflect the required curvature of the shadow spine to accommodate the passenger spine curvature. Notably the arrangements for contraction and extension of the chain of vertebrae will allow for different sized passengers. The vertibra at the bottom of the string is connected to the lower part of the seat with a slot arrangement that fits the key on the vertibra or alternatively if the vertibra are oriented to have their keys above their slots, the lower seat will have a key to accommodate the slot on the lowest vertibra. The vertibra may extend to support the head and neck. The number and length of vertebrae will depend on the balance between the larger cost of a large number of vertebrae and the value in accurate support with a shadow vertibra for each vertibra of the passenger and one for the head of the passenger. The shadow spine also comprises two chords of high tensile strength possibly of stranded steel, that are rigidly connected to the aperture for tension chord 208 of the top vertibra, and are each threaded through the apertures for tension chords 208, one on each side of the vertebrae along the length of the shadow spine. Springs are interspersed between the vertibra to surround each of the chords one on each side of each vertibra, to separate the vertebrae when there is no tension in the chord and to extend the shadow spine by forcing the slider insert 205 to slide outwards to the extent possible. The two tension chords are threaded through holes in a mounting members of the shadow spine located near the lower seat, and attached to a mechanism that can loosen and tighten each of the two chords concurrently by the same amount, thereby forcing each of the springs to compress and allow a contraction of each of the vertebrae of the shadow spine. This arrangement allows adjustment of the seat back to the size of height of the passenger or operator. The characteristics of each of the pairs of springs on each of the vertebrae can be adjusted to compress by different amounts, the vertebrae at different levels of the shadow spine to reflect the relative variations in size of different vertebrae of tall and short people. In the event of a side collision, one of the tension chords will remain in tension while the other may slacken by compressing further the springs on its side caused by the lateral force allowing limited lateral movement and bending of the shadow spine, thereby limiting the peak accelerations that are encountered by the upper body head and neck. The entire shadow spine assembly will have some controlled flexibility by design for forward and backward movement for protection of the passenger in a rear or front collision. There will also be attachment points for seat belts or safety shields on one or more of the vertebrae.

A further refinement of this embodiment of the shadow spine in the multi-element contoured seat as in FIG. 19H, has additional apertures 214 on each side of each vertibra, to accommodate a spring rod on each side of the shadow spine. The spring rod will be threaded through the aperture 214 in FIG. 19H and each attached at only one end either at the top or the bottom. The sizing and surface treatment of the aperture 214 will allow some lateral bending of the spring rod, and allow sliding of the spring rod. On lateral impact the spring rods will resist lateral movement and supplement the force of the springs in compression around the tension chord. Moreover, in rear impact and front impact collisions they will supplement forward and backward bending of the shadow spine and as a result the upper body of the passenger or operator. Notably the cross section of the rods may be adjusted in the lateral direction relative to the forward-backward direction to modify the relative resistive force that it applies in lateral impacts versus forward and back impact.

Yet another variation of this embodiment discharges the air in the adjustable air cushions when passengers leave the seats, and then reinflate these aircushions when the new passenger sits down with air that is preheated or precooled to the preferred temperature of the passenger. Thereafter the air cushions will provide insulation at that temperature for the seating surface.

Yet another embodiment of the multi element seat has a back and head/neck support that is supported by concentric tubes that fit within each other and can slide within each other. The longest and narrowest of these tubes supports the head rest. The tube next in length and wider, supports the neck rest, the tube next in length and still wider supports the thorax (there may also be a tube that supports the shoulders at this position between the neck and the thorax). The next length of tube supports the lower back and the lumbar region. Each of these tubes may be independently raised or lowered to meet the user's preference and anatomy. Moreover the support for each region whether it be head, neck, shoulders, thorax or lumbar regions, may be widened or narrowed with each of these sections. While the background art provides many possible approaches for raising and lowering the sections and the widening and narrowing of the sections defined above in this embodiment, a simple embodiment has all the control devices at the bottom of the tubes. The raising and lowering of each tube can use electric servos or pneumatic or gas lift mechanisms attached to the concentric sections that are designed such that the narrower tubes protrude below the wider tubes for access for support and control by the said lift mechanisms. The width of each of the sections may be controlled with air cells that are inflatable to the passenger's preference. This embodiment with concentric tubes may allow some limited flexing and therefore lateral movement of the body under lateral impact conditions thereby reducing peak accelerations of the head neck and thorax regions of the body. The cross sections of the tubes that support the sections may be circular in some embodiments to allow the user the ability to twist for example to reach a child in the back seat, this embodiment however has a viscous damper or ratchet arrangement with a centrifugal governor that prevents rapid twisting motion as under side collision forces. Such viscous dampers or centrifugal ratchets may be attached to each of the concentric tubes that allow twisting motion. Such viscous dampers with radial vanes and ratchet arrangements with centrifugal governors are well disclosed in the background art. Other embodiments that prevent twisting motion may have rectangular or other irregular cross sections.

Yet another embodiment uses a second rotating mechanism or turn table for the seat about a vertical axis mounted at the point of attachment of the seat to the flexed elements of the vehicle when in the normal operating position, that allows the user discretion to position and lock the seat at an angle to the direction of motion of the vehicle. This is sometimes desired by drivers. The computer control system for the seats can have a learn position that learns the angular position that is desired by the user and then sets it in the save position. The user commands can be verbal with voice recognition.

Yet another embodiment has a head and neck support in a multi element adjustable seat (where the head and neck support is constructed to be light but strong), in addition to having vertical movements is pivoted along a horizontal lateral axis and is designed with spring controls to move forward and touch the head and neck without pushing the head and neck with uncomfortable forces. Radial or linear viscous dampers are attached about the horizontal axis of the head and neck support that prevents rapid movement of the head and neck in a rear end collision. The viscous dampers are well disclosed in the background art.

Embodiments, particularly those that utilize the indo-skeletal structure may include the following additional embodiments and variations thereof for frontal and rear impact protection and passenger comfort and convenience. The additional structure is illustrated in FIGS. 20A,B and C. The passenger support platform (198) represents the set of machinery for that purpose. It will take the shape needed to support the variety of structures that are described in this invention. It is supported either in the middle or on the edges by the Central body tubes (188). The first tube that fits into the central body tube is the Body extender tube (189) This optional tube is slidably connected to the central body tube and may be moved in and out by servo motors or pneumatic/hydraulic pistons and cylinders. However the inner tube is axially supported by a compression resistant shock absorber which in turn is mounted rigidly with regard to the outer central body tube in all positions that the body extender tube can take. The Body extender tube has functions that include extending the wheel base of the vehicle under computer control particularly in drive by wire vehicles, thereby improving the comfort of the vehicle and second increasing the wheel base contingent on vehicle speed such that in the event of a collision there is a longer deceleration space. The shock absorber will become longer and shorter to accommodate this need and can for example be air shock absorbers. The correlation of speed and length will normally be computer controlled to provide statistically appropriate deceleration distances for the speed of the vehicle at any time. Notably the steering arrangements and other vehicle systems may also need to be compensated to accommodate the change in wheel base to ensure driver convenience and precise control of the vehicle. The Front end connector tube (190) has a shock absorber in series with a servo or pneumatic/hydraulic controlled actuator for axial movement in and out of the body extender tube (189) as does the back end connector tube ((191). 190 and 191 are connected to the front and back ends respectively which include the front and back wheels and bumper arrangements. The front module—which may be the engine or hybrid unit is pivoted on brackets at the front end of the front end connector tube, thereby allowing the module to rotate upwards about this pivot. Notably the module will be significantly massive and will require strong supports and pivots. The front module crank is pivotally attached to the body extender tube and also pivotally attached to the front module as shown in FIG. 20A. Therefore if there is a movement of the front end towards the body extender tube the front module crank would swing the front module about its pivot in the front towards the vertical direction.

Figure 20:
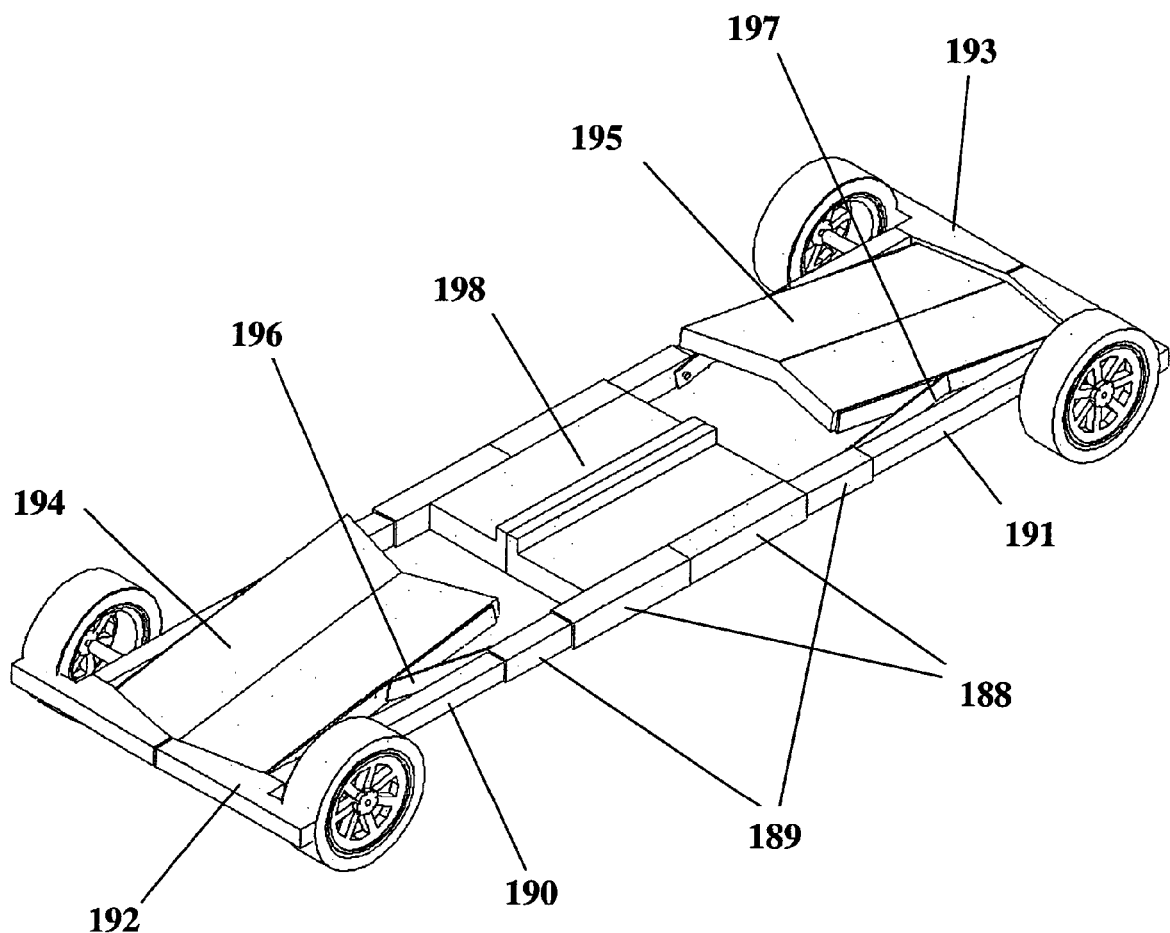
FIGS. 20A-C show an embodiment of the indo skeletal structure that includes special arrangements for front impact protection and other features for passenger convenience and comfort and FIG. 20D shows an embodiment of the connections between the elements in FIGS. 20A-C.
Figure 20:
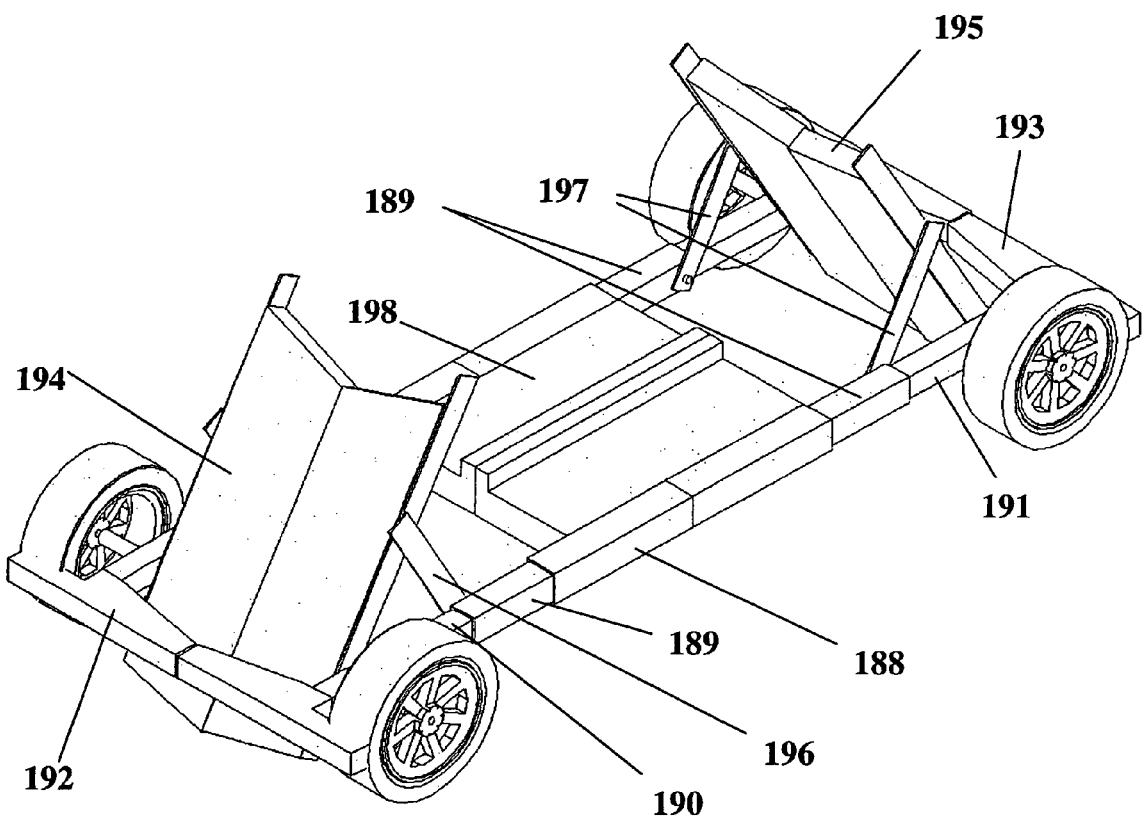
Figure 20C:
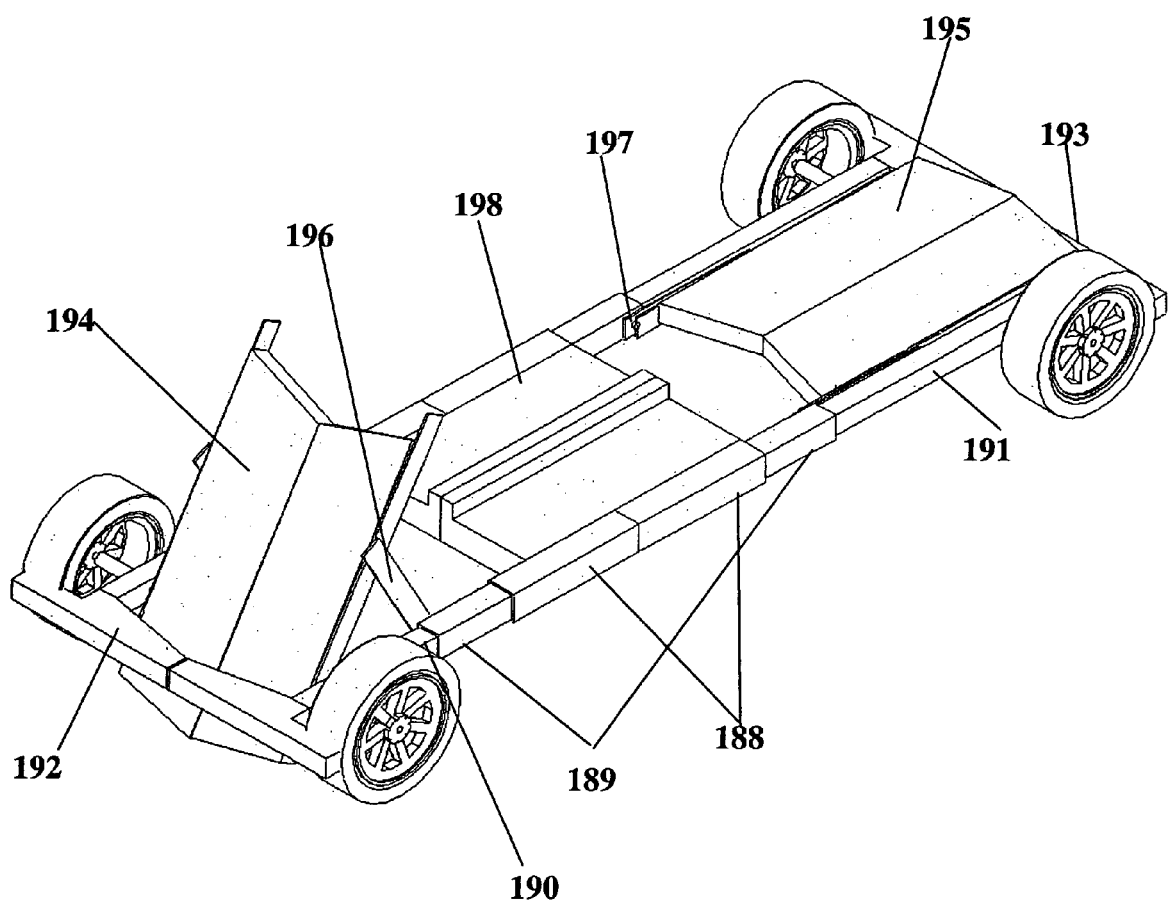
Figure 20:
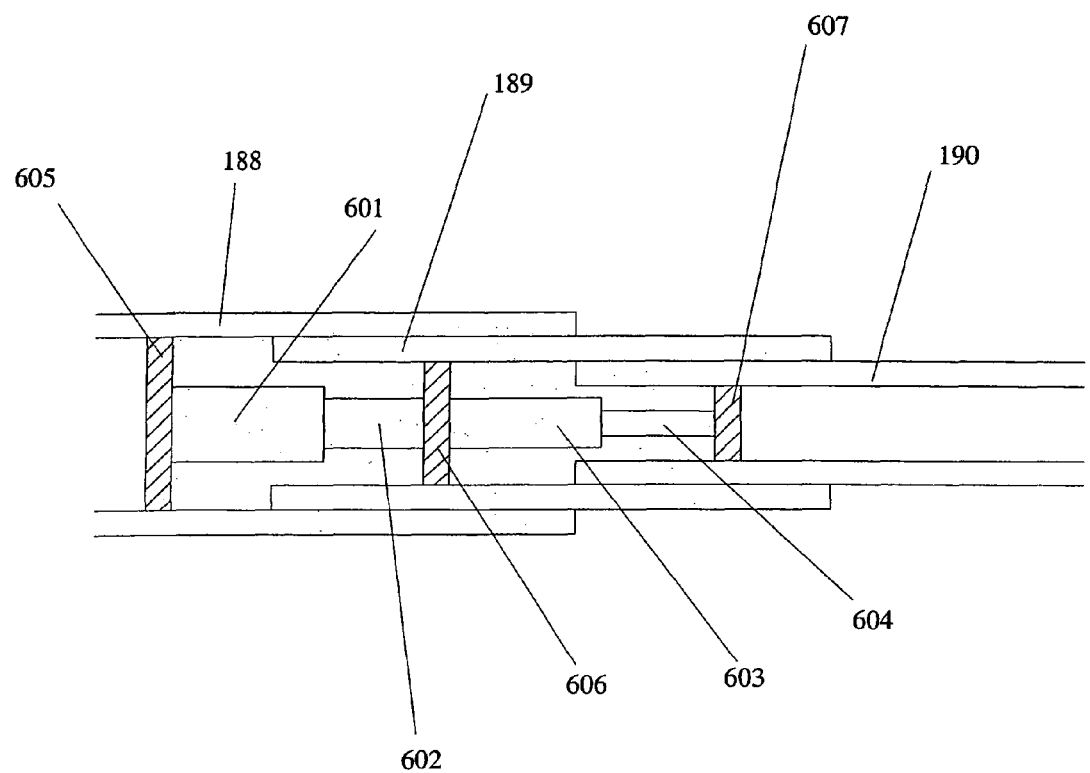

There are at least two functions for this motion. First in the event of a front collision the force will compress the shock absorbers on the end of the front end connector tube and thereby force the crank to pivot up the front module. This angular acceleration of the massive front module will absorb energy of the impact and acting as a "fly wheel", remove acceleration spikes that the passenger would otherwise sustain and in addition due to its vertical acceleration increase the traction on the front wheels thereby increasing the braking friction resistance that can be offered. Finally in the event of a collision the inclining front module will divert the impacting vehicle over the passenger space. This action is illustrated in FIG. 20C. Second, particularly for drive by wire vehicles, the front and back end connector tubes may be retracted by servo or pneumatic/hydraulic arrangements, to pivot up the front and back modules thereby reducing the vehicle length substantially and providing better curb visibility to the driver particularly while packing. This is illustrated in FIG. 20B. Notably the wheels are maintained in the same orientation to the road surface and may be steered as desired with the same mechanisms. For conventional vehicle architectures the pivot of the front module and engine with the front end connector tube should be near the wheel axis to facilitate this additional feature.

The same value is derived in the rear structure as the front structure for rear collisions and in front collisions and in parking. The arguments are similar.

Another embodiment may have a single but broad set of central body tube body extender tube and the back/front end connector tubes with a split front or back module and connection of the front/back connector tube with the front/back ends respectively in the middle. Yet another configuration may have a single central body tube and body extender tube but then have a "T" shaped structure on the back or the front to have separate left and right front and/or back end connector tubes connected with the front end at either side. In the event the body extender tube in not used the connection of the front/back module cranks will be to the central body tubes.

For embodiments that use an exoskeleton or shell design, an additional embodiment deploys airbags in the space surrounding the engine components to change the characteristics of the crumple zone. Moreover in addition some of these embodiments have the passenger cabin slidably and detachably connected to the rest of the vehicle and mounted behind these deploying airbags such that on impact, the cabin detaches from the vehicle and slides backwards in a controlled fashion to ensure the integrity of the cabin.

Yet another additional embodiment has a rear seat that has a unique bench configuration with sections that maintain their integrity and width in a side collision and other sections that collapse or compress in predefined controlled ways, to absorb the impact acceleration that would otherwise be transmitted to the passengers. The present invention and in particular embodiments of the rear seat are not limited to these figures. There are many embodiments that differ from these figures.

The hip bolster P101 that is compressible to a pre defined width P109 and providing a predefined resistive force to compression, in the event of a lateral force being applied to the hip bolster in a side impact, and designed to compress to a minimum width that still protects the hip of the passengers, is mounted adjacent to and on either side of the contoured seat bottoms P102 which are designed not to compress substantially in the event of lateral compressive forces being applied to it in the event of a side impact. The shapes and widths of the uncompressed hip bolsters may vary depending on whether the hip bolster is at the end of a seat or in between the seat bottoms P102.

The collinear mounting of the hip bolsters and seat bottoms along a lateral axis is in some embodiments achieved with impact decouple/secondary slides P103 that connect the hip bolsters and the seat bottoms to the fixed elements of the vehicle. These impact decouplers are under normal operating conditions, fixedly attached to each of the seat bottoms and each of the hip bolsters and under a predefined lateral force decouple the seat bottoms and hip bolsters to slide along a lateral axis relative to the fixed elements of the vehicle. The impact decoupler/secondary slides are mounted on the hip bolsters such that under compression to the predefined width, the impact decouplers/secondary slides do not obstruct the compression process.

Some of these embodiments have a further feature to lower and raise the hip bolsters to facilitate egress and ingress. In some such embodiments Slots in the hip bolster accommodate the secondary slides at the time of withdrawal of the hip bolsters to approximately the level of the seat bottoms. In addition there are slots to accommodate the sliding surfaces on the fixed elements of the vehicle, that are attached to the impact decouplers/secondary slides. This arrangement for lowering and raising the hip bolsters may be activated when the doors are opened and closed, raising the hip bolsters to the operating position when the doors are closed and lowering the hip bolsters when the doors are opened thereby facilitating egress and ingress. The lowering and raising arrangement can also be disabled to allow more passengers to use the back seat but without the using the side impact protection system.

The arrangement for raising and lowering the hip bolsters may also be used to change the width of the seat bottom within limits by changing the height of the bolsters, each having an angled edge on the sides facing the seat bottoms.

The back rest P112 and the shoulder bolster/support P111, support the back and shoulders/arms respectively of the passengers. The seat bottom P102 and the back rest P112 are located in the same lateral position for each of the passengers. Similarly, the hip bolsters and the shoulder bolsters are located in the same lateral position so that the shoulder bolster lies substantially above the hip bolster. The shoulder bolster is controllably crushable like the hip bolster, to be reduced under compressive lateral forces to a predefined narrow width. The back rest and the shoulder bolster support are mounted on impact decoupler/secondary slides in an analogous fashion to the seat bottom and the hip bolster respectively. Moreover, the back rest and the seat bottom are connected so that the movement of the seat bottom and the back rest when decoupled and thereafter laterally slidably attached to the fixed members of the vehicle, follow each other exactly so that the passenger support position is maintained under lateral impact conditions. Some embodiments have retracting arrangements of the shoulder bolster analogous to the hip bolster.

In some embodiments the sliding surfaces on the fixed elements of the vehicle, that the impact decoupler/secondary slides are restrained to following during impact, may be segmented into sections across the vehicle so that sections of the seat back may be folded down along with these surfaces to provide enhanced storage space in the trunk of the vehicle or for other utility purposes. Moreover the members of the fixed elements of the vehicle that provide these sliding surfaces may be constructed in telescoping elements so that on lateral impact they decouple and telescope together rather than buckle under lateral forces thereby maintaining the integrity of the lateral sliding surfaces. These telescoping sections may also form a part of the impact decoupling arrangement of the secondary slides.

The head rest P113 is connected to the back rest and is vertically adjustable but is laterally fixed to the back rest, and therefore will move laterally with the back rest in the event of a side impact of sufficient magnitude, thereby ensuring that the head and the back of the passenger are supported at the same lateral position ensuring that there is little differential movement of the head relative to the body of the passenger during impact.

Under lateral impact conditions, forces on the protector shields which may consist of the vehicle body sides and/or the back door and/or the rear wheels and sections of the wheel wells of the vehicle, all of which have surfaces that abut the sides of the passengers, the hip bolsters and the shoulder bolsters on the impact side of the vehicle, provide impact resistance. As a controlled crush commences in a lateral direction, internal airbags are deployed adjoining the hip bolsters and shoulder bolsters on the impact side of the vehicle but on the inside of the protector shield elements, thereby transferring impact forces through the airbag to the hip bolster and shoulder bolster on the impact side of the vehicle. The inside airbag in some embodiments may be in several sections with one or more of these sections mounted inside the rear wheel well of the vehicle.

Head and neck airbags P114, Body air bags P115 and side bolster airbags P110 are deployed on impact to hold the passengers in the survival space contained by the seat bottom, the back rest and the head rest. Thereafter the movement of the passengers laterally will be with minimal differential movement of the body elements as they are held by the airbags that are in turn attached to the head rest the back rest and the seat bottom respectively, which in turn are constrained to move together laterally on impact.

The airbags may be constructed as micro-air cushions that are driven by the internal airbag as the sacrificial chamber. They may also be separately deployed airbags.

Some of the chambers of the inside airbags may be preinflated and therefore completely passive.

The body airbags may be shaped to be inclined downwards on the top surface to gently push the arms of the passengers forward, while maintaining relatively even support for the arms down from the shoulder.

In the compressed position of the hip bolsters and shoulder bolsters, it is likely that the shoulder space will be very limited. Therefore, some embodiments may have the center seat back offset forward relative to the seat backs on either side, thereby moving the passenger in the central seat to be slightly ahead of the passengers on the side in the operating position. Therefore under impact, the shoulders of the center passenger will not abut the shoulders of the passengers on the side but will lie ahead of the shoulders of the passengers on the sides, thereby allowing adequate space for shoulders of all passengers under impact. The body air bags on deployment will push all the arms forward and upward and hold the torsos of passengers on both sides. If the center passenger shoulder is in front of the side passenger shoulders the inner arm of each of the side passengers will push up the arms of the center passenger when the air bag deploys.

The shapes of the body airbags may be such that they hold both passengers on either side, or be designed to hold only one of the two passengers adjoining the hip bolster or shoulder bolster from which it is deployed. In the latter case there will be two bags to support each of the two passengers on either side the hip bolster and the shoulder bolster. The hip bolster and shoulder bolsters on the ends of the rear seat assembly will need only one air bag on each as there is only one adjoining passenger.

Some car architectures have the rear wheel well partially straddling the rear seat. As a result an outward displacement of the rear seat on the further side from the impact can be prevented. Some embodiments of the present invention that are in these architectures, have specially constructed wheel wells and componentry that are placed between the seats and the wheel wells to allow a compression of the wheel wells as the rear seat moves outwards on the side opposite the collision. Some of these arrangements may include a perforation or weakening of the wheel well along the profile of the seat in the outward extended position of the seat under impact of the side further from the impact, to allow the lateral force of the seat on the wheel well to separate and crush the section in the way of the seat to allow the movement of the seat. To assist with this process of separation of the section of the wheel well in the way of the seat, the seat may have mounted to its edge in a position facing the wheel well a cutting edge, so that the wheel well may be cut or separated more easily during collision conditions as described above.

Yet other embodiments in architectures of cars that have wheel wells partially straddling the rear seat, have airbags that deploy in the wheel well on the impact side to control the forces on the rear seat, and would provide the function of the inside airbags in other embodiments.

Yet other embodiments of the present invention have a raised and/or forward shifted section of the middle seat on the rear seat assembly so that in the normal operating position the passenger in the center seat, has his/her shoulders in a position that will not engage the shoulders of the side passengers under impact. As a result the present invention will under side impact conditions, compress the side bolsters and back/shoulder bolsters, while maintaining the survival space of the back and bottom rests of the seats, while the shoulders overlap and thereby permit the compression of the arrangement of the passengers under side impact.

Another additional embodiment provides for the conversion of the vehicle as described in the present invention into an aircraft with the same robust safety arrangements, but also adapted for functioning as a helicopter type vehicle with the necessary changes in the architecture to provide for the power source at the top of the passenger cab, while retaining a reduced wheel base if necessary for balance and maneuvering considerations. Notably the present invention can therefore have embodiments that are aircraft with the side, front and back impact protection that is required for use of such vehicles on conventional roads exceeding the stringent minimum safety standards of all road vehicles.

One version of this additional embodiment has the front module 194, along with the crank 196, and the pivoting socket for pivoting about a pin on the front end 190, 192 mounted on a pair of elevator beams 199, each supported pivotally near the center of the vehicle 188 or in its vicinity, and constructed such that they support the front module when in the near horizontal position when the vehicle functions as a ground vehicle. Each of the cranks 196 have one of their pivots mounted on the corresponding elevator beam 199. the other pivot of the crank being on the module 194. The module in the near horizontal position during functioning as a surface vehicle will have the notches at the front end resting in the pivot pins on the front end 190 and locked adequately in place. This arrangement, ensures that in the event of a collision at the front end, the pivot pin engages the slot and pushes the front module backwards at the pin position, thereby forcing the crank 196, that is fixed on the stationary elevator beam 199 at the rear end, to move the rear pivot on the front module upwards and thereby ensure the performance of the present invention with this structure as noted herein. When elevated by mechanical, pneumatic or hydraulic means well disclosed in the background art, the elevator beam inclines the front module to an adjustable angle to the vertical. Thereby allowing a folded propeller that may be mounted at the front end of the said front module and the vanes of which may be folded in a storage position on the sides of the front module and its top and bottom in recesses designed for the purpose (the length of the vanes/blades can be greater for those stored on the sides of the front module and shorter for those stored at the top and bottom of the front module. Figures do not show the folded propeller) this propeller can be engaged to the motor and/or engine that is in the front module to provide loft for the vehicle to fly. In addition the front end 192 and back end 193 may be retracted as described in the present invention, to fold the back end upwards and to reduce the wheel base and the maneuverability of the airborne vehicle. The position of the rear module can be varied with controls on the retraction of the back end to provide the right balance characteristics of the vehicle when air borne. This additional embodiment is best suited for a drive by wire vehicle as the front module is not directly connected to the wheels and a transmission system to the wheels is not necessary, thereby reducing the weight of the vehicle. Low mass wheel motors are another useful addition to propel the vehicle as a ground vehicle. Such wheel motors may be used to drive small propellers to provide lateral thrust needed for the vehicle when in flight. (in some embodiments after being disengaged from the wheels )Forward thrust can be provided from the main propeller with an inclined elevator beam.

Moreover, in this additional flying embodiment and in an embodiment for a standard ground vehicle, the shock absorption systems in 189, 190 may have shock absorbers that may be decoupled to provide even greater retraction movement under servo control.

Yet other flying embodiments of the present invention have dual elevating beams that engage both the front and the back modules thereby permitting both modules to be elevated and drive the propellers or rotors. These embodiments will have the modules in the elevated position to be at a small angle to each other so that the rotors do not collide while rotating. Moreover they have contra rotating rotors or propellers. The inclination of the rotors or propellers may be changed to facilitate forward sideward or backward movement of the vehicle.

Yet other flying embodiments have dual elevator beams on each side for each module so that they may elevate the molded to a position substantially above the passenger cabin without rotating the modules substantially.

Yet other flying embodiments of the present invention maintain the modules in the normal operating position as in a surface vehicle as noted herein, but with rotor or propeller shafts that may be angled upwards to a substantially vertical orientation. These embodiments may have rotor or propeller shafts that are long so that the center of lift or the point at which the upward thrust of the rotors applies will be well above the center of gravity of the vehicle thereby providing greater stability.

Yet another flying embodiment of the present invention, has each of the seats on one or more mounts (these mounts can be the secondary & primary slide arrangements noted herein), such that under substantial vertical load as encountered in a vertical crash situation the mounts tilt so that the seat support for the back or spine of the passenger or operator inclines backwards so that the axial load on the spine due to the vertical deceleration is reduced by supporting the upper body in a substantially horizontal or inclined position. These tilting mounts may be attached to the fixed body members of the vehicle and maintained in the operating position using friction or impact shear load induced decoupling arrangements. One such embodiment has a pair of primary and secondary slides as in a conventional non-flying embodiment as in FIGS. 10D1-10D4 but in addition has the central mount of the primary slide rearward on the vehicle attached to the central body member with a key and slot arrangement with a key on the lower primary slide mount and the slot on the central body member 201 in FIG. 10D5, such that under vertical impact the key decouples and slide into the slot vertically thereby rotating the seat about the primary slide on the forward side of the seat resulting in a "cradle" position for the seat that protects the passenger from a axial load on the spine. Yet another embodiment may use the two center mounts of the lower primary slide in FIG. 10D1-10D4, linked rigidly together by a member that is shaped in the arc of a circle in the vertical plane of the central body member with center above the central body member, said rigid member housed in a slot in the fixed central member, such that under normal operation and under lateral impact the linking member is not detached from the fixed central body member of the vehicle and transfers the lateral load to the fixed body members, but under vertical loading of the seat (and the primary slide) the linking member detaches and slides in the housing slot to describe an arc of the same circles that defines the profiles of the slot and the linking member, the center of said circles being so arranged that with this circular movement of the linking member in the slot the center of gravity of the passenger or operator and the seat are lowered, and the seat rotates in a direction to a cradle position where the passenger or operator is in a reclining position or the upper body of said passenger is in a near horizontal position.

Yet another additional embodiment of the present invention has the passenger support mechanism (the seat in many embodiments) supported by a pivot substantially in the center of the seat and near the lower support element of the support mechanism and the occupant contact surface thereof, with an axis along the direction of motion of the vehicle, and motion about this pivot being spring controlled to return the seat to the operating position under no external forces. The pivotal movement is also heavily damped to absorb energy as the seat is moved in either lateral direction from the operating vertical position. The pivot is attached on its other end to the impact decoupler/secondary slides that have been previously disclosed. In the event of the side impact, the internal airbags or equivalents that may be damped springs, will initially move the passenger support mechanism pivotally prior to the impact decouplers of the secondary slide being decoupled. Therefore following impact, the head and thorax start moving first towards the impacted surface of the vehicle (or accelerate more slowly than the impacted surface of the vehicle) and then the body rotates with the passenger support mechanism away from the impact, and finally if the impact is severe enough, the entire body with the passenger support mechanism moves when the impact decouplers are decoupled. This additional embodiment gives the head and thorax a greater motion space than the pelvic region as the body accelerates, and is particularly useful if the movement of the lower seat is constrained by fixed elements of the vehicle such as a center tunnel that is not designed to collapse. The longer time (and distance) allowed for the head and thorax to accurate give them a potentially lower peak acceleration of the acceleration is designed to be as near constant as possible be design of the springs and dampers controlling the pivotal movement and the resistance to motion caused by the secondary slides when decoupled. Notably in this additional embodiment the head and neck are well supported by elements of the passenger support mechanism.

Figure 4C:
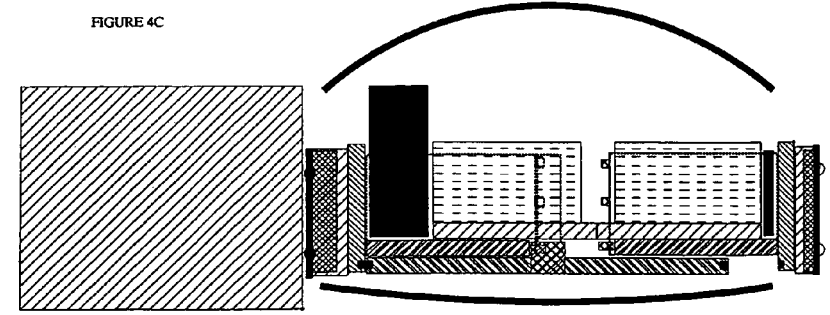
Figure 4G:
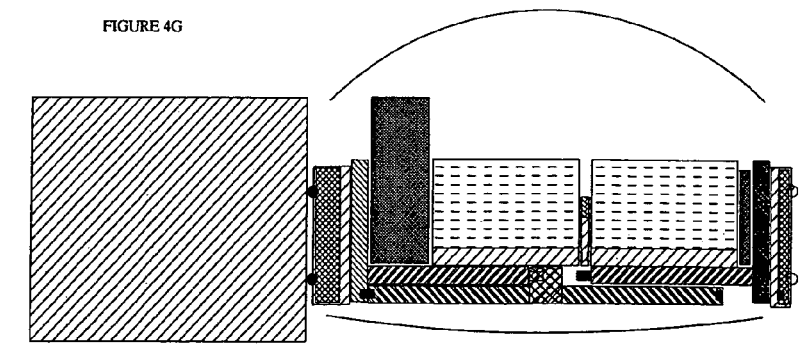
Figure 5:
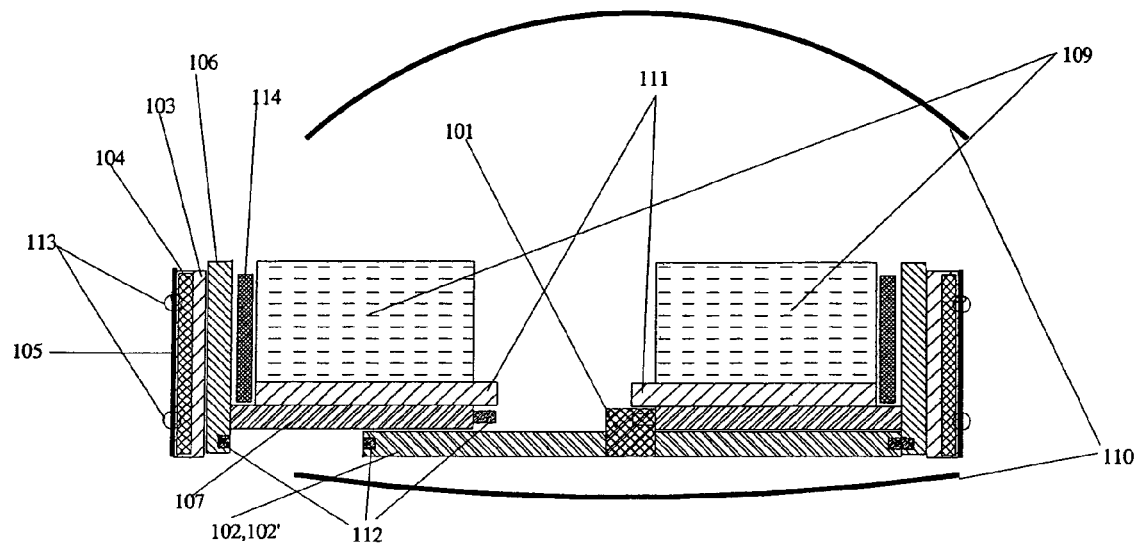
FIGS. 5 and 6 is an illustration of the seating arrangement as used for loading and unloading passengers and driver.

Yet another additional embodiment extends the embodiment shown in FIGS. 10D1-10D4 where the safety beam upper element is concentric to the safety beam lower element. Here the safety beam lower and upper elements have an interlocking worm drive that is driven at one of the ends of these elements to move the safety beam upper element into the access position and back from the operating position. There can be multiple concentric telescoping tubes that constitute the safety beam upper element provide an accordion type extension the drive in this embodiment may be between the safety beam lower element and the section of the safety beam upper element sections that supports the passenger support mechanism directly or indirectly through the impact decouplers/secondary slides. Furthermore in this embodiment the inside airbag equivalents may be damped spring assemblies that engage the cylindrical safety beam lower and upper elements when in the operating position. This will be particularly useful for hinged protector shields that move separately to the passenger support mechanism such as in gull wing doors. Such hinged protector shields may have pins to engage the safety beam lower and upper element in the operating position.

Alternative Embodiments

In an alternative embodiment to the preferred embodiment, the present invention may use hinged Protector Shields (106) that lock into the Primary Slide (107) when closed. This will allow the arrangement to work for mounting and dismounting the vehicle with either the Primary Slides deactivated or non-operational as well as when they are functional. The seats may also be mounted on rotating mechanisms or extension arms rather than a primary slide, to assist passengers in mounting and dismounting.

Another alternative embodiment utilizes co-axial sliding mechanisms that constitute said rotating mechanisms rather than the primary slides such that the fixed and rotating members of said rotating mechanisms have an adequate area of contact and reaction to support lateral collision forces.

Another alternative embodiment is illustrated in FIGS. 5A and 6A. The "door" that contains the perforation shield (105) with distance/velocity sensors (113), the external airbags (104), the shock absorbers (103) and the protector shields (106), hinges down on the pivot (112A) to provide support for the upper primary slide. The inner surface of the Protector shield is designed to perform the function of the lower Primary slide (102). This embodiment will be particularly useful for larger vehicles with a plurality of seats on each side of the vehicle. These multiple seats may be mounted on separate sections of upper primary and secondary slides.

Yet another embodiment has the at least one shock absorbing device and the at least one force distributing protector shield comprising a deformable protective shell mounted to the fixed elements of the vehicle on the outside of the passengers so that in the event of a side impact, the shell distributes the impact force to the fixed body members of the vehicle while by deforming, absorbs some of the energy of impact.

Another alternative embodiment is illustrated in FIGS. 1D to 4D where the Shock Absorbers (103) excluding the External Air bags (104) are mounted on the inner surface of the protector shields (106). As may be seen from the drawings, in this particular embodiment, the shock absorber excluding the external air bags are locked directly to the lower primary slide (102, 102') in the operating position, although in another configuration the locks my be between the protector shield and the lower primary slide in the operating position. Such embodiments may be designed to allow limited intrusion of the protector shield with resistance provided by the shock absorber (103) thereby reducing the peak acceleration sustained by the vehicle body under impact. Notably, as the passenger environment is protected and moves away from the impact, crush injury to the passenger is avoided. This is a unique feature of this invention where both the crush injury of the passenger and the peak acceleration of the vehicle (and the passenger as a result) may be minimized at the same time. Conventional designs try to minimize intrusion by bracing the side of the vehicle with beams and thereby increasing the peak acceleration of the vehicle, or increasing intrusion to reduce the peak acceleration but allowing greater crush injury.

Another alternative embodiment may have a contoured safety harness with a different shape to that of the preferred embodiment. FIGS. 12A1 to 12C1 illustrate an embodiment of a safety harness using a slightly different geometry but performing the same function in the same way as in the preferred embodiment.

Some embodiments of the multi-element contoured seat may have sides that fold down and away from the passenger. This feature is useful particularly for the inner side of the passengers near the side of the vehicle and for both sides of the passengers in the middle of the vehicle, if the center seats are fixed and not electable. Notably however, the sides lock in the operating position and brace the seat from lateral compression, thereby protecting the passenger.

Some embodiments have seat bottoms comprising two symmetrical elements each with a support surface for supporting the pelvis of the passenger, where the said support surface may be laterally displaced to space out the symmetric elements and/or angled about an axis horizontal and in the direction of motion of the vehicle. Such an arrangement for the seat bottom allows adjustment of the support provided by the seat to be lateral as well as vertical to the preference of the user. Moreover, if the said symmetrical elements are designed to be curved to accommodate the pelvis of the user, there can be substantial lateral support for the pelvis of the user, in many of the preferred angular orientations of the seat elements, in the event of a lateral impact.

Some embodiments of the seats may have sides that could include arm rests, side bolsters and other elements as disclosed in this invention, that that drop down or back on the door or access side at the time of egress and ingress, particularly in embodiments that use conventional doors for access. Activation for these movements can be with the switching on and off of the ignition switch for the vehicle.

Yet another embodiment raises he seat bottom at the time of egress and ingress with servos or pneumatic/hydraulic systems, so that the seat members on the sides of the sat are relatively lower to the seat bottom thereby facilitating egress and ingress of the passenger. Moreover, arrangements to raise the seat bottom may in addition in some embodiments help negotiate a high "door" sill by the sliding or rotating seats at egress and ingress.

Yet another embodiment using conventional doors, has the arm rests on the door side integrated in to the doors but protected and decoupled from the door members on its outside by inside air bags. This design would have these arm rests locking into the seat when the door is closed thereby providing the decoupling for the entire seat with the inside airbag during lateral impact.

Another alternative embodiment uses shock absorbing devices mounted at each end on each of the two surfaces of the impact decoupler/secondary slide substituting or supplementing the inside airbags.

Another alternative embodiment may have an auxiliary slide behind the seat and of any convenient height. This embodiment is shown in FIGS. 1C-4C. The figures illustrate the working of the current invention with a high section of the central member of the indo skeletal structure behind the seats, but abutting the auxiliary beams in the operating position. As the High section of the central member (101) is behind the seats and the secondary slides (111), the seats and the secondary slides are free to move across the vehicle under impact as shown in FIG. 4C.

Yet another alternative embodiment has an external seat profile as illustrated in FIG. 12E1. The higher rectangular external profile provides greater protection to the passenger.

Yet another alternative embodiment has a vertical extension/"safety cage" (125) as shown in FIGS. 10A1, 10B1 and 10C1. Here the vertical extension/safety cage engages a beam across the top of the vehicle that may be supported by the shell structure of the vehicle (the figure shows only half the width of the vehicle). Such a safety cage/vertical extension can provide protection in a roll over situation and also provide additional compressive strength for the vehicle, and may function as a fixed or retractable roll bar. In some embodiments such a vertical extension "safety cage" will perform the function of the "B" pillar of the vehicle under lateral impact. Notably no "B" pillar is needed to support rear door hinges in the present invention. Moreover, in some embodiments the beam arrangement across the top of the vehicle or other support structures on the roof section of the shell may be designed to be rigid on compression but telescope out with the secondary slides under impact using appropriate logic to drive the locking mechanisms, thereby providing a protective cage even when the seat is in the ejected state.

Yet another embodiment, deters a roll over following side impact, by implementing an "outrigger" arrangement having reinforced upper primary slides and/or secondary slides and bracing brackets anchored to the fixed members of the vehicle that hold these slides in their extended substantially horizontal position after extension under impact, without permitting them to buckle under a vertical forces encountered under the initial stage of a roll over situation.

The preferred embodiment has the external airbags or shock absorbers triggered on detection of an expected impact as noted. This implies that on the far side (non-impact side) if there is possible secondary impact from a second object, the same mechanisms will deploy the external airbags on the second side, thereby protecting the far side occupant in the event of a second object hitting the vehicle soon after the first. An alternative embodiment can have distance/velocity sensors mounted in positions on the front and back edge of the perforation shields or protector shields to facilitate better detection of objects approaching the vehicle at wide angles to the perpendicular direction. Yet another alternative embodiment to this will have both impact side and far side external airbags deploy on detection of the first impact.

Another alternative embodiment has a safety harness/shield as illustrated in FIG. 12H2. This embodiment of the safety harness is mounted on spring loaded hinged supports at the head support section of the multi element adjustable seat (137)—similar to conventional supports for the headrest, and to lockable supports between the arm rests (138) or on the side bolsters of the multi element adjustable seat. The spring loading will support the weight of the harness and thereby retract the harness when unlocked. The harness includes a hinged and spring mounted shield (130) that may pivot on the lower safety harness support (138), The passenger side of the shield, has on its surface an implementation of a Passive Air Cushion System that uses the pressure in one or more sacrificial chambers which under pressure transfer air to one or more micro-air cushions that protect high priority anatomical regions. In this embodiment, the passive anatomical micro air cushion (131), derives it inflation source from the sacrificial chamber (139) at the lower end of the shield of the safety harness, that is compressed by a much greater body mass under impact. In a frontal collision the force of the more massive parts of the body on the sacrificial chamber will deploy the passive anatomical micro-air cushions to protect the face and the neck. The narrower sections of the aircushions and flow control mechanisms if installed, will cause some visco-elastic behavior and in addition cause air speed amplification to create faster deployment. While this mechanism activates the shield (130) may pivot down to take some of the impact energy. The shield is shaped to the contour of the human body head and neck when it is forced forward as in a frontal collision. This embodiment may in addition have multiple or variable position harness support anchor points on the arm rests or the side bolsters that are part of the multi-element seat, to accommodate people of different proportions. Moreover this embodiment may have in addition an additional bracket that moves the anchor point of the lower safety harness locking supports substantially forward, and provides a supplementary passive anatomical micro-air-cushion that can be mounted on the permanent micro-air-cushion on the shield, to accommodate pregnant women, and the special critical force distribution they can withstand.

In this embodiment, the two pivoted arms swing forward under collision forces the moment created by the shield with the body pressure against it, and extends the upper extending arms (133) to absorb some of the shock and to provide a space for the forward movement of the upper body. The elbows (132) facilitate the relative angular movement of the upper arms and lower arms of the safety harness (133,134). They are spring loaded to ensure that they support the lower parts of the harness when unlocked to allow the entire harness to move up and away from the body when unlocked without any force being applied. Under side impact the passive anatomical head and neck micro-air-cushions deploy to protect the head and neck under relative lateral acceleration. Notably the passive anatomical head and neck micro-air-cushions can be actively deployed or as in this embodiment passively deployed by a discharge of air from sacrificial chambers between the seats or on the outer surface of the seats and mounted on each of the seats, so that lateral pressure will inflate the anatomical head and neck micro-air-cushions. The sacrificial chambers offer secondary impact protection by cushioning the seat. Notably this embodiment does not use any active airbags in the vicinity of the human body, reducing the risks associated with the high energy external deployment devices. The adjustable head rest (136) follows conventional design but is here mounted on the safety harness hinged mounts.

FIG. 12I2 shows the passive anatomical micro-air-cushions deployed (the sacrificial chamber has been compressed and the top region is full and ready to protect the face and neck in a frontal impact. FIG. 12J2 shows the anatomical head and neck passive micro airbags deployed under side impact, ready to support the head and neck in a side collision. Notably this embodiment uses a new concept where the impact energy is redeployed for protecting vital parts of the impacted object which are often embedded inside the object, using fluid transfer—in this case air transfer. Force and velocity amplification or de-amplification can be achieved with the geometry of the interconnections, the sacrificial chambers and the micro-air-cushions. The sacrificial chambers can be used for secondary impact protection as well by carefully controlling the flow parameters. This is illustrated in FIG. 17. The approach obviates the need for active airbag technologies in the vicinity of sensitive equipment, living organisms and indeed people.

This embodiment of the harness allows movement within the vehicle for passengers when it is unlocked and allowed to swing up within the vehicle as shown in FIG. 16D. However, visibility is somewhat obstructed preventing the driver from driving without locking the harness in place.

In this embodiment of the safety harness entering and leaving the vehicle are facilitated by the entire device swinging away from the body as shown in FIGS. 16A,B and C. The passenger simply needs to stand up to leave. To enter the passenger simply sit down and place his/her feet on the foot rest (141) and retract the slider mechanism. This embodiment also has radar or infrared detectors as on elevator doors to detect limbs in the way of the retracting sliding mechanism for the protection of the passengers.

FIG. 15C shows the parts of this embodiment and the adjustable arm rests.

Another embodiment of the shield on the safety harness has a folding section at the top that can be straightened and locked in place for adults and folded down for children.

Another embodiment uses flexible netting on part of the shield surface to protect passengers under impact. In this embodiment, the shield has a frame on which the netting is deployed. The upper end of the frame is adequately bent forward and then downwards to ensure that the passenger head and neck do not strike the frame under frontal collision. In yet another embodiment of this arrangement, the shield of flexible netting is designed for the head and neck and is normally retracted forward, and deployed on impact by initial forces by the lower torso of the passenger against the lower part of the safety harness/shield.

Yet another variation of this safety harness with netting on a frame, has telescoping frame members on the sides so that the height of the frame is adjustable by retraction of the telescoping members to accommodate children and small adults.

Yet another embodiment of the harness has an upper section of the safety harness consisting of spring mounted support arms mounted in the vicinity of the head rest and designed—when pulled down by the passenger—to swing down and over the passenger head and in front of the passenger. The support arms each having telescoping sections that connect to the shield, such telescoping sections having arrangements for an inertial ratcheting that prevent extension of these telescoping arms in the event of a sudden tension as in an impact. The lower section of the harness consists of short adjustable belts or arms that can be locked on the sides of the seat or on the inside of the arm rests as in a four point seat belt. This embodiment provides all the benefits of a four point seat belt but in addition has the benefit of head and neck support in the event of a collision. This arrangement allows protection with the telescoping sections and the adjustments on the lower end of the harness for different sized passengers.

Yet another embodiment utilizes the passive anatomical micro air cushion (131) at the top of the shield/harness that derives its inflation source from the sacrificial chamber (139) at the lower end of the safety shield/harness. However, in this embodiment the anatomical micro air cushion is limited to only the top edge of the shield to support the head, neck and the upper thorax when deployed under collision conditions. This anatomical micro air cushion (131) is supported by pairs of telescoping tubes the lower member of each such tubes being fixed to the harness/shield support in the vicinity of the sacrificial chamber, and the upper member of each pair of telescoping tubes are attached to the passive anatomical micro air cushion (131). The outer tubes have contoured semi-rigid materials to conform broadly to the body shape. The lower and upper members of each pair telescope into one another co-axially, and are lockable in different longitudinal positions relative to the other member of the pair, thereby providing for a variable height anatomical micro air cushion. Airflow under deployment conditions is conducted either directly through said telescoping tubes or separate tubes that have an "accordian" collapsible structure that can extend as the telescoping tubes do, and may be placed inside said telescoping tubes. The length of the telescoping tubes may be manually set with the locks or in other embodiments set by automated or computer controls that sense the size of the passenger from selected elements of the multi-element contoured seat.

Yet another embodiment has a harness as in FIG. 12H2 except that there is a safety harness support arm only on the outer side of the passenger towards the side of the vehicle. (i.e in some of these embodiments there is one Safety Harness elbow (132), one Safety Harness extending upper arm (133) and one Safety Harness Pivoting lower arm (134). Moreover the safety harness/shield support arm is designed such that upon release from across the lap of the passenger, the shield flips to a vertical plane in the vicinity of the vertical plane of said support arm. Thereby permitting the safety harness to swing over the head of the passenger even when the seat is only partially displaced for entry or exit from the vehicle. Often this may be useful when there is limited access space next to the vehicle.

Yet another embodiment, principally for vehicles with drive by wire technologies, has the vehicle controls mounted on the shield. If a steering wheel is used this may be mounted on the front surface of the shield (on the surface opposite the passenger). The steering wheel or other controls may have distance adjustments for ergonomic positioning.

Yet another embodiment principally for drive by wire technologies, has the driver controls mounted on the contoured arm rests of the car. Adjustments for the arm rests will include further controls for the ergonomic positioning of these controls on the arm rests.

Vehicles, principally those that utilize drive by wire technologies with either of the above configurations, will have the entire area below the windshield free of controls. This embodiment utilizes this area for a GPS driven positioning display that mimics the view ahead of the driver. The display system may use vector imaging techniques or non-linear image mapping techniques that are well disclosed in the background art that provide the same perspective to the driver on the display as what he sees on the road ahead, thereby minimizing mental processing of information in establishing a correspondence between the image and the actual physical position and orientation of the vehicle thereby reducing reaction time for action by the driver. Furthermore, the positioning of the display just below the screen ensures that there is minimal spatial disorientation of the driver in turning his/her head to look at the screen thereby reducing further the mental information processing needs and improving further the reaction time of the driver. In some embodiments when there are controls such as a steering wheel in front of the driver, a fixed or a "pop up" screen just below the windshield or a projection onto the lower windshield may be utilized. The image may include the destination and path to that destination and may be at a different scale to the perspective of the driver ahead of the vehicle. This embodiment and variations provide a unique system that conventional GPS navigation systems do not provide in speeding up driver reaction times.

Another embodiment has air conditioning micro-ducts on the seating surfaces and the safety harness/shields, for the comfort of passengers, particularly in open vehicles.

Another alternative embodiment has the "Open" switch for the slide on the inside of the vehicle designed the "press bar" so that the intuitive reaction of the passenger to "open the door" is harnessed. However, this can be deactivated when the vehicle is in motion.

Another alternative embodiment has a center console that is designed to crush under impact as shown in FIGS. 1F-4F, thereby minimizing the ejection of the far side passenger on impact.

Yet another embodiment has a detachable center console that includes part of the center tunnel that houses the transmission shaft for rear wheel drive vehicles with front mounted engines and several cable and hydraulic systems. One such embodiment has perforated or weakened line of detachment or an interlocking arrangement on the center tunnel that delineates the section of the center tunnel that will be detached from the remaining part of the center tunnel in the event that the seat carriage with secondary slides apply sufficient shear force on this line of intended detachment. In embodiments that require the separation of the two sections of the center tunnel by cutting through the weakened tunnel material along the predefined line, a cutting edge mounted on the moving surface of the secondary slide may be used to cut through the tunnel material in the event of an impact. Notably, in the event of a side impact, the lateral tensional force system will tend to raise the impact side of the vehicle. Therefore the transmission shaft in this situation will be at the lowest level of the center tunnel within the design parameters, and therefore will not be in the way of the seared section of the center tunnel which will be at the top of the tunnel. Moreover, the pipes and cables that are mounted within the tunnel may be mounted such that they have adequate slack in the event of such a displacement of the sheared section. They may also be mounted low enough on the center tunnel to be below the line of shear on the center tunnel, which will avoid the need for special considerations for the cables and pipes in the event of the shear of the upper tunnel. In the event that the design of the vehicle requires a high center tunnel where the transmission shaft will not be low enough to allow the traverse of the sheared tunnel over it, the transmission shaft may be designed to fracture or decouple in the region of the sheared section of the center tunnel, in the event of lateral forces as in this situation but still transfer the required tensional forces to drive the vehicle. This may be achieved with suitable couplings on the transmission shaft. Another important consideration for this embodiment is that the peak acceleration of the vehicle following impact and the resulting peak forces precede the time at which the shear of the tunnel will occur and therefore the integrity of the tunnel is maintained at the time when the strength of the tunnel and the remaining structure is most needed. The length of the detaching section of the center tunnel and indeed the other parts of the center console mounted thereon may be increased in some embodiments to accommodate the legs of the passenger as the seat moves towards the center of the vehicle.

Another alternative embodiment has the internal airbag partially filled at all times, so that in the event of no deployment of the external airbags either because of technology failure or non installation or other reason, the passenger and seat arrangement are cushioned even prior to further inflation of the internal airbag on deployment on impact. Shock absorbers may supplement the operation of the internal airbags in this embodiment with partially inflated internal airbags under normal operating conditions.

Another alternative embodiment can have the internal airbags deployed on impact as noted with such deployment effected by inflation by some of the compressed air of the external airbags on impact, thereby providing "acceleration de-amplification" for the movement of the passengers on impact.

Yet another embodiment has proactive sensors deploying the internal airbags directly, without the installation of external airbags.

Yet another embodiment of the invention has a retracting canopy stored in the roof of the vehicle, and attachable to the protector shield or attached components such as the side window, when desired. When attached, the canopy will deploy over the seats when in the extended or loading positions, thereby protecting the seat and the passenger from rain or other snow while entering or leaving the vehicle.

Yet another embodiment has external airbags constructed using the Passive Air-Cushion System with micro chambers that are connected to each other by restricted paths that provide visco elastic energy absorption in the event of some sections of the airbag being impacted while others are not, thereby forcing air from the compressed micro chambers to the other micro chambers, each of the micro chambers functioning as either a sacrificial chamber or a Micro Air Cushion on impact. This embodiment may of course have external airbags proactively deployed in the manner described herein, prior to impact and their performance as Micro Air Cushion systems. Yet another variation may include one-way valves between the chamber directly connected to the inflation source and each of the micro-chambers (implementable for example with flaps against an aperture ) so that inflation may be achieved rapidly, and then the Passive Air-cushion benefits realized on impact.

Yet another embodiment uses the Passive Air-cushion system to protect passengers from "Whip Lash" injury, by providing Micro Air-cushions in the vicinity of the head and neck, and providing sacrificial chambers that are compressed in the event of a rear end collision. In some embodiments the sacrificial chamber can be mounted below the seat with one face mounted to the vehicle structure and the other face mounted to the seat of the passenger, the seat being mounted to the support structure to allow controlled limited rearward movement relative to its mountings to allow compression of the sacrificial chamber by the inertial mass of the passenger and seat on impact.

Yet another embodiment utilizes multiple adjoining but separate Passive Air-cushion systems where on such system connects the external airbags (sacrificial chambers) with internal airbags (micro Air-cushions), and another such system connects different and distinct internal airbags (sacrificial chambers) to micro Air-cushions in the vicinity of the passenger's body, thereby creating a cascading system of Passive Air—cushion systems. These embodiments may of course have external airbags proactively deployed in the manner described herein, prior to impact and their performance as Micro Air Cushion systems.

Yet another embodiment utilizes the independence of the venting of micro aircushions and the venting of the sacrificial chamber, to maintain the inflation of the air cushions well after the time frame for impact absorption by the sacrificial chamber such that the passenger is held in a safe position for a predetermined time. Some such embodiments may hold the passenger for a period of up to say 3 seconds to protect the passenger in the event of a roll over of the vehicle. Among these embodiments, some may have rollover detection devices that sense the orientation of the vehicle that slows the venting of the micro air cushions in the event of the commencement of a rollover of the vehicle.

Yet another embodiment comprises actively inflated airbags of minimal volume each connected to a plurality of anatomical micro aircushions, mounted on the multi element adjustable seat, that deploy on either side of the head and neck, either side and ahead of the torso and thorax below the arms and either side of and above the upper legs, said airbags inflatable in the event of a detection of a side impact thereby holding the passenger in the multi element adjustable seat for translation with the motion of the multi element adjustable seat propelled by the internal airbag or the internal shock absorbing devices.

Yet another embodiment utilizes an auxiliary brake attached to the secondary slides in addition to the friction limited sliding arrangements of the secondary slide, to provide a further control on the rate of movement of the secondary slide under side or lateral impact.

Yet another embodiment utilizes a foot safety switch attached to the foot rest, that activates the sliding mechanism to move the sliding seats into and out of the vehicle. The foot rest in some such embodiments may be bar that is depressed to move the slide into and out of the vehicle. These foot rests being designed to avoid ankle injuries in the event of rear collisions sustained by the vehicle.

Yet another embodiment uses supplementary porous filling materials within prefilled internal airbags designed with suitable vents to change the compression characteristics of the inside airbags under impact.

Yet another embodiment utilizes pressure memory capable materials on the surface of the seats or passenger supports so that surround seats contour to the exact shape of the body for further comfort of passengers and also better support under collision conditions.

Yet another embodiment for proactive impact detection uses one or more of radar detection and motion detection as in machine vision using visible or infrared or ultraviolet spectral components. The use of both these approaches for detection may use algorithms that estimate the speed of approach of the impacting object and the distance, and thereby have independent measures of the required inflation of external or internal airbags. In conjunction with each other in some embodiments, the failure probability of the system is reduced by using the worst case scenario of impact—with regard to velocity and time of impact—detected by these two systems. The two measurements may also be used in stochastic estimators to provide a better quality estimate of the distance and velocity parameters of the impacting object, when the two independent measurements are sufficiently similar to exclude the possibility of failure of either system to within a predefined error threshold. Moreover, those embodiments that use more than one camera in the machine vision system for motion detection can make 3-dimensional estimates of the impacting body and thereby from a database of known object shapes and sizes, predict the type of object and thereby its mass for better estimation of the best response with the deployment pattern and inflation levels of the external and internal air bags. Still other embodiments with a single camera in the machine vision system may utilize the divergence of the profile of the impacting vehicle as it approaches to predict relationships between the impact velocity and distance by assuming a constant velocity of the approaching object and using the non linearity of the projection of the object on the projection plane of the machine vision system. Moreover, some embodiments can use the shape of the impacting object from object recognition algorithms in the machine vision system with predefined data of known object types, to predict the type and mass density of the object and accordingly deploy the airbags appropriately. Some of these embodiments can work with distance and speed measurement in a radar based system and thereby together predict the size and mass and shape of the impacting body. Airbag deployment characteristics can thereby be optimally designed for impact with for example pedestrians, trucks or cardboard boxes at varying speeds appropriately.

Furthermore, in embodiments with one machine vision camera and one radar detector in the system, in the event of failure of the radar detector, the machine vision system alone can determine the type of impacting object (and its worst case size) and the velocity of approach for a given size of the object from the divergence of the profile of the object, and assuming a worst case size scenario, deploy the airbags appropriately, and in the event of the failure of the machine vision system the radar detector can detect velocity and distance and deploy the airbags assuming the worst type of object.

Yet another embodiment will use secondary slides whose sliding surfaces are slightly inclined upwards towards the center of the vehicle, to allow the secondary slides to negotiate a center tunnel with reduced need for any arrangements to shear a section of the tunnel. The connection surfaces of the secondary slides to the fixed elements of the vehicle at the time of impact and the vehicle seat may be arranged to support the seat in the required substantially upright position.

Yet another embodiment, has wheel chairs as passenger support mechanisms for the disabled, with collapsible wheels such that the chairs may be backed into clamps that attach on the lower side of the chair supports. In some such embodiments (as illustrated in FIGS. 18A to 18J) these clamps along with the lower cushion of the car seat 148—(which is specially made to accommodate the chair support cross members), are extended forward on tertiary slides or extension arms with hydraulic automation, such that the movement forward and if necessary down, supports the wheel chair by locking the chair clamps 149 to the chair cross supports 150, and then providing adequate support for the passenger and the wheel chair. The Teritiary Slides or extension arm are supported by the impact decoupler/Secondary Slides which are in turn attached to the Upper Primary Slides in the extended or loading position. FIG. 18B illustrates the position of the seat bottom and clams just below the wheel chair prior to attachment to the wheel chair. Once the hydraulic mechanism raises the wheel chair off the ground, the Primary Pivot of the rear wheels 151 may be unlocked and the wheel swung up backwards and locked as noted in FIG. 18C. Notably the Rear wheels support much of the passenger weight when the wheel chair is used and therefore in addition to the pivoting Principal Rear Wheel Support 152 the rear wheel in addition has a Rear Wheel Support Strut 153 that supports the compressive load when the wheel chair is operational. Thereafter the front wheels may be unlocked and swung back on the Primary Pivots for the Front Wheel 157. This is illustrated in FIG. 18D.

Thereafter the space below the wheel chair is clear and the tertiary slide or arm mechanism can move the wheel chair back and lock it with and against the Seatback 156 which is specially shaped to accommodate the cross support members of the wheel chair. This is illustrated in FIG. 18E. Some such embodiments may have the option to release the rigid back support mounting of the wheel chair 158, and thereby benefit from the reclining options of the vehicle seat back. In the process of moving back to the seat back 156, the spring loaded locking sleeves 155, that support the Secondary pivot for rear wheel retraction 144 are pushed forward relative to the wheel chair body thereby releasing the Secondary Pivot for rear wheel retraction 154 to allow the wheels to swing in and lock behind the seat back 156. This is illustrated in FIG. 18F. The wheel chair is then in a position on the extended impact decoupler/secondary slide to be transported into the vehicle. Notably in this wheel chair conversion embodiment, supplementary side and back air cushions may be inflated to fill in the areas where wheel chair support members are in the vicinity of the passenger and also to hold the wheel chair structure securely, thereby providing further protection in the event of a collision of the vehicle. This wheel chair conversion embodiment has all the side impact protection as the regular seat and has all the optionally for front impact protection of the safety shield/harness or more conventional options. FIG. 18G shows a plan view of the wheel chair prior to the insertion of Seat lower cushion and support structure. FIG. 18H illustrates an elevation view of the wheel chair and the seat lower cushion and support structure. Still other of these embodiments may use turn tables or other rotating mechanisms rather than the tertiary sliding arrangements or extending arms so that the wheel chair may be directly loaded on a turn table mounted on the impact decoupler/secondary slides, and then rotated into a driving or passenger position when retracted into the vehicle.

Yet another embodiment has anatomical micro-aircushions on the left and right edges of the support surface of the safety shield connected to selected sacrificial chambers along the bottom edge of said support surface. This will provide additional support for the passenger in a side impact, by assisting in preventing body movement outside the contoured seat under collision conditions.

Yet another embodiment has anatomical micro-aircushions on the outer edges of each of the contoured seats, particularly to cover a part of the front of the shoulders the legs and torso in the event of a side collision. These anatomical air-cushions use sacrificial chambers on the sides of the seats.

Yet another embodiment minimizes ejection hazards by controlling further the lateral movement of the seats under side impact. In these embodiments, the Upper primary slide is connected to the locking mechanisms that hold it to the vehicle under operating conditions through shock absorbers or spring mechanisms that allow controlled movement of the upper primary slides out of the vehicle when the vehicle sustains a side impact from the far side. In such embodiments the locks do not disengage when there is a side impact, as the shock absorbing devices provide the required controlled lateral movement of the far side upper primary slide under impact.

Yet another embodiment has a flexible stretchable (or folded) material that is bound to the protector shield and the "doors" of the vehicle on one of its edges where it makes contact normally with the vehicle body, the other edge of the flexible and stretchable material is bound to a frame that locks to the vehicle body under operating conditions. Under normal egress and ingress the frame along with the "doors" with the flexible, stretchable material operates as one unit the frame being held together with the "door" with door impact decouplers that fracture or disengage under impact, thereby allowing the "door" and the upper primary slide on the far side to extend out of the vehicle while the frame remains locked to the vehicle, and stretching the flexible, stretchable material so that passenger body extremities are not ejected from the vehicle but are retained by the flexible stretchable material within the vehicle.

Yet another embodiment has preinflated inside airbags that are deflated when seats move outwards (on the far side) under impact, thereby creating more space within the vehicle, minimizing the need for ejection on the far side under impact.

Yet another set of embodiments has a child or infant support mechanism (CISM) as the passenger support mechanism. For frontal collision protection these embodiments may have the following arrangements. One such embodiment has the CISM 224 comprising two support pins 225 that are located above the center of mass of the occupant and the support mechanism structure and engages a rotary damped spring with shock absorbing device (not shown) when inserted into the supports 215. and locked therein. The damped spring mechanism prevents rotary motion of the pins in the supports except under front collision conditions when the torque generated by the inertial mass of the occupant and the support mechanism structure with a center of mass lower than the pivot, swing the CISM down and forward thereby bringing the occupant closer to a fetal position with the reactive force for deceleration applied to the occupant significantly from the lower support structure of the CISM. The final position of course is designed not to bring the occupant to a position that would cause excessive spinal compression. The head and neck on the other hand, will engage and be protected by a safety harness as disclosed in this invention (not shown) and the body will face substantially away from the impact. Furthermore in a front impact, the relevant embodiment has the extendable spring damper 216 which contains a damped spring may extend to increase shock absorption, while other embodiments. have a pivotally mounted arrangement that extends under front impact. The Arms that constitute 216 Extendable Spring Damper loaded attachment for CISM support in these latter embodiments are air damper (internal airbag equivalents) loaded for rotary movement. For some embodiments the mounting of the CISM can be rigid in the operating position i.e. the support of the CISM support pivots 225 on the support 215 may be rigidly fixed in the operating position, and support may even be on multiple points on the arm of 216 directly supporting the CISM, as the pivotal movement may be restricted to the elbow of 216 arms and its attachment to the support members (the Outer rotator 218 in some embodiments or Support Bracket 232 in others). In both the linear and rotational embodiments of 216 noted above, we have movement restricted to a position that orients the occupant to maximize support from the seat bottom and for head and neck support from the safety harness.

This set of embodiments of CISM supports and indeed any embodiments of Passenger support mechanism may have for side impact protection, one or more of a nested set of the sliding arrangements disclosed in this invention. i.e. The embodiments can have safety beam lower and upper elements-1 attached to the impact decoupler/secondary slide-1 as disclosed herein (sliding arrangement 1), and a safety beam lower and upper elements-2 attached to the impact decoupler secondary slide-1 with its own impact decoupler secondary slide-2 (sliding arrangement 2) which is attached to the passenger support mechanism that may be an CISM or other passenger support mechanism. Some embodiments use a first rectangular section linear sliding arrangement, and a second rectangular section curvilinear sliding arrangement (inner and outer rotators) both with shock absorption with internal airbag equivalents (which may be air shock absorbers or similar devices). Other embodiments use Cylindrical linear sliding arrangements (sliding arrangement 1) and a rectangular curvilinear sliding arrangement (sliding arrangement 2). Still other Embodiments, use cylindrical linear slides for sliding arrangement 1 and create a virtual curvilinear sliding arrangement by pivoting the CISM support Bracket 232 in the center and control its movement by an internal airbag equivalent for combined rotational and linear motion shock absorption. This particular arrangement therefore reduces the structure to a single sliding arrangement and a single pivotal arrangement rather than two sliding arrangements. These embodiments are of course general to any passenger support mechanism including seats. For example the some embodiments may be accomplished with curvilinear secondary slide on the second set of sliding arrangements below the seat. Other embodiments may be accomplished with a pivotal arrangement to complement the single secondary sliding arrangement thereby creating a virtual curvilinear second sliding arrangement.

Greater detail of the lateral impact protection arrangements of this set of embodiments for the CISM are described below:

The first embodiments in FIGS. 10A 1-5 have the extendable air damper loaded attachment 216 attached to the Inner rotator for the CISM 217 that mates with the Outer rotator and is slidably mounted thereto with internal airbag equivalents attached between these two elements (not shown) to keep the inner rotator in the operating position as shown in FIG. 10E1, but to rotate as shown in FIG. 10E3 under lateral impact, thereby orienting to the extent possible the occupant to face away from the impact and to increase the resistive force accelerating the occupant to be applied by the body of the CISM 224. The Outer rotator 218 has the secondary slide 111 attached to it. The secondary slide impact decoupler in turn is detachably attached to the safety beam upper element 107. Which is slidably mounted to the safety beam lower element 102 which is rigidly attached to the fixed body members of the vehicle which includes the rigidly attached seat. Under a predetermined shear force the secondary slide 111 of 218 is designed to detach from the safety beam upper element 107 and thereafter be slidably attached thereon. Under operating conditions the Locking pin is in place. A lateral slide assembly may be used for the linear or curvilinear sliding arrangement described herein. When the locking pin 226 engages the slot 227 in the secondary slide and the holes 230 in the safety beam lower and upper elements, the CISM is locked from lateral movement in the operating position. The Internal Airbag equivalents 228 are uncompressed and either one of them is ready for compression in the event of a side impact on the relevant side. When a side impact is encountered, the inertial mass of the CISM and the occupant may provide a lateral force larger than the critical shear force to decouple the impact decoupler between the secondary slide 111 and the safety beam upper element 107, and thereafter the CISM and attached elements to the Secondary slide 111 move against the compression of the air shock absorber or other device in the Internal Airbag equivalent 228. This provides shock absorption in lateral impact to the occupant in the CISM. Simpler versions of this arrangement that could be used in other embodiments may integrate the secondary slide 111 and the Safety beam upper element 107, with a matching slot in the safety beam upper element as present in the secondary slide 111. When the pin is in place, in this simpler arrangement the safety beam lower element is engaged to the ends of the two internal airbags this alone keeps the arrangement in the operating position. There is no impact decoupling in this simpler arrangement. FIG. 10E2 Shows a loading or access position. This is a convenient position to load or unload the CISM with the occupant. It is achieved by removing the locking pin and sliding the Safety Beam Upper element 107 on the safety beam lower element 102.

Yet another embodiment, use cylindrical slides for lateral impact protection. Here Safety Beam Lower Elements 102 slidably support cylindrical safety beam Upper elements 107, which in this embodiment is a part of the secondary slide 111 (the safety beam upper element 107 may in other embodiments be detachably coupled to the impact decoupler secondary slides as disclosed in this invention). In this embodiment, the pin that locks the secondary slide (and safety beam upper element) to the internal airbag equivalents 228 (not shown), which are in turn housed in the cylindrical slot 229, within the secondary slide and the safety beam lower element, is located in a pin hole drilled through 231—the support key for the outer rotator from the secondary slide. The pin when locked engages a hole between two sections of the internal airbag equivalents that straddle the hole. The pin if engaged will therefore compress one or the other of the inside airbag equivalents in the event of the secondary slide moving under impact conditions relative to the safety beam lower elements 102 and the fixed elements of the vehicle, providing shock absorption. However if the pin is withdrawn, the secondary slide will not engage the internal airbag equivalents 228 and will therefore slide easily to a loading or access position nearer the door, for placing the CISM in its supports or removing the CISM from its supports. A similar pin may be mounted on the outer rotator and engage between a pair of internal airbag equivalents 228 that are mounted inside slots between the inner and outer rotator and engaging on their outer end, the inside rotator. When the pin is engaged, it provides a surface resisting the movement of one of the internal airbag equivalents an thereby provides shock absorption under impact. However, when the pin is retracted back into the outer rotator, it allows free siding between the inner and outer rotators, thereby allowing the CISM mounts to be positioned to easily attach the CISM in a loading position. Moreover, in this embodiment a further refinement would be a cable activated lever that operated all the pins—in the linear and curvilinear sliding arrangements (similar to a bicycle brake cable) for ease of operation of loading and unloading the occupants.

Yet another embodiment uses cylindrical linear slides for lateral impact protection along with a virtual curvilinear slide implementation using a pivoting arrangement between the CISM support bracket 232 and the support member 236 (support for secondary slides, CISM support bracket and internal airbag equivalents) and a dual internal airbag equivalent device that allows compression and expansion 239 mounted between the edge of the CISM support bracket 232 and the Fixed Support for safety beam lower elements and internal airbag equivalents 235. The 232 may have lateral support flanges for the CISM such that the CISM nests within the 232 when in the operating position without obstructing forward deployment of the CISM in a front impact. This embodiment has two safety beam lower elements that each slidably support on their outer surface one of the two secondary slides 111 (this embodiment uses the reduced form where the secondary slides are integrated with the safety beam upper element without impact decoupling as disclosed herein) The secondary slides are connected together and pivotally support the CISM support bracket with the support for secondary slides, CISM support bracket and internal airbag equivalents 236. The internal airbag equivalents in this embodiment is a dual element that can be compressed in both directions 238. Its center which is the active end that may be moved relative to its extreme ends under impact forces, is mounted to a support flange 237. This mount may be disconnected using a pin or other locking device to disengage the internal airbag equivalents to aid loading and unloading the occupant in the CISM. (An alternative embodiment uses single Internal airbag equivalents 228 that only compress but don't expand between their ends. Two of these may be substituted for 238, each rigidly mounted at the outer end to the fixed support flange 235 with their pistons pointing inwards and engaged into the circular slots. The Pin hole 240 for engaging the secondary slide and its attachments is also shown. This arrangement allows a single Internal Airbag Equivalent to compress while not affecting the other as the pinstons simply engage the slots and are not fixed within the slots.

In the event of a lateral impact the inertial mass of the CISM with occupant will exert a force through its center of mass that is within the substantially semicircular CISM support bracket, and will therefore compress the Internal airbag equivalents 238 attached to the Secondary slide. However, as the second internal airbag equivalent 239 is attached to the edge of the CISM support bracket this too will undergo extension or contraction depending on the side on which the impact was received. The reactive force from the latter internal airbag equivalent will however rotate the CISM to face away from the impact.

Notably there are several possible embodiments of this CISM support mechanism in this invention. Elements of these may be used in different combinations and not all elements may be present in any one embodiment. For example any of the front impact arrangements as noted above may be used with any of the lateral impact arrangement noted above. Yet another example of a reduced content embodiment does not have the lateral rotator for side impact to rotate the occupant but simply slides the CISM and the occupant laterally as disclosed above. Moreover, There are a number of variations of the CISM support in this invention. For example the safety beam lower element may be mounted on the bottom seat support flange 221, back seat support flange or on both. There may be multiple safety beam lower elements each with their own safety beam upper elements and other disclosed elements attached thereon, working in parallel to provide greater support. Notably an embodiment with the safety beam lower element attached to the bottom seat support flange 221 and comprising inner and outer rotators for lateral impact, will under side impact rotate the occupant to face away from the impact (the center of mass of the CISM and the occupant needs to be arranged to be below the pivot) but in so doing will incline the occupant to the vertical.

Each of these variations in the embodiment have advantages and disadvantages that performance, geometry and cost will influence. Some of these embodiments may be removable from the vehicle and attached to the seat with 3 point seat belts for example with the shoulder strap attachment points 223 on the Back seat support flange 222. Others may be designed into the vehicle as in for example a part of the center arm rest in the rear seat of a vehicle. The attachment of these embodiments of he invention may also be with methods available in the background art such as "Isofix" fasteners or other latch arrangements such as with the top lock flanges 241, the side lock flanges 242 and front lock flanges 243.

The side impact performance will in particular will be aided with the side lock flanges 242 being locked into support points attached to the fixed members of the vehicle between the seat cushions on the back or front seats of the vehicle.

The side support flanges 244, will aid in bracing the structure and helping transfer the load from the shock absorbing members to the structure and the lock flanges or 3 point seat belt as available in the vehicle. In some embodiments the safety beam lower element attached (by bolts not shown through the Side Support flange to the support member for the internal airbag equivalent that controls the rotational motion. However, other embodiments may have the side flanges, and the entire module attached to the side support flanges and the other structural members either in the front or rear facing arrangements for the CISM.

Some embodiments of the invention may have the safety beam upper and lower elements along with the secondary slides, internal airbag equivalents and attached hardware, removable and attachable at the front end of the support structure thereby allowing the installation of a rearward facing child seat. Such a seat may not require a front impact protection mechanism and therefore many such embodiments may have the CISM support bracket directly connected to the CISM. However, further refinements of the invention may have the CISM in two sections—the first to support the head, neck, thorax, lumbar regions and the pelvis of the child and the second to support the lower limbs of the child. The CISM support bracket may be connected to the first of these and the second which supports a smaller load may be pivotally mounted to the upper section of the CISM, thereby allowing a reclining position for the child. For older children—up to about 40 lbs, leg room in the rearward facing position becomes important. Embodiments that have a removable car seat cushion with the mountings and locks as discussed below this level will facilitate this.

As much of the complexity of the invention is external to the CISM, the CISM may be constructed to be very light and made inexpensively, thereby allowing a change in CISM and its support members that attach to the CISM support bracket, to suit the child as it grows older.

Finally the CISM support embodiments disclosed here include alternative support structures outside the automobile that can receive the same support pivots or lock points. Thereby making the loading and unloading of children easier. These external support structures include all types of strollers and bicycle trailers that have the support members that lock to the pivots or lock points. Some such alternative structures may replicate the impact protection of the CISM support in the vehicle for use in bicycle trailers and strollers.

Many aspects of the embodiments of the invention for the Child support Mechanism as the passenger support mechanism may be used for adult passengers as well. The cylindrical safety beam lower elements as in the Child support embodiment may be modified to attach either directly or pivotally to the vehicle central body member (pivotal mounting can contribute to shock absorption of the seat) or mounted on a member that can raise/lower and tilt the seats by suitable slidable and pivotal attachment to the fixed central member using well known approaches in the background art. The remaining aspects of the embodiment for the child support case may be replicated after suitable scaling. In addition, with gull wing doors or other doors that provide clearance of the Passenger support mechanisms as well as doors attached to the secondary slides as disclosed herein, the Passenger support mechanisms can slide right out of the vehicle as disclosed elsewhere in this invention. The Front collision protection arrangement for the Child support case will be most relevant for the adult passenger support mechanism case when the steering wheel and other hardware are not in the way of a movement forward of the Passenger Support Mechanism. This may be the case in drive-by-wire vehicles where the steering and other controls are mounted on a safety shield as disclosed herein.

Figure 21:
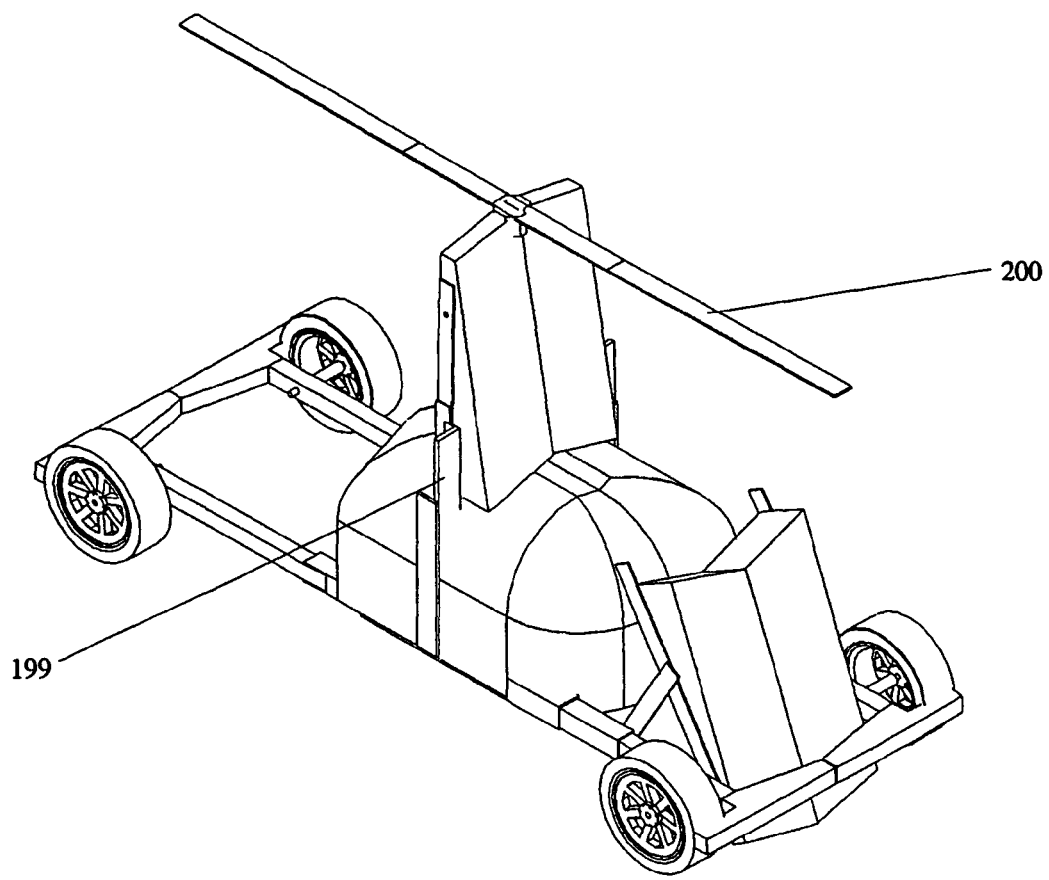
FIGS. 21A-E show flying embodiments.
Figure 21:
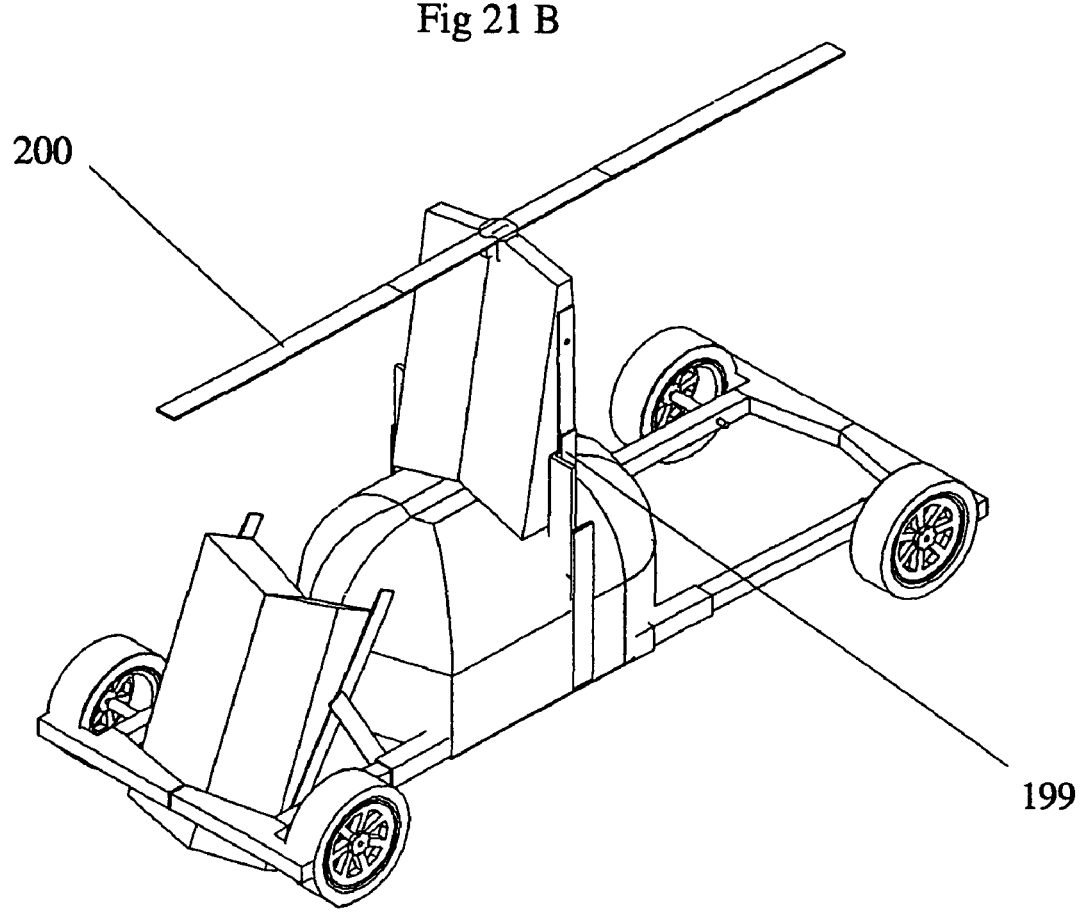
Figure 21:
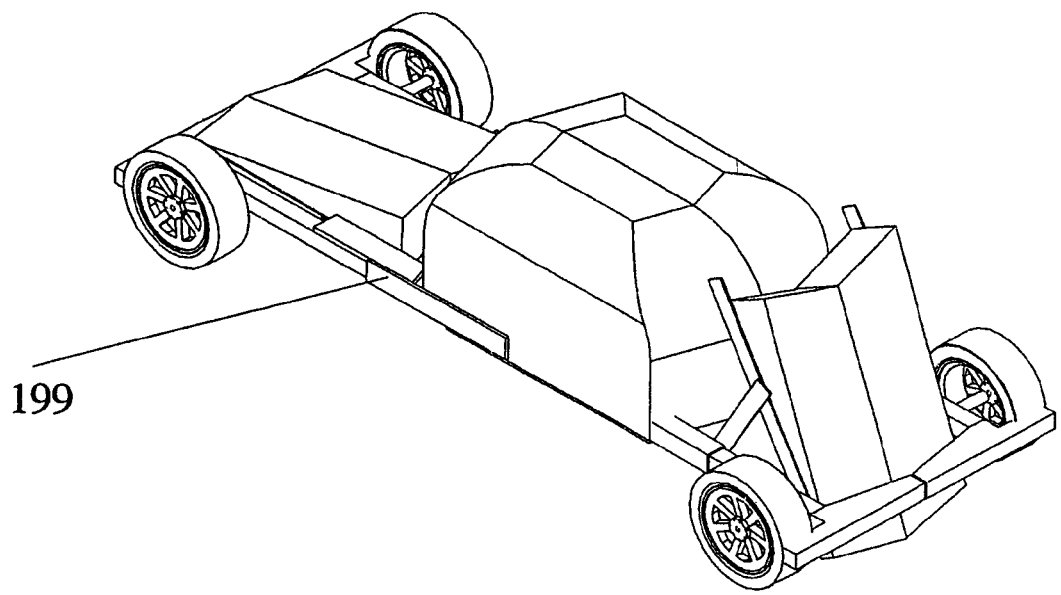
Figure 21:
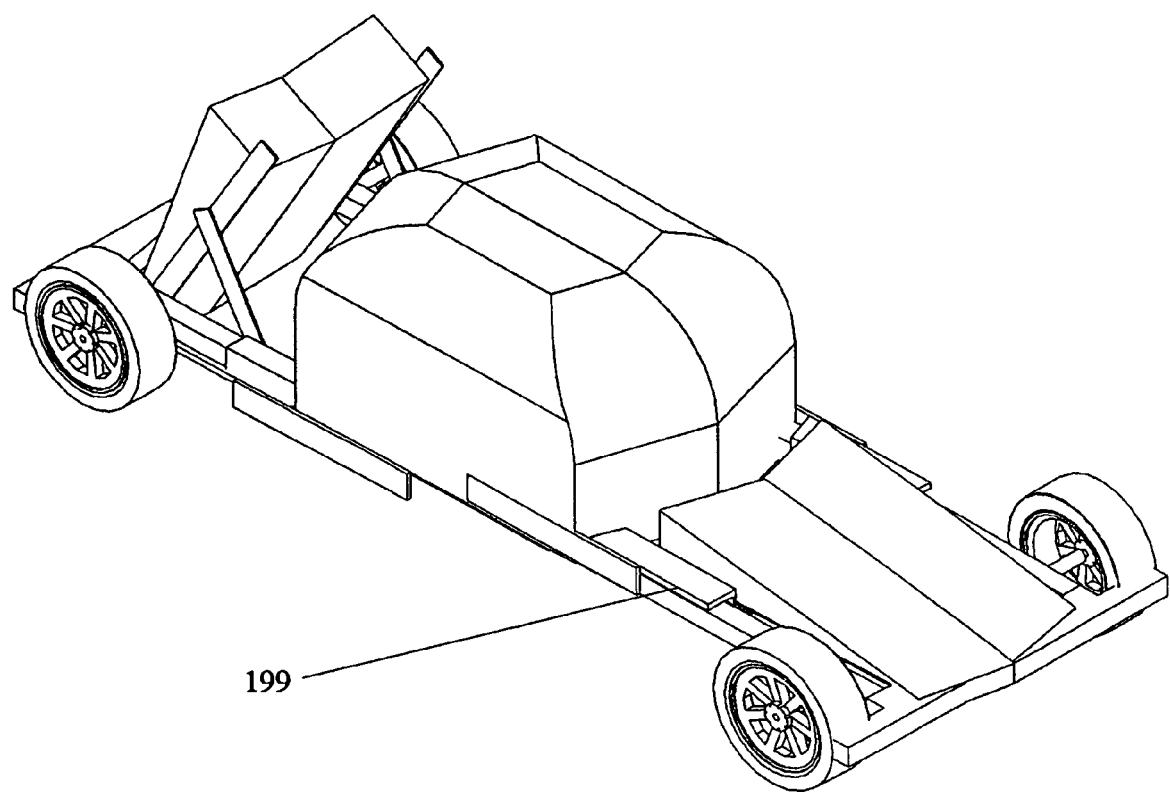
Figure 21:
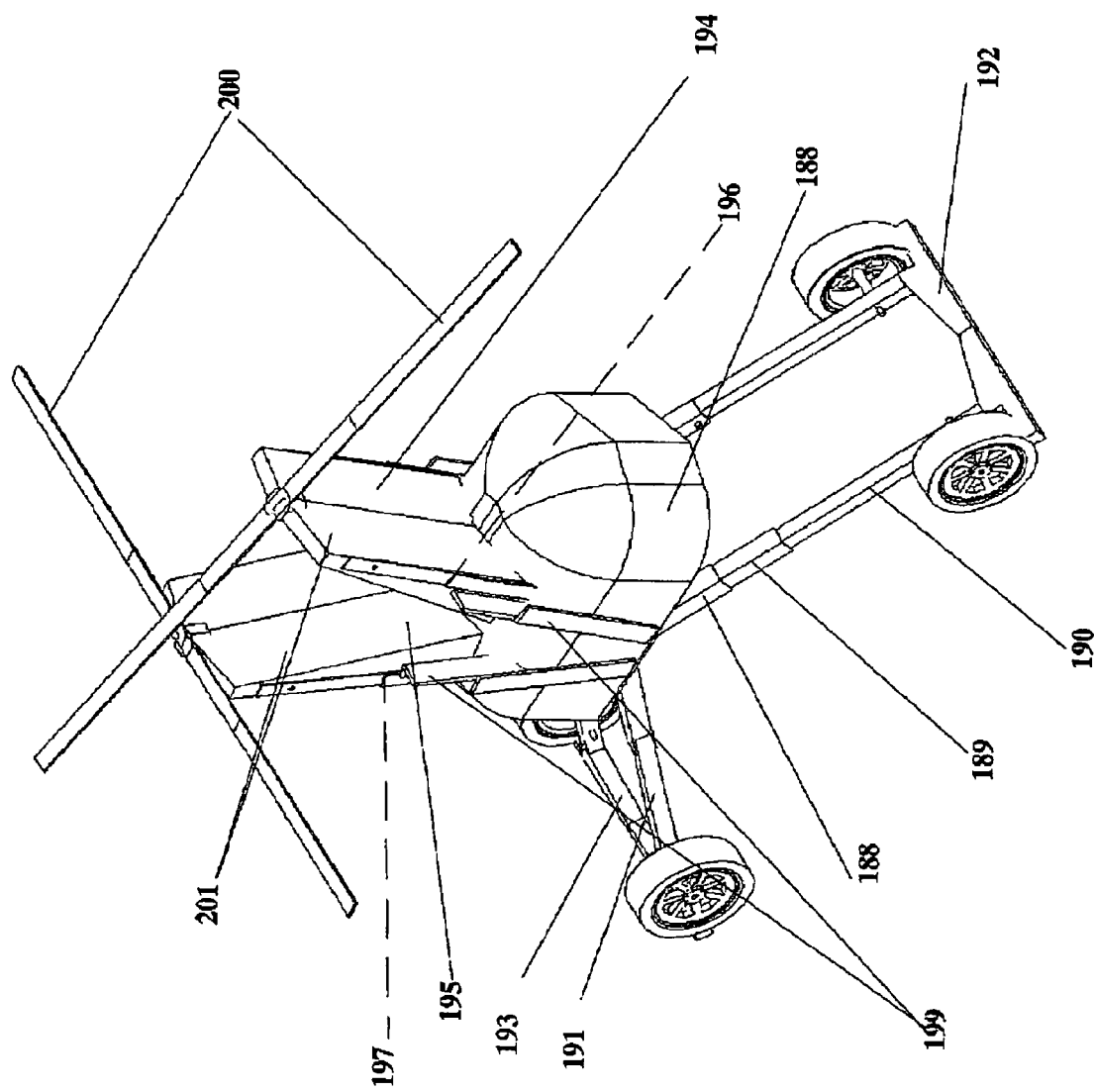

FIGS. 10E18, 10E19 illustrate another embodiment of the CISM and its supports. This embodiment uses multiple cylindrical slides that permit the lateral displacement of the CISM under impact. Pivoting of the CISM is under the diagonal and under the seat. FIGS. 10E20 and 10E21 show yet another embodiment of the CISM and its supports with a simpler arrangement where the side pivoting supports each have a preferably shock absorbing central member that can extend or contract under large axial forces or when unlocked for egress and ingress, and two pivots at each end of connection to the CISM and the CISM frame with these axes parallel to each other on both supports, said pivots being normally fixed but allowed to rotate for egress and ingress and when under large torsional stress as in impact. These provide the required displacement of the center of mass of the CISM without the use of a slide, (i.e, the CISM "rocks" on these pivots to rotate away from the impact and displace the Center of gravity concurrently) under side impact and also provide shock absorbing motion in the axial direction of the vehicle in a front impact. Notably the rotation of the axis of the pivoting supports are in the same sense (ie both clockwise or both anticlockwise) in the lateral impact case and in opposite direction s in the front impact case.

Conclusions, Ramifications & Scope

Thus it will become apparent that the present invention presented, provides a new paradigm for implementing key safety features and providing utility in accessing passenger vehicles and comfort in travelling in such vehicles. While the above description provides many specificities, these should not be construed as limitations on the scope of the present invention, but rather as an exemplification of the preferred, an additional and an alternative embodiment thereof. Many other variations are possible.

The present invention provides an arrangement that diverts the impact energy in impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. Furthermore, the arrangement allows the installation of a new and unique safety harness that may obviate the need for safety belts and front impact airbags for protection in head-on collisions. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-à-vis the remaining mass of the vehicle. Furthermore the present invention differs sharply from the Background art in that the resulting structure synergistically permits the installation of contoured multi-element surround seats that would not be implementable without the slide arrangements on either side of the vehicle in the present invention.

The present invention provides a gravity slide drive for my arrangement for which there is no counterpart in the Background art. This allows further Utility and weight and energy saving in implementing the above elements of the present invention.

The present invention includes External side Airbags that differ sharply from the Background art in that for the first time they proactively create a "Just in Time" deceleration zone for the lateral or side impact with internal and/or external side airbags while not remaining in an extended position under normal operating conditions of the vehicle.

The present invention describes an indo-skeletal structure of the vehicle body that permits the energy transfer from the lateral or side impact through compressive members to the body of the vehicle. Unlike the Background art this indo-skeletal structure is designed to transfer energy to the body of the vehicle without transferring it to the passengers and driver of the vehicle. The passengers are targeted for protection with "Safety zones".

The invention claimed is:

1. A method for reducing in the direction of an axis, a horizontal wheel base of a vehicle with: wheels; a surface operation orientation (FIG. 20A) when supported by a vehicle support surface with said wheels; with a flying orientation (FIG. 21E); a passenger environment (198) with a spacial orientation; comprising at least one module (194; 195) displaced along said axis with regard to said passenger environment in said surface operation orientation and having a horizontal length along said axis of said vehicle; and wheel supports with an angular orientation (202) attached to said wheels, said method enabled while in a surface operating orientation by (FIG. 20B,C):

reorienting said at least one module of the vehicle by pivoting one end of said module about a lateral axis and;

rotating said module until the projection of the module on the horizontal plane is shortened in the direction of the axis of operation;

displacing said wheel supports towards passenger environment without reorienting said angular orientation of said wheel supports, or the surface operation orientation of the vehicle, and said method enabled while in a flying orientation by (FIG. 21E):
changing the angular orientation of said wheel supports (202 comprising at least one of: 190;189;188) with regard to the passenger environment (198);
and lowering the wheels such that they are substantially spacially at a lower horizontal position with regard to said passenger environment (FIG. 21E).

2. A method as in claim 1, wherein in said flying orientation, substantial vertical wheel shock absorbtion is provided by inclining said wheel supports (202).

3. A method as in claim 2, wherein the extent of a compressive movement of said shock absorber arrangement (602, 604) for varying the deceleration space for impact protection is achieved by controlling a servo controller.

4. A method as in claim 1, for reducing the wheelbase of a vehicle supported only by wheels of said vehicle upon a vehicle support surface, and said vehicle in a surface operation orientation, enabled by a reorientation of a module between a vehicle end and an occupant support space such that the horizontal length of the module is reduced.

5. A method as in claim 1, for converting impact energy to rotational energy by swiveling a massive module about a horizontal axis in a vehicle.

6. A method as in claim 1, for converting a horizontal impact force on a vehicle supported only by wheels of said vehicle upon a vehicle support surface, and said vehicle in a surface operation orientation to a vertical reactive force from a support surface on the vehicle, thereby increasing braking resistance of the vehicle.

7. A vehicle, with a surface operation orientation (Fig 20A) with an axis of operation when supported by a vehicle support surface, and a flying orientation (FIG. 21E), further comprising a wheel base and a vehicle structure, wherein said vehicle structure comprises a support arrangement for one or each of both of the front and rear of the passenger environment, each of said support arrangements comprising:
a) at least one central body element (188) with a first end and at least one attachment point, attached by said at least one attachment point to said passenger environment (198) thereby providing it support;
b) at least one end element (192)that is connected with an end section of the vehicle comprising wheels, said at least one end element being slidably connected to one of said central body elements;
c) an element of variable length (FIG. 20D: 605, 601, 602, 606, 189, 603, 604, 607) with a first end and a second end having a controllable variable length between its ends, with said first end attached to the central body element (188) and the second end attached to an end element (190, 192);
thereby said at least one element of variable length enabling said at least one end element to slide towards and away from said central body element in a controlled manner at one or both of predetermined times (FIG. 20D: 601, 603)and predetermined axial force conditions (FIG. 20D: 602, 604), thereby reducing and extending the wheel base of said vehicle respectively, while said vehicle is in the surface operation orientation.

8. A vehicle with a vehicle structure and wheel base as in claim 7, wherein said extension and reduction in wheel base provide means to at least one of increase: the level of passenger comfort in the surface operation orientation; the level of maneuverability of said vehicle; and decrease or increase the deceleration zone at predetermined times for impact protection of passengers.

9. A vehicle with a vehicle structure as in claim 7, further comprising at least one elevator beam (199), pivotally attached to the passenger environment (198) about an axis orthogonal to said central body element (188) with a controllable angular orientation to the axis of said vehicle, and oriented to be substantially adjacent to said central body element (188) in the surface operation orientation of said vehicle, each of said elevator beams providing means for support for a module (194, 195) in controllable angular orientation.

10. A vehicle as in claim 9, wherein said module (194, 195) comprises an inner and an outer end and said module is pivotally attached at its outer end to said end element (190, 192; 191,195) about a horizontal lateral axis while in the surface operation orientation of said vehicle, and wherein said module has a length in a substantially horizontal direction along the axis of said vehicle that decreases on inclination of said module about said lateral axis of said module, and wherein said vehicle structure further comprises at least one crank (196; 197) with a first end and a second end, each attached with its first end to the module near the inner end of said module, and each attached by its second end to the at least one elevator beam (199), thereby in the surface operation orientation, said at least one crank providing a means to pivot said module upwards at its inner end when said at least one end element (190,192; 191,195) slides towards the element of variable length, thereby decreasing the horizontal length of said module.

11. A vehicle with a vehicle structure as in claim 9, further comprising an air propulsion means attached to the outer end of said module, such that in the flying orientation of said vehicle, said vehicle may have vertical lift to enable flight.

12. A vehicle with a vehicle structure as in claim 7, wherein said at least one element of variable length (FIG. 20D: 605, 601, 602 606, 189, 603, 604, 607) comprises one or both of a shock absorbing element (602, 604) and a motion control element (601,603).

13. A vehicle with a vehicle structure as in claim 7, wherein said passenger environment comprises support elements for said passenger that reorient said passenger during a transient upward vertical acceleration of said vehicle, such that the spine of the passenger is reoriented to have a greater angle with the vertical with regard to the orientation of said spine under normal surface operating conditions of the vehicle.

14. A vehicle structure according to claim 13, wherein said central body support means (188, 189, 199), comprises central body connection means (188).

15. A vehicle structure with a wheel base, with a surface operation orientation for operation on a support surface, and a flying orientation, comprising:
a) a passenger support (198);
b) one or more central body support means (188, 189, 199), each with a first end and a pivotal support with a lateral axis, attached by said pivotal support to said passenger environment (198) thereby providing it support in the surface operation orientation;
c) an end connection means (192,193) that is slidably connected to one or more of said central body support means, said connection having second motion control element (FIG. 20D: 603, 604) to enable said central body support means to slide towards or away from corresponding said end connection means, connected with the end section of the vehicle (192, 193) comprising wheels and bumper arrangements;

d) a module (195,196) that has a first end and a second end, that is oriented with its first end near the passenger environment and its second end near said end section, and pivotally mounted near its second end about a horizontal and lateral axis on the one or more end connection means when vehicle structure is in the surface operation orientation such that said module may pivot upwards about said axis;

e) one or more cranks (196, 197) with a first end and a second end, each attached with its first end to the module near the second end of said module, and each attached by its second end to the central body support means on its second end, such that when the vehicle structure is in the surface operation orientation, in the event of the end connection means sliding towards the corresponding elevator beam, said crank will force the module to pivot upwards;

thereby under surface operation conditions, providing a means to retract one or both of the front and rear end sections by sliding said end connection means towards the passenger environment, using said second motion control elements, and thereby forcing the corresponding modules to pivot upwards with the force applied by the corresponding cranks, and when in the flying orientation of the vehicle structure said central body support means enabling one or both of: the angular elevation of the module in an upward inclination: and the angular depression of the end connection means.

16. A vehicle with a vehicle structure as in claim 15, wherein said support elements in said passenger environment, for passenger comprise a pivotal arrangement on a central support member that, under impact transient vertical acceleration conditions of the vehicle pivots the passenger thereby reorienting the spine of said passenger.

17. A vehicle structure as in claim 15, wherein said central body support means comprises a central body connection means (188) and a body extension means (189) slidably attached to each other, and wherein said central body connection means and said body extension means are attached to either end of a first motion control element (FIG. 20D: 601, 602), and wherein the second end of the one or more cranks is attached to the body extension means.

18. A structure according to claim 17, wherein the first motion control element comprises a first actuator (601).

19. A structure according to claim 18, wherein the first actuator is adapted to increase and decrease the length of the wheelbase of the vehicle to increase one or both of the level of comfort and maneuverability of the vehicle for its occupants.

20. A structure according to claim 15, said vehicle structure comprising means to maintain the passenger support at substantially the same level with regard to the support surface during the change in the wheelbase in a surface operation orientation.

21. A structure according to claim 15, wherein the pivotal motion of the module enables the reduction in wheelbase in a surface operation orientation.

22. A structure according to claim 15, wherein the second motion control element comprises a second shock absorbing element (604) adapted to enable a change of the wheelbase during an impact on the attached end connection means.

23. A structure according to claim 15, wherein the rotational acceleration to swivel the module absorbs energy.

24. A structure according to claim 15, wherein one of the vehicle ends is an impacted vehicle end and the change in wheelbase is caused by impact to the vehicle on the impacted end.

25. A structure according to claim 15, in a surface operation orientation wherein a rapid change or spikes in acceleration of the impacted end is damped by the flywheel action of rotation of said module with one or both of a transfer of energy to and from the module during impact.

26. A structure according to claim 15, in a surface operation orientation wherein the swiveled module is adapted to divert the impacting body over occupants in said passenger support (198) following impact.

27. A structure according to claim 15, in a surface operation orientation wherein the vertical force generated to accelerate the module upwards, creates a vertical reaction force of the support surface to at least the wheels on the impacted vehicle end thereby enhancing the braking force of the vehicle immediately following impact.

28. A structure according to claim 15, wherein the second motion control element comprises a second actuator (603).

29. A structure according to claim 28, in a surface operation orientation wherein a reduction in wheelbase with the second actuator (603), facilitates maneuvering of the vehicle in constrained spaces.

30. A structure according to claim 28, in a surface operation orientation wherein the swiveling of the module improves curb visibility while parking.

31. A structure according to claim 15, wherein the second motion control element comprises a second shock absorber (604).

32. A structure according to claim 31, wherein the second shock absorber (604) is of a controllable length thereby changing the deceleration space in the event of a collision of the vehicle.

33. A structure according to claim 32, wherein the second shock absorber of controllable length is an air shock absorber.

34. A structure according to claim 15, wherein the central body connection means comprises an elevator beam (199) with a first end and a second end and having means to support the module, wherein said elevator beam is pivotally attached at its first end at the first end of the central body connection means, and enabled to incline the module at a positive angular elevation relative to the said pivotal attachment, and wherein the crank is pivotally attached to the second end of the elevator beam.

35. A structure according to claim 15 in a surface operation orientation wherein steering control of wheels in the at least one vehicle ends are modified to account for changes in the wheelbase of the vehicle.

\* \* \* \* \*

UNITED STATES PATENT AND TRADEMARK OFFICE
CERTIFICATE OF CORRECTION

| | | |
|---|---|---|
| PATENT NO. | : 8,020,658 B2 | Page 1 of 3 |
| APPLICATION NO. | : 11/185784 | |
| DATED | : September 20, 2011 | |
| INVENTOR(S) | : Arjuna Indraeswaran Rajasingham | |

It is certified that error appears in the above-identified patent and that said Letters Patent is hereby corrected as shown below:

Column 1, lines 10-18 should be deleted and insert the following:

Each of the foregoing applications are incorporated by reference herein.
--

This application is a continuation of: Serial No. 10/681,304 filed October 9, 2003 now U.S. Patent No. 7,175,221; Serial No. 09/779,594 filed February 9, 2001 now U.S. Patent No. 7,255,389; and Serial No. 10,109/674 filed April 1, 2002 now U.S. Patent No. 7,159,923. U.S. Patent No. 8,020,658 also claims priority to: EP Application No. 00203896 filed November 7, 2000 now EP Patent No. 1099607; and EP Application No. 98948260 filed September 17, 1998 now EP Patent No. 1021320.

Signed and Sealed this
Twentieth Day of November, 2012

David J. Kappos
*Director of the United States Patent and Trademark Office*

CERTIFICATE OF CORRECTION (continued)
U.S. Pat. No. 8,020,658 B2

U.S. Patent No. 7,175,221 is a divisional of Serial No. 09/779,592 filed February 9, 2001 now U.S. Patent No. 6,742,833. U.S. Patent No. 7,175,221 is also a continuation-in-part of: Serial No. 10/279,171 filed October 24, 2002 now U.S. Patent No. 7,156,416. U.S. Patent No. 7,175,221 also claims priority to: Serial No. 09/779,594 filed February 9, 2001 now U.S. Patent No. 7,255,389; and Serial No. 09/779,593 filed February 9, 2001 now U.S. Patent No. 6,715,816. U.S. Patent No. 7,175,221 also claims priority to: EP Application No. 00203896 filed November 7, 2000 now EP Patent No. 1099607; and EP Application No. 98948260 filed September 17, 1998 now EP Patent No. 1021320. U.S. Patent No. 7,175,221 also claims priority to: Prov. Serial Nos. 60,195,298 filed April 10, 2000; 60/226,570 filed August 21, 2000; 60/280,470 filed April 2, 2001; 60/282,105 filed April 9, 2001; 60/286,629 filed April 26, 2001; 60/332,419 filed November 14, 2001; 60/338,466 filed December 3, 2001; 60/367,644 filed February 20, 2002; 60/362,450 filed March 8, 2002; and 60/461,434 filed April 10, 2003.

U.S. Patent No. 7,255,389 is a continuation in-part of: Serial No. 08/936,626 filed September 24, 1997 now U.S. Patent No. 6,059,354; Serial No. 09/404,475 filed September 24, 1999 now U.S. Patent No. 6,547,315; and Serial No. 09/435,830 filed November 8, 1999 now U.S. Patent No. 6,609,749. U.S. Patent No. 7,255,389 also claims priority to: EP Application No. 00203896 filed November 7, 2000 now EP Patent No. 1099607; and EP Application No. 98948260 filed September 17, 1998 now EP Patent No. 1021320. U.S. Patent No. 7,255,389 also claims priority to: Prov. Serial Nos. 60,195,298 filed April 10, 2000; and 60/226,570 filed August 21, 2000.

U.S. Patent No. 7,159,923 is a continuation-in-part of: Serial No. 09/779,591 filed February 9, 2001 now U.S. Patent No. 6,609,754; Serial No. 09/779,592 filed February 9, 2001 now U.S. Patent No. 6,742,833; Serial No. 09/779,594 filed February 9, 2001 now U.S. Patent No. 7,255,389; Serial No. 09/435,830 filed November 8, 1999 now U.S. Patent No. 6,609,749; Serial No. 09/404,475 filed September 24, 1999 now U.S. Patent No. 6,547,315; and Serial No. 09/779,593 filed February 9, 2001 now U.S. Patent No. 6,715,816. U.S. Patent No. 7,159,923 also claims priority to: EP Application No. 00203896 filed November 7, 2000 now EP Patent No. 1099607; and EP Application No. 98948260 filed September 17, 1998 now EP Patent No. 1021320. U.S. Patent No. 7,159,923 also claims priority to: Prov. Serial Nos. 60,195,298 filed April 10, 2000; 60/226,570 filed August 21, 2000; 60/280,470 filed April 2, 2001; 60/282,105 filed April 9, 2001; 60/286,629 filed April 26, 2001; 60/332,419 filed November 14, 2001; 60/338,466 filed December 3, 2001; 60/367,644 filed February 20, 2002; and 60/362,450 filed March 8, 2002.

EP Application No. 00203896 claims priority to: Serial No. 09/435,830 filed November 8, 1999 now U.S. Patent No. 6,609,749; and Prov. Serial Nos. 60,195,298 filed April 10, 2000 and 60/226,570 filed August 21, 2000.

EP Application No. 98948260 claims priority to Serial No. 08/936,626 filed September 24, 1997 now U.S. Patent No. 6,059,354.

CERTIFICATE OF CORRECTION (continued)
U.S. Pat. No. 8,020,658 B2

U.S. Patent No. 7,156,416 is a divisional of: Serial No. 09/404,475 filed September 24, 1999 now U.S. Patent No. 6,547,315; and Serial No. 09/435,830 filed November 8, 1999 now U.S. Patent No. 6,609,749. U.S. Patent No. 7,156,416 also claims priority to: Serial No. 08/936,626 filed September 24, 1997 now U.S. Patent No. 6,059,354; Serial No. 09/779,594 filed February 9, 2001 now U.S. Patent No. 7,255,389; and Serial No. 10,109/674 filed April 1, 2002 now U.S. Patent No. 7,159,923.

U.S. Patent No. 6,547,315 is a continuation of Serial No. 08/936,626 filed September 24, 1997 now U.S. Patent No. 6,059,354.

U.S. Patent No. 6,609,749 is a continuation-in-part of Serial No. 08/936,626 filed September 24, 1997 now U.S. Patent No. 6,059,354.

U.S. Patent No. 6,609,754 is a continuation-in-part of: Serial No. 09/404,475 filed September 24, 1999 now U.S. Patent No. 6,547,315; Serial No. 09/435,830 filed November 8, 1999 now U.S. Patent No. 6,609,749; and Serial No. 08/936,626 filed September 24, 1997 now U.S. Patent No. 6,059,354. U.S. Patent No. 6,609,754 also claims priority to: Prov. Serial Nos. 60,195,298 filed April 10, 2000 and 60/226,570 filed August 21, 2000. U.S. Patent No. 6,609,754 also claims priority to: EP Application No. 00203896 filed November 7, 2000 now EP Patent No. 1099607; and EP Application No. 98948260 filed September 17, 1998 now EP Patent No. 1021320.

U.S. Patent No. 6,742,833 is a continuation-in-part of: Serial No. 09/404,475 filed September 24, 1999 now U.S. Patent No. 6,547,315; Serial No. 09/435,830 filed November 8, 1999 now U.S. Patent No. 6,609,749; and Serial No. 08/936,626 filed September 24, 1997 now U.S. Patent No. 6,059,354. U.S. Patent No. 6,742,833 also claims priority to: Prov. Serial Nos. 60,195,298 filed April 10, 2000 and 60/226,570 filed August 21, 2000. U.S. Patent No. 6,742,833 also claims priority to: EP Application No. 00203896 filed November 7, 2000 now EP Patent No. 1099607; and EP Application No. 98948260 filed September 17, 1998 now EP Patent No. 1021320.

U.S. Patent No. 6,715,816 is a continuation-in-part of: Serial No. 09/404,475 filed September 24, 1999 now U.S. Patent No. 6,547,315; Serial No. 09/435,830 filed November 8, 1999 now U.S. Patent No. 6,609,749; and Serial No. 08/936,626 filed September 24, 1997 now U.S. Patent No. 6,059,354. U.S. Patent No. 6,715,816 also claims priority to: Prov. Serial Nos. 60,195,298 filed April 10, 2000 and 60/226,570 filed August 21, 2000. U.S. Patent No. 6,715,816 also claims priority to: EP Application No. 00203896 filed November 7, 2000 now EP Patent No. 1099607; and EP Application No. 98948260 filed September 17, 1998 now EP Patent No. 1021320.

--